(12) United States Patent
Kabasawa

(10) Patent No.: US 8,406,572 B2
(45) Date of Patent: Mar. 26, 2013

(54) IMAGE PROCESSING APPARATUS, IMAGE PROCESSING METHOD AND PROGRAM

(75) Inventor: Masayuki Kabasawa, Tokyo (JP)

(73) Assignee: Sony Corporation (JP)

(*) Notice: Subject to any disclaimer, the term of this patent is extended or adjusted under 35 U.S.C. 154(b) by 869 days.

(21) Appl. No.: 12/460,323

(22) Filed: Jul. 16, 2009

(65) Prior Publication Data

US 2010/0021085 A1     Jan. 28, 2010

(30) Foreign Application Priority Data

Jul. 17, 2008   (JP) ................................ P2008-185603
Oct. 1, 2008    (JP) ................................ P2008-256480

(51) Int. Cl.
  G06K 9/32      (2006.01)
  G06K 9/40      (2006.01)
(52) U.S. Cl. ........ 382/300; 382/260; 382/263; 382/264; 382/299
(58) Field of Classification Search .................. 382/254, 382/260–266, 299–300; 348/441, 252, 222.1, 348/294; 396/304–308
  See application file for complete search history.

(56) References Cited

U.S. PATENT DOCUMENTS

| | | | | |
|---|---|---|---|---|
| 3,872,498 A * | 3/1975 | Pritchard | ....................... | 348/609 |
| 5,497,203 A * | 3/1996 | Kayashima et al. | .......... | 348/699 |
| 5,552,825 A * | 9/1996 | Talluri et al. | ................ | 348/222.1 |
| 5,583,575 A * | 12/1996 | Arita et al. | ..................... | 348/451 |
| 5,673,355 A | 9/1997 | Strolle et al. | | |
| 6,023,535 A | 2/2000 | Aoki | | |
| 6,253,022 B1 * | 6/2001 | Strolle et al. | .................. | 386/308 |
| 6,445,831 B1 * | 9/2002 | Arai | .............. | 382/254 |
| 6,507,859 B1 | 1/2003 | Omori et al. | | |
| 2003/0202605 A1 * | 10/2003 | Hazra et al. | .............. | 375/240.26 |
| 2004/0234154 A1 * | 11/2004 | Hier | .............................. | 382/254 |
| 2005/0030424 A1 * | 2/2005 | De Haan et al. | .............. | 348/458 |
| 2005/0190976 A1 * | 9/2005 | Todoroki et al. | ............. | 382/236 |
| 2007/0268388 A1 | 11/2007 | Watanabe et al. | | |
| 2007/0286588 A1 * | 12/2007 | Hatano et al. | ................... | 396/88 |
| 2008/0018786 A1 | 1/2008 | Kageyama et al. | | |

FOREIGN PATENT DOCUMENTS

| | | |
|---|---|---|
| EP | 1906664 A2 | 4/2008 |
| GB | 2438700 A | 12/2007 |
| JP | 07-245592 A | 9/1995 |
| JP | 8-336046 A | 12/1996 |
| JP | 08-336046 A | 12/1996 |
| JP | 09-069755 A | 3/1997 |
| JP | 9-069755 A | 3/1997 |
| JP | 2000-216682 A | 8/2000 |
| JP | 2005-352721 A | 12/2005 |
| JP | 2007-324789 A | 12/2007 |

OTHER PUBLICATIONS

European Search Report, EP 09165710, mailed Oct. 29, 2009.

* cited by examiner

*Primary Examiner* — Andrae S Allison
(74) *Attorney, Agent, or Firm* — Lerner, David, Littenberg, Krumholz & Mentlik, LLP

(57) ABSTRACT

Disclosed herein is an image processing apparatus, including an expansion section configured to expand an input image by interpolation using peripheral pixel values; a positioning section configured to carry out positioning of an expanded image obtained by expansion of the input image and an output image obtained in an immediately preceding operation cycle; a separation section configured to separate the output image into low frequency components and high frequency components; and a mixture-addition section configured to mix the low frequency components with the expanded image and add the high frequency components to the image obtained by the mixture to produce a new output image.

14 Claims, 46 Drawing Sheets

F I G . 2
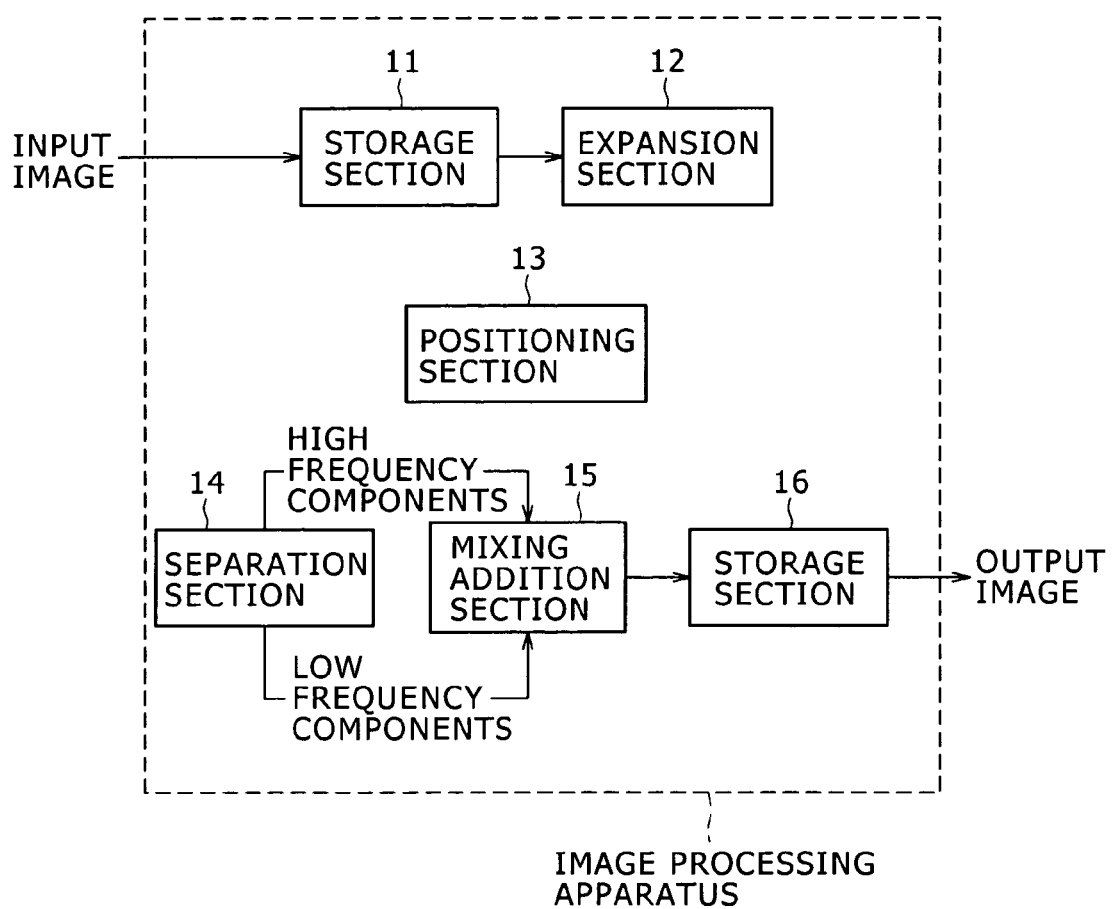

STANDARD IMAGE $M_1$

STANDARD BLOCK

COMPARISON IMAGE $M_n$

REFERENCE BLOCK
SEARCH RANGE

INPUT IMAGE

ZERO-VALUE
INTERPOLATION
IMAGE

EXPANDED
IMAGE

FILTER
CHARACTERISTIC

EXPANDED
IMAGE

POSITIONED
IMAGE

FILTER
CHARACTERISTIC

EXPANDED
IMAGE

POSITIONED
IMAGE

FILTER
CHARACTERISTIC

FILTER
CHARACTERISTIC

OUTPUT
IMAGE

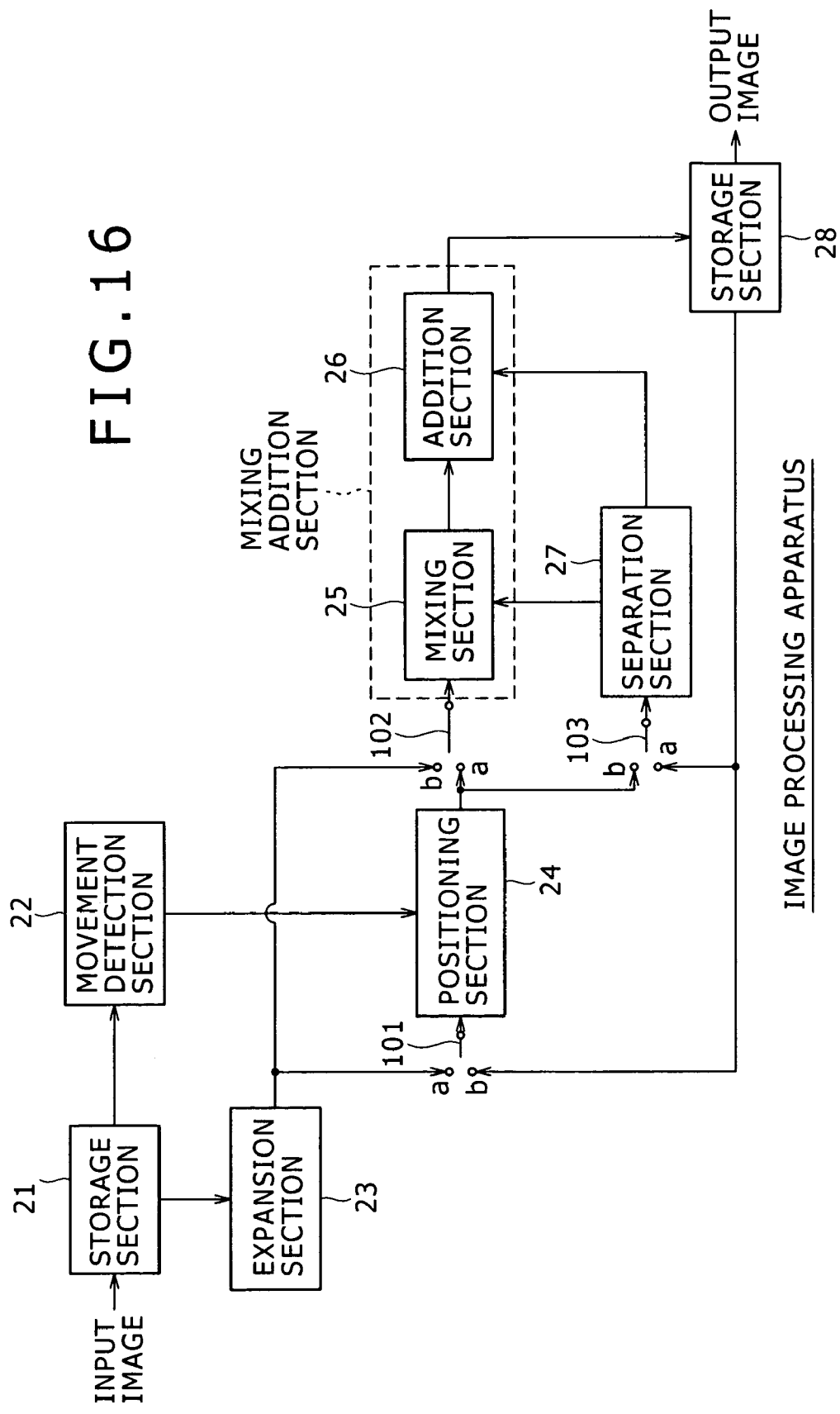

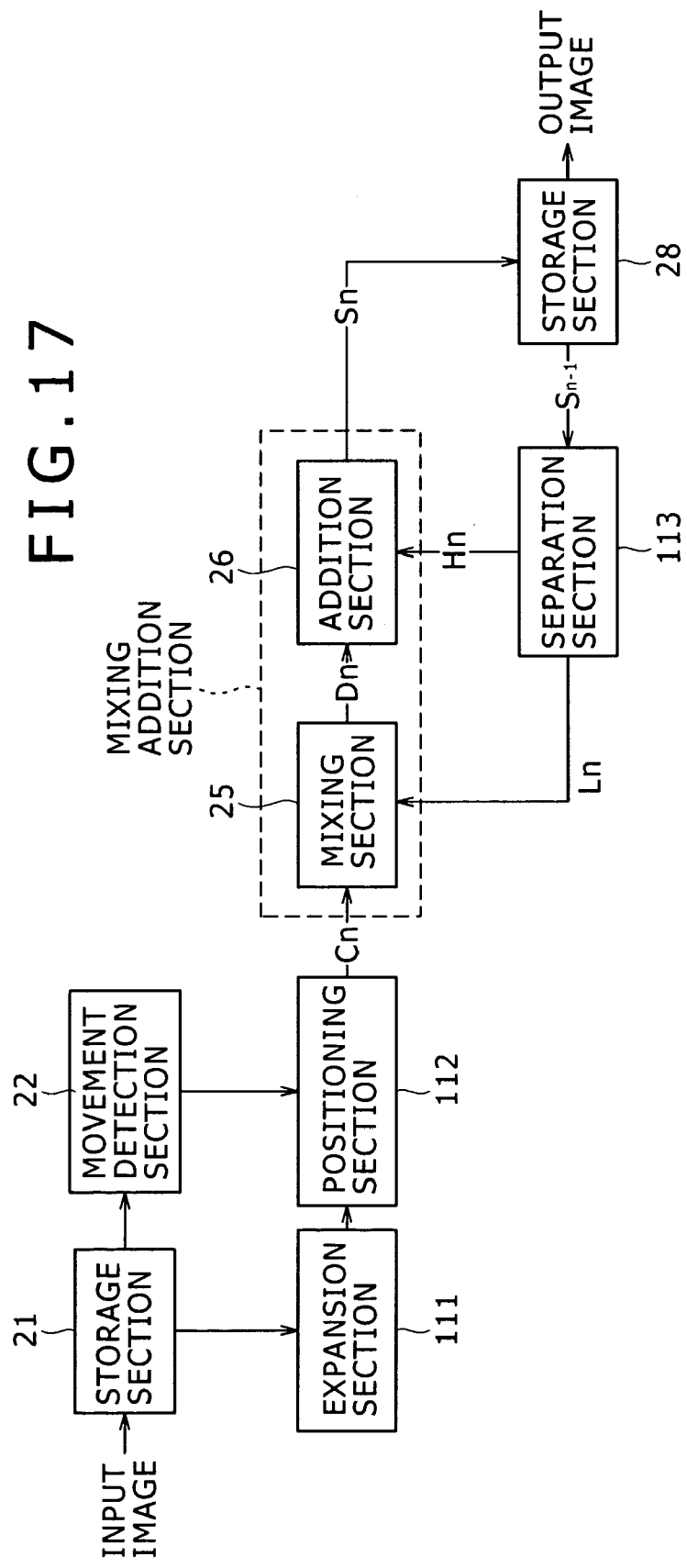

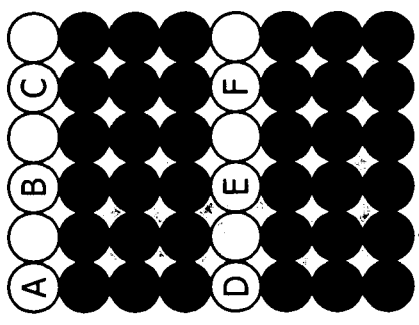
FIG.18A INPUT IMAGE
FIG.18B FREQUENCY CHARACTERISTIC
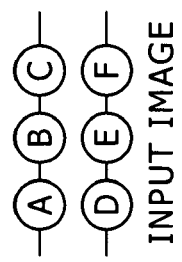
FIG.18C ZERO-VALUE INTERPOLATION IMAGE
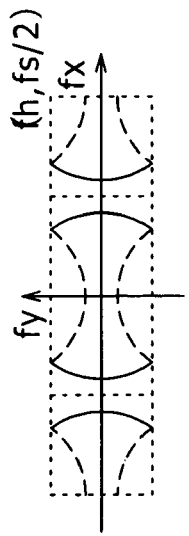
FIG.18D FREQUENCY CHARACTERISTIC
FIG.18E EXPANDED IMAGE
FIG.18F FREQUENCY CHARACTERISTIC
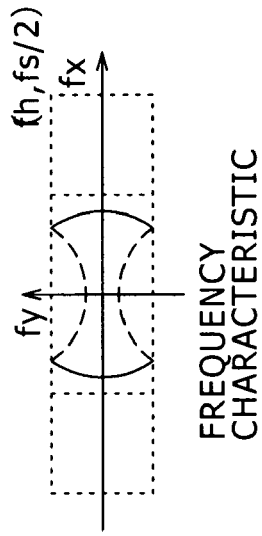
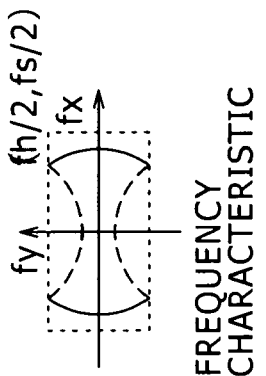
FIG.18G ZERO-VALUE INTERPOLATION IMAGE
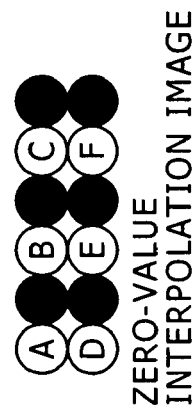
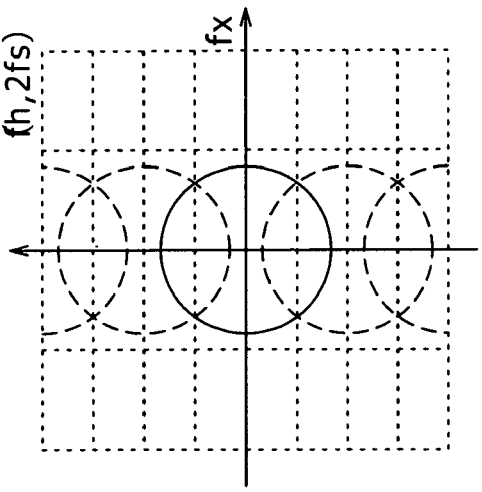
FIG.18H FREQUENCY CHARACTERISTIC

INPUT IMAGE

ZERO-VALUE
INTERPOLATION IMAGE

EXPANDED IMAGE

FILTER
CHARACTERISTIC

EXPANDED IMAGE

POSITIONED IMAGE

FILTER CHARACTERISTIC

INPUT IMAGE

ZERO-VALUE INTERPOLATION IMAGE

EXPANDED IMAGE

EXPANDED IMAGE

FILTER CHARACTERISTIC

FILTER CHARACTERISTIC

EXPANDED IMAGE

POSITIONED IMAGE

FILTER CHARACTERISTIC

FILTER CHARACTERISTIC

OUTPUT IMAGE

OUTPUT IMAGE

INPUT IMAGE

ZERO-VALUE
INTERPOLATION IMAGE

FREQUENCY
CHARACTERISTIC

EXPANDED IMAGE

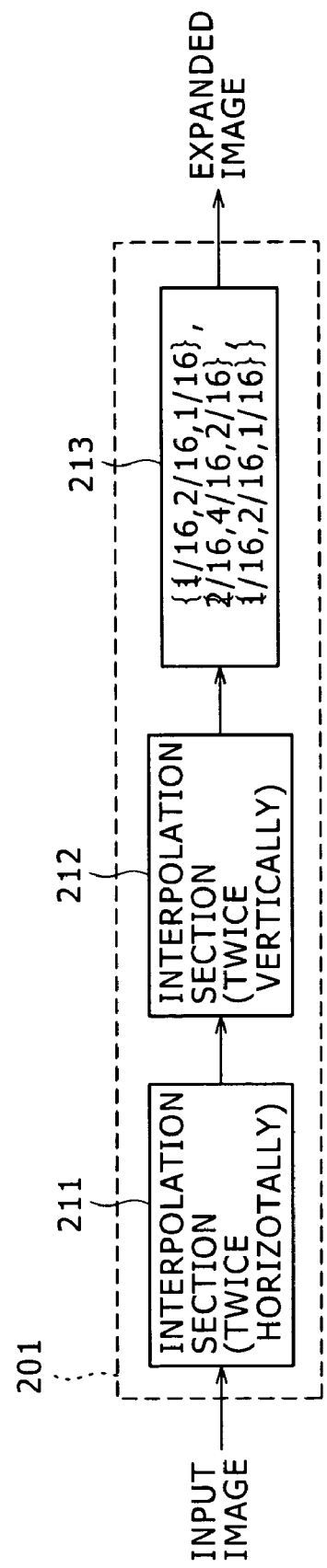

FIG.37A
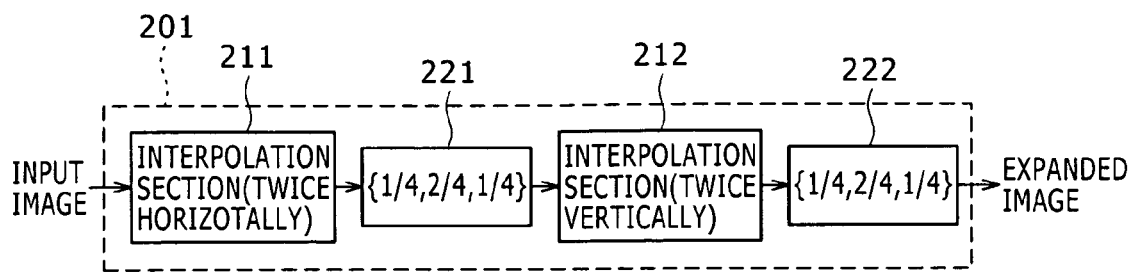
FIG.37B
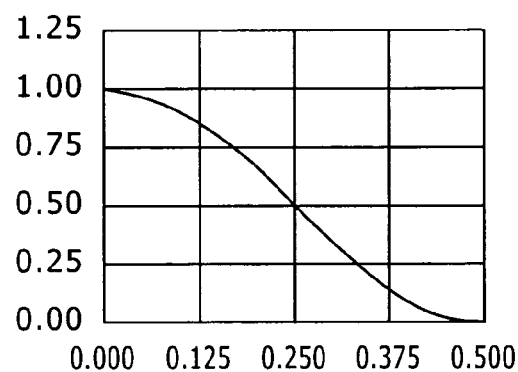
FIG.37C
$$(1/4 \quad 2/4 \quad 1/4)\begin{pmatrix} 1/4 \\ 2/4 \\ 1/4 \end{pmatrix} = \begin{pmatrix} 1/16 & 2/16 & 1/16 \\ 2/16 & 4/16 & 2/16 \\ 1/16 & 2/16 & 1/16 \end{pmatrix}$$

FIG.40A
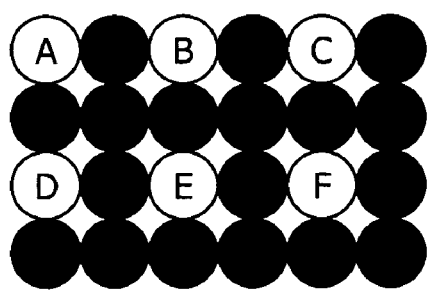
FIG.40B
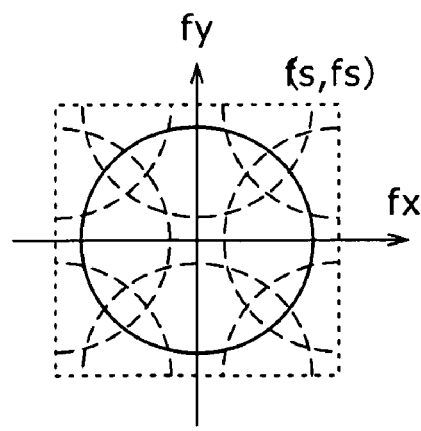
FIG.40C
FIG.40D
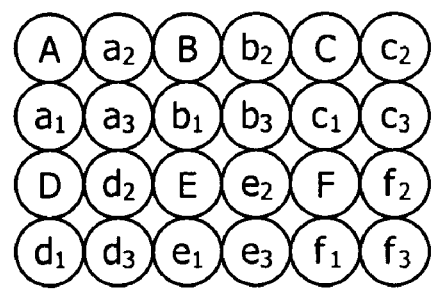
FIG.40E
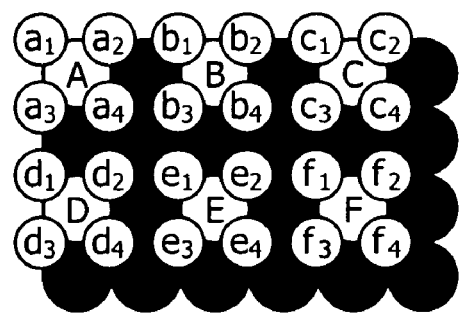

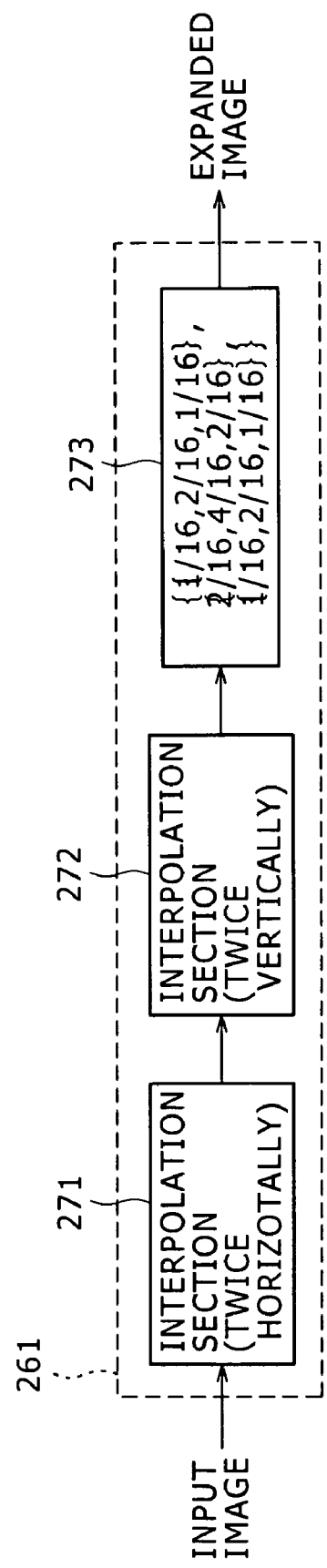

$$\begin{pmatrix} 1/2 & 1/2 & 0 \end{pmatrix} \begin{pmatrix} 1/2 \\ 1/2 \\ 0 \end{pmatrix} = \begin{pmatrix} 1/4 & 1/4 & 0 \\ 1/4 & 1/4 & 0 \\ 0 & 0 & 0 \end{pmatrix}$$

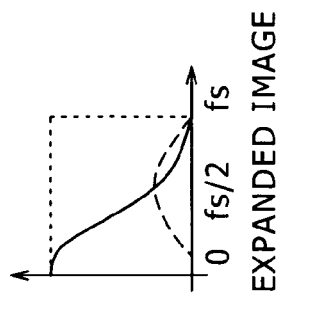
FIG.44A INPUT IMAGE
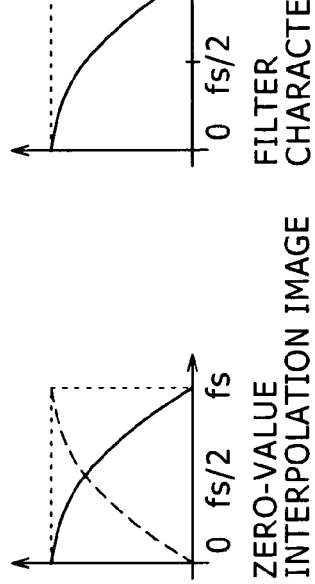
FIG.44B ZERO-VALUE INTERPOLATION IMAGE
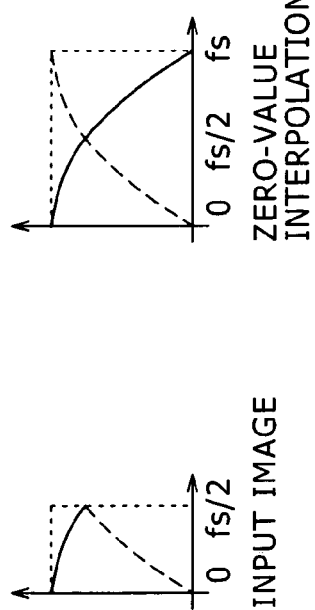
FIG.44C FILTER CHARACTERISTIC OF EXPANSION SECTION 261
FIG.44D EXPANDED IMAGE
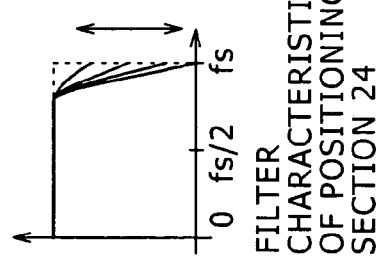
FIG.44E FILTER CHARACTERISTIC OF POSITIONING SECTION 24
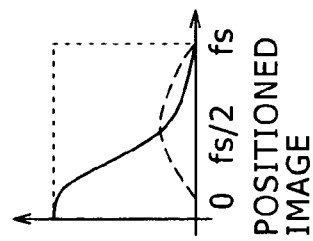
FIG.44F POSITIONED IMAGE
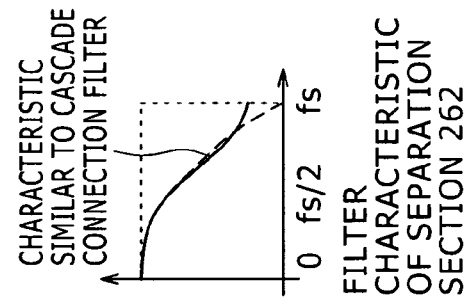
FIG.44G FILTER CHARACTERISTIC OF SEPARATION SECTION 262
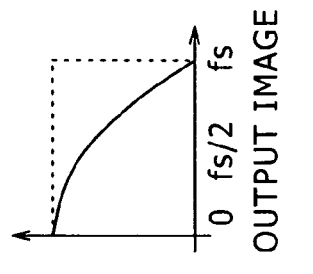
FIG.44H OUTPUT IMAGE

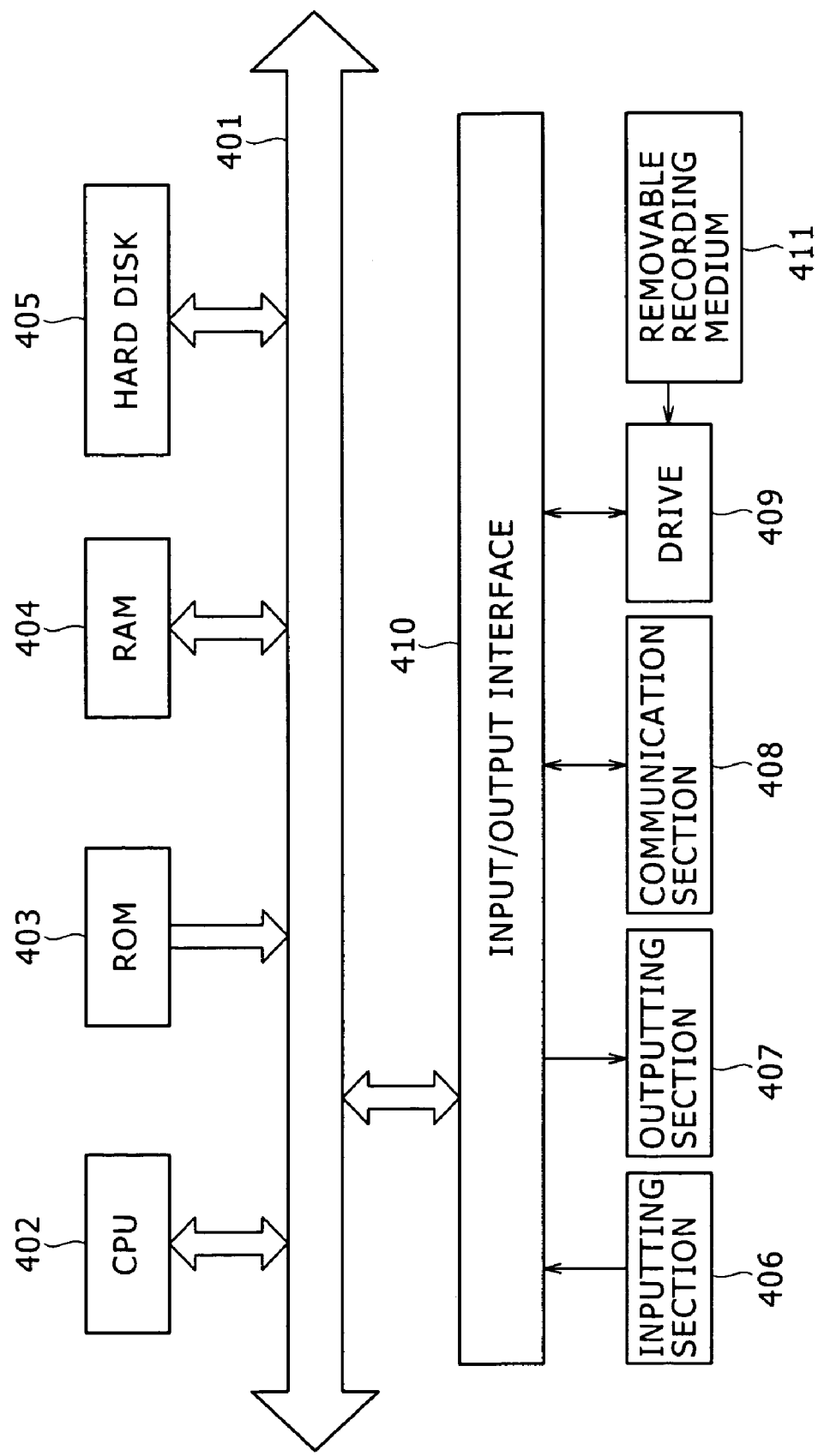

IMAGE PROCESSING APPARATUS, IMAGE PROCESSING METHOD AND PROGRAM

CROSS-REFERENCE TO RELATED APPLICATION

The present application claims priority from Japanese Patent Application JP 2008-185603 filed in the Japanese Patent Office on Jul. 17, 2008 and Japanese Patent Application JP 2008-256480 filed in the Japanese Patent Office on Oct. 1, 2008, the entire contents of which are incorporated herein by reference.

BACKGROUND OF THE INVENTION

1. Field of the Invention

This invention relates to an image processing apparatus, an image processing method and a program, and more particularly to an image processing apparatus, an image processing method and a program by which flexible resolution enhancement of a image can be obtained.

2. Description of the Related Art

For example, in digital cameras in recent years, enhancement of the performance of an image pickup device such as, for example, a CMOS (Complementary Metal Oxide Semiconductor) imager and the performance of image processing have been and are advancing. For example, a digital camera is available which combines a plurality of images as input images picked up successively at a high rate to produce an image of high picture quality. As such images of high picture quality, for example, an image for which camera shake correction is carried out, an image from which noise is removed to enhance the S/N ratio (Signal to Noise ratio), an image of a high resolution having an increased number of pixels and so forth are available.

For example, production of an image having an increased number of pixels from a single image (hereinafter referred to sometimes as image of a frame) can be carried out by interpolation by means of an interpolation low-pass filter whose pass-band is a frequency region lower than the Nyquist frequency and which uses a sinc function (sin(x)/x), by interpolation by a spline function or the like or by some other interpolation.

However, although the interpolation described above can increase the number of pixels, it fails to enhance the resolution.

Meanwhile, the image pickup device of a digital camera sometimes has the Bayer array. In this instance, sampling of, for example, a R component from among R (Red), G (Green) and B (Blue) components is carried out in a state wherein pixels other than pixels of the R component are sampled out or removed. This similarly applies also to the G component and the B component. Accordingly, in an image picked up by the image pickup device of the Bayer array, some pixels are removed from an image of each color component.

Further, for example, in a television receiver, an image of the interlaced type is sometimes handled. An image of the interlaced type (hereinafter referred to sometimes as interlaced image) is considered an image from which pixels in every other line are removed.

The pixel values of such an image from which pixels are removed as described above include aliasing components in addition to signal components. If the interpolation described above is carried out for an image which includes aliasing components, then an image obtained as a result of the interpolation has conspicuous aliasing components.

Thus, a resolution enhancement technique is available wherein a plurality of frames are combined to produce an image of one frame whose pixel number is increased and which has an enhanced resolution. Such a resolution enhancement technique as just described is disclosed, for example, in Japanese Patent Laid-Open No. Hei 09-69755 (hereinafter referred to as Patent Document 1) which corresponds to U.S. Pat. No. 6,023,535, Japanese Patent Laid-Open No. Hei 08-336046 (hereinafter referred to as Patent Document 3), Japanese Patent Laid-Open No. 2007-324789 (hereinafter referred to as Patent Document 3) which corresponds to U.S. Patent Application No. 2008018786 and Japanese Patent Laid-Open No. 2000-216682 (hereinafter referred to as Patent Document 4) which corresponds to U.S. Pat. No. 6,507,859.

In the existing resolution-enhancement technique, enhancement of the resolution of an image is carried out by three processes including a movement detection process, a wideband interpolation process and a weighted addition process.

In the movement detection process, images of a plurality of frames inputted, that is, input images, are used to detect a movement of an image to estimate a difference between positions at or phases in which the images are sampled, that is, between sampling positions which are spatial positions of light received by the pixels of an image pickup device.

Here, the movement detection process can be carried out, for example, by a gradient method, a block matching method and various other methods.

In the wideband interpolation process, a low-pass filter having a wide frequency band for passing all high frequency components of an image including aliasing components is used to interpolate pixels or sampling points to increase the number of pixels so that an image of an enhanced resolution is produced.

The wideband interpolation process can be carried out using a popular wideband LPF (Low Pass Filter) having a passband equal to twice the Nyquist frequency as described, for example, in Patent Document 1 or 2.

In the weighted addition process, mixture, that is, weighted addition, of images of a plurality of frames picked up at a high rate is carried out in accordance with a weight corresponding to the phase of sampling of the images of a plurality of frames. Consequently, aliasing components generated upon sampling of the images are canceled and removed while high frequency components of the images are restored.

It is to be noted that Patent Document 1 discloses a technique of combining nine frames of images having aliasing components two-dimensionally to produce a high resolution image. Patent Document 2 discloses a technique for combining three frames of images having aliasing components one-dimensionally to produce a high resolution image. Patent Document 3 and Patent Document 4 disclose a technique for IP (Interlace Progressive) conversion of combining images of two frames for which Hilbert transform is carried out to produce an image of a high resolution to carry out conversion from an interlaced image to a progressive image.

The existing resolution enhancement technique is described further with reference to FIGS. 1A to 1C.

FIG. 1A illustrates frequency spectra of images of three successive frames (hereinafter referred to as frames #1, #2 and #3) picked up at a high rate and having different sampling phases within a one-dimensional (one spatial direction) frequency region.

In FIG. 1A, the distance from the axis of the frequency represents the signal intensity, and the rotational angle around the axis of the frequency represents the phase.

Where the frames #1 to #3 include aliasing components in addition to signal components, if a wideband interpolation process is carried out for the frame #i (here, i=1, 2 or 3), that is, if interpolation of pixels is carried out by means of a wideband LPF which passes a frequency band from −fs to fs (in FIG. 1A, only a frequency band from 0 to fs is illustrated) equal to twice the Nyquist frequency fs/2, then an image which includes signal components and aliasing components according to the phase of sampling over the frequency band from −fs to fs which is equal to twice the Nyquist frequency fs/2 as seen in FIG. 1A is obtained.

The image obtained by the wideband interpolation process includes a number of pixels increased from that of the original image.

FIG. 1B illustrates a phase of signal components of the frames #1 to #3 obtained by the wideband interpolation process, and FIG. 1C illustrates a phase of aliasing components of the frames #1 to #3 obtained by the wideband interpolation process.

It is to be noted that, in FIGS. 1B and 1C, the axis of abscissa indicates the imaginary axis and the axis of ordinate indicates the real axis.

The phases of signal components of the three frames #1 to #3 obtained by the wideband interpolation process coincide with each other, and, for example, if the phase of aliasing components of the frame #1 is determined as a reference, the phases of aliasing components rotate in response to the difference in phase of sampling from the frame #1.

As described above, the phase of aliasing components of the three frames #1 to #3 obtained by the wideband interpolation process rotates in response to the difference in phase of sampling from the frame #1. Accordingly, the aliasing components of the three frames #1 to #3 obtained by the wideband interpolation process can be removed by carrying out weighted addition of the three frames #1 to #3 with a weight determined in accordance with the difference in phase of sampling from the frame #1.

Therefore, in the existing resolution enhancement technique, a weighted addition process of carrying out weighted addition of the images of the frames #1 to #3 with the weight determined in accordance with the (difference in) phase of sampling of the three frames #1 to #3 obtained by the wideband interpolation process is carried out to remove aliasing components. Consequently, an image which includes signal components over the frequency band from −fs to fs and from which aliasing components are removed, that is, an image of a high resolution, is obtained.

As described above, according to the existing resolution enhancement process, an image obtained by processing an original image, that is, an input image, not by means of a LPF which passes a frequency band from −fs/2 to fs/2 of the Nyquist frequency fs/2 but by means of a wideband LPF which passes a frequency band twice the Nyquist frequency fs/2 is used to restore signal components exceeding the Nyquist frequency fs/2.

It is to be noted that, according to the existing resolution enhancement technique, in order to determine the weight for weighted addition with which aliasing components are reduced to zero, the number of frames to be used for weighted addition has to sometimes be determined in advance.

An image which becomes an object of a resolution enhancement technique is hereinafter referred to suitably as input image.

SUMMARY OF THE INVENTION

Where a resolution enhancement technique is applied, for example, to images of a television broadcast or images recorded on an optical disk, since such images have a high S/N ratio, even if a small number of frames such as two frames or three frames are used as input images, an image of high picture quality can be obtained.

However, where a resolution enhancement technique is applied to images picked up by a digital still camera or a digital video camera for home use, an image obtained sometimes includes conspicuous noise.

In particular, an image obtained by a digital still camera for home use is sometimes low in the S/N ratio because of insufficient illuminance or the like. If a small number of frames of images having such a low S/N ratio as just described are used as input images, then an image having conspicuous noise is obtained instead.

Accordingly, where a resolution enhancement technique is applied to images obtained by a digital still camera or the like for home use, it is preferable to use many frames as input images.

However, the number of frames which can be used as input images is sometimes increased or decreased depending upon, for example, the performance of the digital still camera, the exposure time determined from the brightness and so forth of an image pickup object and other conditions upon image pickup and so forth.

Therefore, it is desired to provide an image processing apparatus, an image processing method and a program by which flexible resolution enhancement of an image can be achieved without depending upon the number of input images.

According to an embodiment of the present invention, there is provided an image processing apparatus including expansion means for expanding an input image by interpolation using peripheral pixel values, positioning means for carrying out positioning of an expanded image obtained by expansion of the input image and an output image obtained in an immediately preceding operation cycle, separation means for separating the output image into low frequency components and high frequency components, and mixture-addition means for mixing the low frequency components with the expanded image and adding the high frequency components to the image obtained by the mixture to produce a new output image.

According to another embodiment of the present invention, there are provided an image processing method and a program for causing a computer to execute an image processing method, including the steps of expanding an input image by interpolation using peripheral pixel values, carrying out positioning of an expanded image obtained by expansion of the input image and an output image obtained in an immediately preceding operation cycle, separating the output image into low frequency components and high frequency components, and mixing the low frequency components with the expanded image and adding the high frequency components to the image obtained by the mixture so that a new output image is produced.

In the image processing apparatus and method and the program, an input image is expanded by interpolation using peripheral pixel values, and then, positioning of the expanded image and an output image obtained in the immediate preceding operation cycle is carried out. The output image is separated into low frequency components and high frequency components. Then, the low frequency components are mixed with the expanded image, and the high frequency components are added to the image obtained by the mixing to produce a new output image.

It is to be noted that the image processing apparatus may be an independent apparatus or may be a component or internal block of a different apparatus.

Further, the program can be transmitted through a transmission medium or recorded into or on a recording medium so as to be provided as such.

With the image processing apparatus and method and the program, the picture quality of an image can be enhanced, and particularly, flexible resolution enhancement of an image can be anticipated.

BRIEF DESCRIPTION OF THE DRAWINGS

FIG. 2 is a block diagram showing a general configuration of an image processing apparatus to which the embodiments of the present invention are applied;

FIG. 16 is a block diagram showing an example of a configuration of the image processing apparatus of FIG. 2 according to a third embodiment of the present invention;

FIG. 17 is a block diagram showing an example of a configuration of the image processing apparatus of FIG. 2 according to a fourth embodiment of the present invention;

FIGS. 18A to 18H are diagrammatic views illustrating a process of a expansion section shown in FIG. 9;

FIG. 36 is a block diagram showing an example of a configuration of the expansion section shown in FIG. 34;

FIGS. 37A to 37C are diagrammatic views illustrating another example of a configuration of the expansion section shown in FIG. 34;

FIGS. 40A to 40E are diagrammatic views illustrating a process executed for a B image by an expansion section shown in FIG. 39;

FIG. 41 is a block diagram showing an example of a configuration of the expansion section shown in FIG. 39;

FIGS. 44A to 44H are diagrammatic views illustrating a process executed for a B image and a R image carried out by the image processing apparatus of FIG. 39;

FIG. 46 is a block diagram showing an example of a configuration of a computer to which the embodiments of the present invention are applied.

DETAILED DESCRIPTION OF THE PREFERRED EMBODIMENTS

Figure 1A:
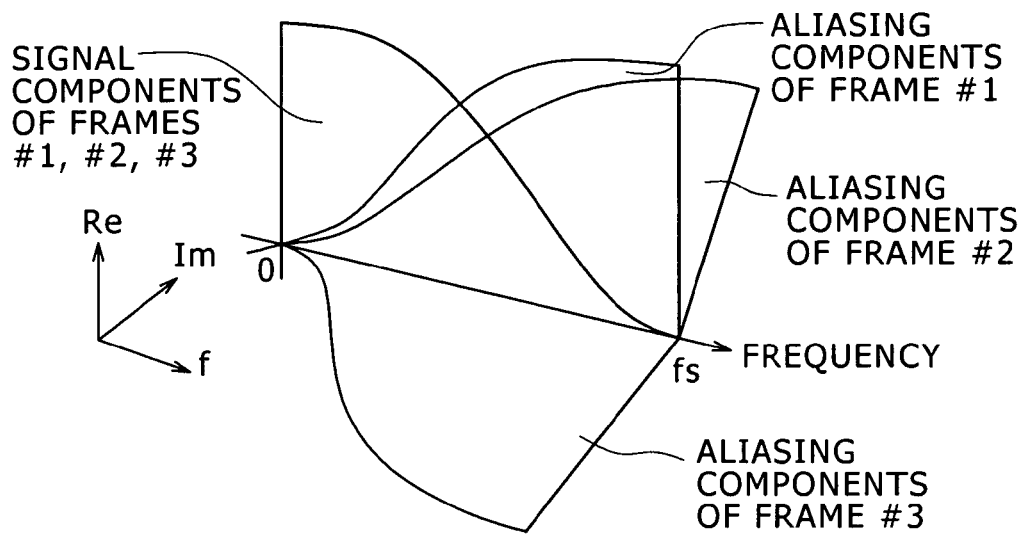
FIGS. 1A to 1C are diagrammatic views illustrating an existing resolution enhancement technique.

FIG. 2 shows a general configuration of an image processing apparatus to which the present embodiment is applied.

Referring to FIG. 2, the image processing apparatus receives, from the outside, images, that is, input images, of more than one frame, for example, successively picked up at a high rate. Then, the image processing apparatus uses the input images of more than one frame supplied thereto to carry out an image process as a resolution enhancement process of using the input images of more than one frame supplied thereto to produce and output an output image as an image of a higher resolution.

To this end, the image processing apparatus includes a storage section 11, an expansion section 12, a positioning section 13, a separation section 14, a mixing addition section 15 and a storage section 16.

The storage section 11 receives input images of more than one frame supplied thereto. The storage section 11 temporarily stores the input images of more than one frame supplied thereto.

The expansion section 12 expands the input images stored in the storage section 11 by interpolation using pixel values of peripheral pixels, that is, by interpolation other than zero-value interpolation of inserting zeros to produce expanded images having a pixel number greater than that of the input images and outputs the expanded images.

The positioning section 13 carries out positioning of the expanded images and an output image obtained in the immediately preceding operation cycle by the mixing addition section 15 hereinafter described.

The separation section 14 separates an output image into low frequency components and high frequency components and supplies the resulting low and high frequency components to the mixing addition section 15.

The mixing addition section 15 mixes the low frequency components from the separation section 14 into the expanded images and adds the high frequency components from the separation section 14 to the resulting expanded images to produce a new output image and supplies the new output image to the storage section 16.

The storage section 16 stores the output image from the mixing addition section 15 and outputs the stored output image to the outside as occasion demands.

Figure 3:
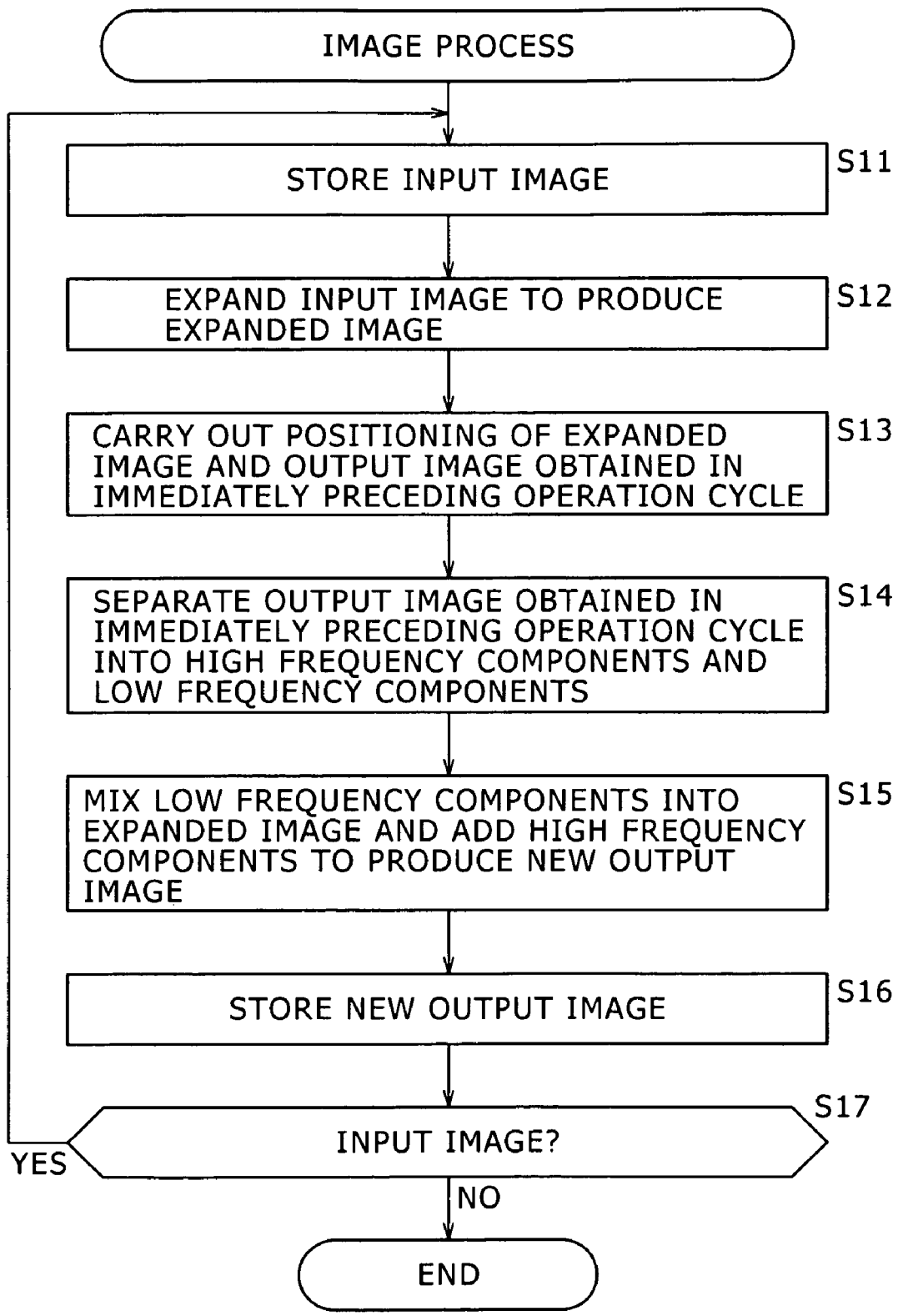
FIG. 3 is a flow chart illustrating an image process, that is, a resolution enhancement process, carried out by the image processing apparatus of FIG. 2.

FIG. 3 illustrates an image process, that is, a resolution enhancement process, carried out by the image processing apparatus of FIG. 2.

The storage section 11 waits that an input signal of one frame from among input images of more than one frame which are picked up successively is inputted thereto and stores the input image supplied thereto at step S11. Then, the processing advances to step S12.

At step S12, the expansion section 12 expands the input image stored in the storage section 11 by interpolation using pixel values of peripheral pixels to produce an expanded image and outputs the expanded image. Then, the processing advances to step S13.

At step S13, the positioning section 13 carries out positioning of the expanded image produced by the expansion section 12 and an output image obtained in the immediately preceding operation cycle by the mixing addition section 15. Then, the processing advances to step S14.

At step S14, the separation section 14 separates the output image obtained in the immediately preceding operation cycle by the mixing addition section 15 into low frequency components and high frequency components and supplies the resulting low and high frequency components to the mixing addition section 15. Then, the processing advances to step S15.

At step S15, the mixing addition section 15 mixes the low frequency components from the separation section 14 into the expanded image and then adds the high frequency components to the resulting expanded image to produce a new output image and supplies the new output image to the storage section 16. Then, the processing advances to step S16.

At step S16, the storage section 16 stores the new output image from the mixing addition section 15. Then, the processing advances to step S17.

Here, if no output image is obtained as yet by the mixing addition section 15, that is, for example, if the expanded image is an expanded image of an input image of the first frame, then the processes at steps S13 to S15 are skipped. Then at step S16, the expanded image obtained by the expansion section 12 is stored as it is as a new output image into the storage section 16.

At step S17, it is decided whether or not any of the inputted images picked up successively still remains in the storage section 11.

If it is decided at step S17 that any inputted image still remains in the storage section 11, that is, if an input image of one frame from among the input images of more than one frame picked up successively is supplied newly to the storage section 11, then the processing returns to step S11 to repeat processes similar to those described above.

Accordingly, if input images of a plurality of frames picked up successively are supplied to the image processing apparatus, then in the image processing apparatus, the expansion section 12 expands the input images of different frames, and the positioning section 13 carries out positioning of the expanded images and an output image. Then, the separation section 14 separates the output image into low frequency components and high frequency components, and the mixing addition section 15 mixes the low frequency components into the expanded image and then adds the high frequency components to the image obtained by the mixing to produce a new output image. Then, the sequence of operations is repeated.

On the other hand, if it is decided at step S17 that no input image remains in the storage section 11, that is, if the processes at steps S11 to S16 are carried out using input images of more than one frame picked up successively, then the storage section 16 outputs the latest output image stored therein as an image having a resolution enhanced from that of the input images of more than one frame picked up successively to the outside, thereby ending the image process.

It is to be noted that outputting of the output image stored in the storage section 16 may be carried out not only when it is decided at step S17 that no input image remains but also every time a new output image is stored at step S16.

Although a more particular configuration of the image processing apparatus of FIG. 2 is described below, before the description, an expansion process of expanding an input image to produce an expanded image and a resolution enhancement process of the expanded image are described.

FIGS. 4A to 4D illustrate an expansion process of increasing the number of pixels of an input image which does not include aliasing components in a certain one direction such as a vertical direction to twice the original pixel number.

According to a sampling theory, if a signal has only frequency components within a range of a frequency band of −f to f, then if the signal is sampled with a sampling frequency of 2f or more, then the original signal can be restored fully by removing high frequency components using a LPF (low-pass filter).

Now, if it is assumed that the sampling frequency of an input image in a certain one direction such as a vertical direction is a frequency fs, then if the input image does not include aliasing components, then it includes signal components only within a range of a frequency band from −fs/2 to fs/2 (hereinafter referred to as frequencies lower than the frequency fs/2) in the one direction.

Figure 4A:
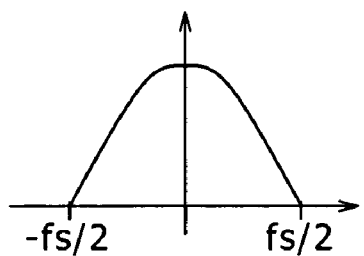
FIGS. 4A to 4D are diagrammatic views illustrating an expansion process of increasing the number of pixels in the vertical direction of an input image, which does not include aliasing components, to twice that of the original pixel number.

FIG. 4A illustrates a frequency characteristic, that is, frequency components, of an input image which does not include aliasing components.

In FIG. 4A, the axis of abscissa represents the frequency and the axis of ordinate represents the amplitude of frequency components. This similarly applies to all views illustrating frequency characteristics hereinafter described.

Now, four pixels juxtaposed successively in one direction, for example, in a vertical direction, from within an input image which does not include aliasing components are represented such that the pixel value of the ith pixel is represented as y(i) and hence the pixel values of the four pixels are represented as y(0), y(1), y(2) and y(3).

In order to increase the number of pixels of the input image in the vertical direction to twice, zero-value interpolation of inserting new pixels, that is, sampling points, whose pixel value is zero, into positions intermediate between adjacent ones of the pixels in the vertical direction is carried out first.

In the zero-value interpolation here, the original pixel values are adjusted so that the average value of the pixel value may not vary after the zero-value interpolation. In the present case, since the pixel number is doubled, the original pixel values are doubled in the zero-value interpolation, and as a result, the list of the pixel values of the four pixels, that is, y(0), y(1), y(2), y(3), becomes another list of the pixel values of seven pixels, that is, 2y(0), 0, 2y(1), 0, 2y(2), 0, 2y(3).

The zero-value interpolation described above is equivalent to increase of the sampling frequency of the input image to a frequency 2fs which is twice the original sampling frequency fs. Although the signal components of the input image do not vary between those before and after the zero-value interpolation, if the frequency 2fs which is twice the original sampling frequency fs is used as a new sampling frequency after the zero-value interpolation, then it looks that aliasing components are generated in the frequency band from −fs to fs corresponding to the new sampling frequency 2fs, that is, a frequency band which allows reproduction by sampling with the sampling frequency 2fs.

Figure 4B:
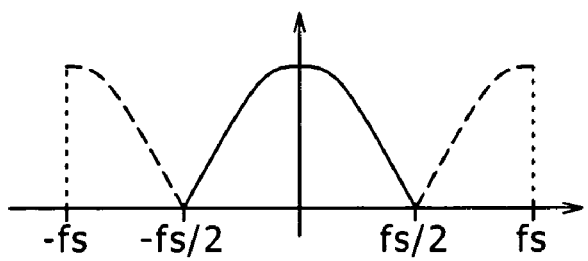

FIG. 4B illustrates a frequency characteristic of the input image after the zero-value interpolation.

In FIG. 4B, a solid line curve represents signal components, and broken line curves represent aliasing components.

In the image obtained by zero-value interpolation of an input image which does not include aliasing components (an image obtained by such zero-value interpolation is hereinafter referred to as zero-value interpolation image), signal components exist within the frequency band from −fs/2 to fs/2 within which the absolute value of any frequency is lower than the Nyquist frequency fs/2 as seen in FIG. 4B. Further, aliasing components exist within frequency ranges from −fs/2 to −fs and from fs/2 to fs which exceed the Nyquist frequency fs/2.

In order to obtain an expanded image which includes no aliasing component, it is necessary to extract signal components, that is, to remove aliasing components. Accordingly, if a LPF whose pass-band is the frequency band from −fs/2 to fs/2 lower than the Nyquist frequency fs/2 of the input image is applied to the zero-value interpolation image, then an expanded image which includes no aliasing component can be obtained.

Figure 4C:
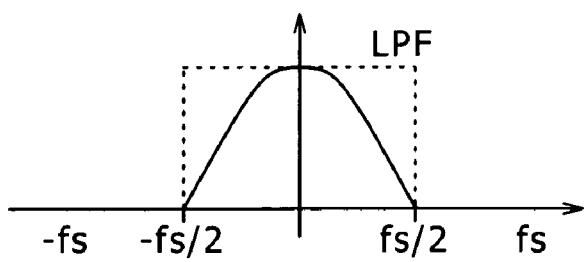

FIG. 4C illustrates a frequency characteristic of the expanded image obtained by applying a LPF whose pass-band is the frequency band from −fs/2 to fs/2 lower than the Nyquist frequency fs/2 to the zero-value interpolation image.

It is to be noted that, although a LPF whose pass-band is the frequency band from −fs/2 to fs/2 lower than the Nyquist frequency fs/2 ideally is a filter which uses the sinc function, that is, a filter whose filter coefficient is given by a function value of the sinc function, the ideal filter has an infinitely long tap length or infinitely great tap number. Therefore, actually a LPF whose tap number is limited by applying a window function to the sinc function is used.

In order to simplify the description, it is assumed that a LPF having filter coefficients $\{1/4, 1/2, 1/4\}$ is used as the LPF.

Here, a filter whose filter coefficients are $\{a, b, c\}$ signifies, for example, a filter, that is, a finite impulse response (FIR) filter, whose filtering result of a pixel at a position t in a list $(y(t-1), y(t), y(t+1))$ of pixel values of three pixels is represented by an expression: $a \times y(t-1) + b \times y(t) + c \times y(t+1)$.

In a list $(2y(0), 0, 2y(1), 0, 2y(2), 0, 2y(3))$ of pixel values of seven pixels in a zero-value interpolation image, the pixel value of the pixel at the position whose pixel value is $2y(1)$ after filtering by the filter whose filter coefficients are $\{1/4, 1/2, 1/4\}$ is $1/4 \times 0 + 1/2 \times 2y(1) + 1/4 \times 0 = y(1)$.

Meanwhile, the pixel value of the zero-value point, that is, the pixel whose pixel value is 0, between the pixels of the pixel values $2y(1)$ and $2y(2)$ after the filtering is $1/4 \times 2y(1) + 1/2 \times 0 + 1/4 \times 2y(2) = (y(1)+y(2))/2$.

By determining the remaining pixel values after the filtering in a similar manner, the list of pixel values after the filtering of the list $(2y(0), 0, 2y(1), 0, 2y(2), 0, 2y(3))$ of the pixel values of the seven pixels becomes $(y(0), (y(0)+y(1))/2, y(1), (y(1)+y(2))/2, y(2), (y(2)+y(3))/2, y(3))$.

The list $(y(0), (y(0)+y(1))/2, y(1), (y(1)+y(2))/2, y(2), (y(2)+y(3))/2, y(3))$ of the pixel values after the filtering is equal to a result of interpolation called linear interpolation applied to the list $(y(0), y(1), y(2), y(3))$ of the pixel values of the input image. Accordingly, it can be recognized that, with the pixel values after the filtering, that is, with the expanded image, the signal components of the input image are reproduced.

In this manner, where an input image does not include any aliasing component, an expanded image which has a size or a pixel number increased to twice that of the input image and does not include any aliasing component while signal components of the input image are reproduced can be obtained by carrying out zero-value interpolation of inserting one new pixel whose pixel value is 0 into a position between each adjacent pixels of the input image and carrying out an expansion process of applying a LPF, whose pass-band is the frequency band from −fs/2 to fs/2 lower than the Nyquist frequency fs/2, to a zero-value interpolation image obtained by the zero-value interpolation.

However, even if an expansion process is applied to an input image which includes no aliasing component, the resolution may not be improved, or in other words, an expanded image which includes signal components of frequencies exceeding the Nyquist frequency fs/2 may not be obtained.

Figure 4D:
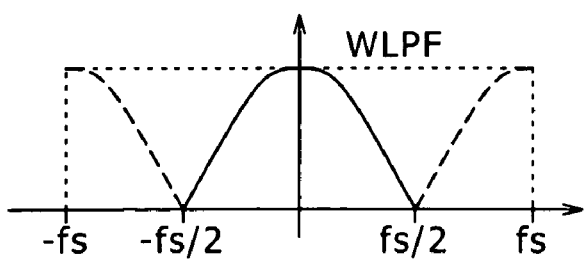

FIG. 4D illustrates a frequency characteristic of an expanded image obtained by applying a LPF, that is, a wideband LPF (WLPF), of a wide band exceeding the Nyquist frequency fs/2 to the zero-value interpolation image.

If a wideband LPF is applied to a zero-value interpolation image of an input image which includes no aliasing component, aliasing components are not removed, and the expanded image (FIG. 4D) becomes the zero-value interpolation image (FIG. 4B), that is, an image which exhibits deteriorated picture quality (by appearances) in that it includes dark stripe patterns by an influence of one zero-value point inserted between each adjacent pixels.

Now, an expansion process of increasing the number of pixels of an input image, which includes no aliasing component, in a certain one direction such as a vertical direction, for example, to four times the original pixel number is described.

Also the expansion process of increasing the number of pixels of an input image, which includes no aliasing component, in a certain one direction such as a vertical direction to four times the original pixel number can be carried out in a similar manner as in the expansion process to twice described hereinabove with reference to FIGS. 4A to 4D.

FIGS. 5A to 5D illustrate an expansion process of increasing the number of pixels of an input image, which includes no aliasing component, in a certain one direction such as a vertical direction to four times the original pixel number.

If it is assumed now that the sampling frequency of an input image in a certain one direction such as a vertical direction is a frequency fs, then the input image which does not include any aliasing component includes signal components in the one direction only within the range of the frequency band from −fs/2 to fs/2.

Figure 5A:
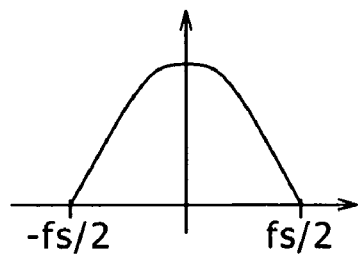
FIGS. 5A to 5D are diagrammatic views illustrating an expansion process of increasing the number of pixels in the vertical direction of an input image, which does not include aliasing components, to four times that of the original pixel number.

FIG. 5A illustrates a frequency characteristic of an input image which includes no aliasing component and includes signal components only within the range of the frequency band from −fs/2 to fs/2 similarly as in the frequency characteristic of FIG. 4A.

Now, if the pixel values of four pixels juxtaposed successively are represented by y(0), y(1), y(2) and y(3) similarly as in the case of FIG. 4A, then in order to increase the number of pixels of the input image to four times, zero-value interpolation of inserting three new pixels or zero-value points whose pixel value is 0 between each adjacent pixels.

It is to be noted that, in the zero-value interpolation, the original pixel values are adjusted so that the average value of the pixel values may not vary between those before and after the zero-value interpolation. In the present case, since the number of pixels is increased to four times, in the zero-value interpolation, the original pixel values are increased to four times. As a result, the list of the pixel values of the four pixels which is (y(0), y(1), y(2), y(3)) is converted into a list of pixel values of 13 pixels which is (4y(0), 0, 0, 0, 4y(1), 0, 0, 0, 4y(2), 0, 0, 0, 4y(3)).

The zero-value interpolation of inserting three zero-value points between each adjacent pixels is equivalent to increase of the sampling frequency of the input signal to a frequency 4fs which is four times the original sampling frequency fs. Although the signal components of the input signal do not vary between those before and after the zero-value interpolation, if the frequency 4fs which is four times the original sampling frequency fs is used as a new sampling frequency after the zero-value interpolation, then it looks that aliasing components are generated in the frequency band from −2fs to 2fs which corresponds to the new sampling frequency 4fs.

Figure 5B:
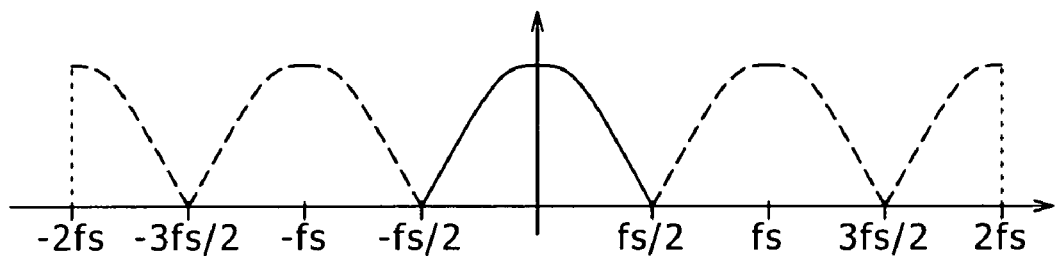

FIG. 5B illustrates a frequency characteristic of the input image after the zero-value interpolation.

In FIG. 5B, a solid line curve represents signal components, and broken line curves represent aliasing components.

In the zero-value interpolation image obtained by zero-value interpolation of an input image which does not include aliasing components, signal components exist within the frequency band from −fs/2 to fs/2 lower than the Nyquist frequency fs/2 as seen in FIG. 5B. Further, aliasing components exist within frequency ranges from −fs/2 to −2fs and from fs/2 to 2fs which exceed the Nyquist frequency fs/2.

From the zero-value interpolation image of FIG. 5B, an expanded image which includes no aliasing component can be obtained by applying a LPF whose pass-band is the frequency band from −fs/2 to fs/2 lower than the Nyquist frequency fs/2 of the input image to the zero-value interpolation image similarly as in the case of FIG. 4B.

Figure 5C:
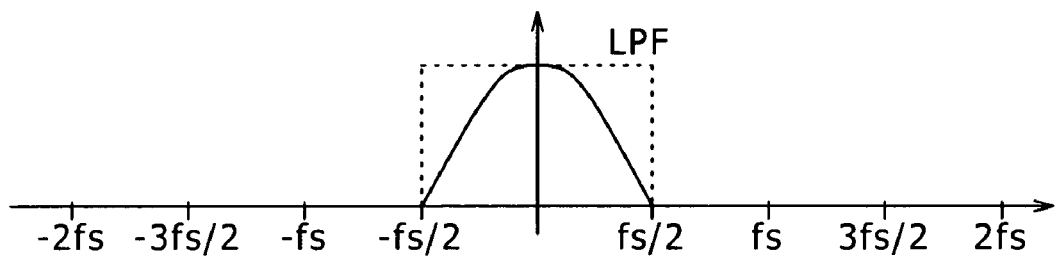

FIG. 5C illustrates a frequency characteristic of the expanded image obtained by applying a LPF whose pass-band is the frequency band from −fs/2 to fs/2 lower than the Nyquist frequency fs/2 to the zero-value interpolation image.

In this manner, where an input image does not include any aliasing component, an expanded image which has a size increased to four times that of the input image and does not include any aliasing component while signal components of the input image are reproduced can be obtained by carrying out zero-value interpolation of inserting three zero-value points between each adjacent pixels of the input image and carrying out an expansion process of applying a LPF, whose pass-band is the frequency band from −fs/2 to fs/2 lower than the Nyquist frequency fs/2, to a zero-value interpolation image obtained by the zero-value interpolation.

However, even if an expansion process is applied to an input image which includes no aliasing component, the resolution may not be improved similarly as in the case of FIGS. 4A to 4D.

Figure 5D:
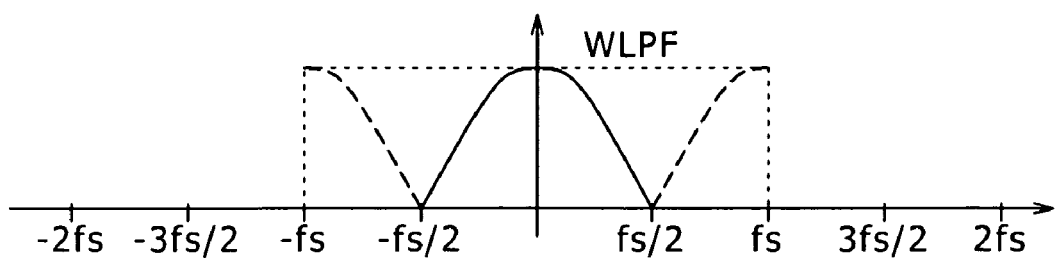

FIG. 5D illustrates a frequency characteristic of an expanded image obtained by applying a wideband LPF whose pass-band is a wide frequency band from −fs to fs exceeding the Nyquist frequency fs/2 to the zero-value interpolation image.

If a wideband LPF is applied to a zero-value interpolation image of an input image which includes no aliasing component, then aliasing components are not removed, and the expanded image (FIG. 5D) still becomes an image which exhibits deteriorated picture quality similarly as in the case of FIGS. 4A to 4D.

Now, an expansion process of increasing the number of pixels of an input image, which includes aliasing components, in a certain one direction such as a vertical direction to twice the original number of pixels is described.

An example of the input image which includes aliasing components is an interlaced image of a television broadcast and can be produced by removing every other one of lines, that is, horizontal lines, of an image which does not include aliasing components.

FIGS. 6A to 6D illustrate an expansion process of increasing the number of pixels of an input image, which includes aliasing components, in a certain one direction such as a vertical direction to twice the original pixel number.

Now, if it is assumed that the sampling frequency of an input image in a certain one direction such as a vertical direction is a frequency fs, then if the input image includes aliasing components, then signal components within the range of the frequency band from −fs/2 to fs/2 in the one direction exist as they are and signal components within ranges of frequency bands whose absolute values exceed the frequency band of −fs/2 to fs/2 exist as aliasing components within the frequency band of −fs/2 to fs/2.

Figure 6A:
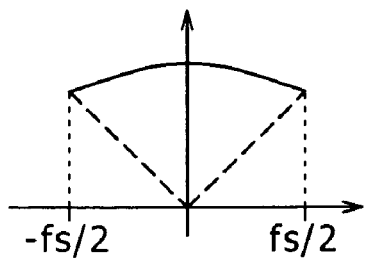
FIGS. 6A to 6D are diagrammatic views illustrating an expansion process of increasing the number of pixels in the vertical direction of an input image, which includes aliasing components, to twice that of the original pixel number.

FIG. 6A illustrates a frequency characteristic of an input image which includes aliasing components.

For example, if an image having signal components only within the range of the frequency band from −fs to fs is sampled with the sampling frequency fs, then an input image having the frequency characteristic of FIG. 6A can be obtained.

In the input image of FIG. 6A, signal components indicated by a solid line curve within the frequency band from −fs/2 to fs/2 exist as they are, and signal components within the frequency bands from −fs/2 to −fs and from fs/2 to fs exist as aliasing components indicated by a broken line curve within the frequency band from −fs/2 to fs/2.

Accordingly, in an input image which includes aliasing components, signal components and aliasing components exist within the frequency band from −fs/2 to fs/2.

If the pixel values of pixels of an input image, which includes aliasing components, juxtaposed successively in one direction such as, for example, a vertical direction are represented as y(0), y(1), y(2) and y(3) similarly as in the case of FIGS. 4A to 4D, then in order to increase the number of pixels of the input image in the vertical direction to twice, zero-value interpolation of inserting one zero-value point between each adjacent pixels is carried out similarly as in the case of FIGS. 4A to 4D.

It is to be noted that, in the zero-value interpolation, the original pixel values are adjusted so that the average value of the pixel value may not vary after the zero-value interpolation. In the present case, since the pixel number is doubled, the original pixel values are doubled in the zero-value interpolation, and as a result, the list of the pixel values of the four pixels, that is, y(0), y(1), y(2), y(3), is converted into another list of the pixel values of seven pixels, that is, (2y(0), 0, 2y(1), 0, 2y(2), 0, 2y(3)).

The zero-value interpolation of inserting one zero-value point between each adjacent pixels is equivalent to increase of the sampling frequency of the input image to the frequency 2fs which is twice the original sampling frequency fs. Although the signal components over the overall frequency band from −fs to fs are reproduced on the image after the zero-value interpolation, that is, on the zero-value interpolation image, also aliasing components are reproduced. In other words, signal components and aliasing components exist in a mixed state within the frequency band from −fs to fs.

Figure 6B:
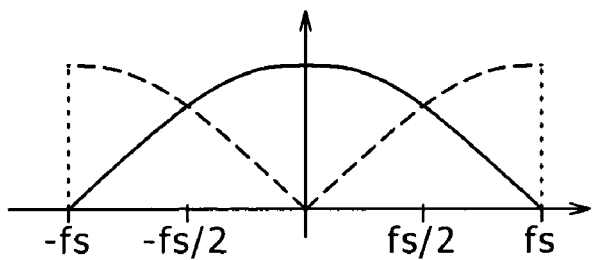

FIG. 6B illustrates a frequency characteristic of the input image after the zero-value interpolation, that is, of the zero-value interpolation image.

In FIG. 6B, a solid line curve represents signal components, and broken line curves represent aliasing components.

Similarly as in the case of FIGS. 4A to 4D, an expanded image wherein aliasing components are reduced or attenuated can be obtained by applying a LPF whose pass-band is the frequency band from −fs/2 to fs/2 lower than the Nyquist frequency fs/2 to the zero-value interpolation image.

Figure 6C:
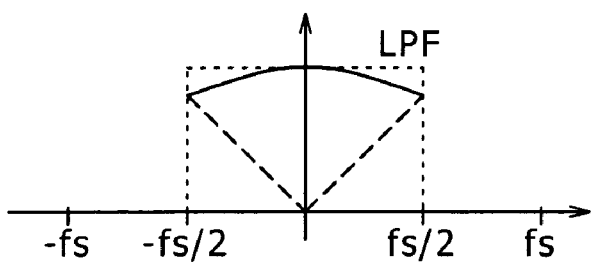

FIG. 6C illustrates a frequency characteristic of the expanded image obtained by applying a LPF whose pass-band is the frequency band from −fs/2 to fs/2 lower than the Nyquist frequency fs/2 to the zero-value interpolation image.

By applying a LPF whose pass-band is the frequency band from −fs/2 to fs/2 lower than the Nyquist frequency fs/2 to the zero-value interpolation image, aliasing components within the high frequency regions from −fs/2 to −fs and from fs/2 to fs can be attenuated. However, in this instance, also the signal components in the high frequency regions from −fs/2 to −fs and from fs/2 to fs are attenuated.

Even if an expansion process of applying a LPF whose pass-band is the frequency band from −fs/2 to fs/2 lower than the Nyquist frequency fs/2 is carried out for a zero-value interpolation image of an input image which includes aliasing components, high frequency components, that is, signal components within the high frequency regions from −fs/2 to −fs and from fs/2 to fs, may not be reproduced in such a manner as described above. Also it is impossible to remove or attenuate the aliasing components within the low frequency region from −fs/2 to fs/2.

Here, if a LPF having filter coefficients of, for example, {¼, ½, ¼} is adopted as the LPF whose pass-band is the frequency band from −fs/2 to fs/2 lower than the Nyquist frequency fs/2, then an expanded image obtained as a result of filtering of the zero-value interpolation image by the LPF is equal to that which is obtained by linear interpolation of the input image as described hereinabove with reference to FIGS. 4A to 4D.

If an interlaced image having aliasing components is linearly interpolated, then jaggy occurs with an oblique line, and this arises from the aliasing components. From a linear interpolation image obtained by linear interpolation of an interlaced image which has aliasing components, the aliasing components can be removed by weighted addition of a plurality of linear interpolation images with the weighting adjusted.

Accordingly, also from an expanded image obtained as a result of filtering of a zero-value interpolation image by means of a LPF, the aliasing components included therein can be removed by weighted addition of a plurality of expanded images, that is, a plurality of expanded images obtained from a plurality of input images.

However, since signal components in a high frequency region have been removed by filtering of a zero-value interpolation image by a LPF, they may not be reproduced.

Therefore, in the expansion process of an input image which includes aliasing components, filtering of a zero-value interpolation image is carried out using not a LPF whose pass-band is the frequency region from −fs/2 to fs/2 lower than the Nyquist frequency fs/2 but a wideband LPF having a wider frequency band as the pass-band thereof.

Figure 6D:
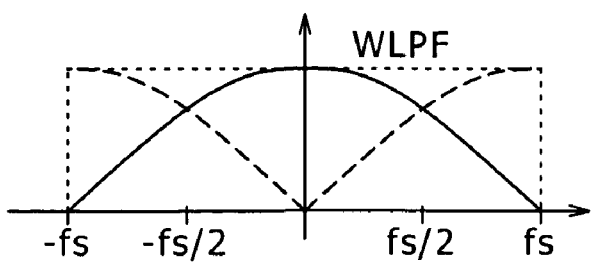

FIG. 6D illustrates a frequency characteristic of an expanded image obtained by applying a wideband LPF to the zero-value interpolation image.

The wideband LPF passes the frequency band from −fs to fs which is equal to twice the Nyquist frequency fs/2 therethrough and ideally is a filter which uses the sinc function.

A filter which passes the frequency band from −fs to fs of a zero-value interpolation image whose sampling frequency is 2fs is an allpass filter which passes all frequency components of the zero-value interpolation image therethrough.

Accordingly, an expanded image obtained by applying a wideband LPF to a zero-value interpolation image is the zero-value interpolation image, and the zero-value interpolation image can be adopted as it is. It is to be noted that the expanded image which is a zero-value interpolation image in this instance is deteriorated in picture quality in that dark stripe patterns exist therein by an influence of one zero-value point inserted between each adjacent pixels.

Although the expanded image obtained by application of the wideband LPF includes aliasing components, it includes also signal components in the high frequency region as seen in FIG. 6D.

Accordingly, by weighted adding a plurality of expanded images to remove aliasing components included in the expanded images, it is possible to obtain an image of a high resolution in which not only signal components in the low frequency region but also signal components in the high frequency region are reproduced, that is, to carry out resolution enhancement of the input images.

Also an expansion process of increasing the number of pixels of an input image having aliasing components in a certain one direction such as a vertical direction, for example, to four times the original pixel number can be carried out similarly as in the case described hereinabove with reference to FIGS. 6A to 6D.

FIGS. 7A to 7D illustrate an expansion process of increasing the number of pixels of an input image which includes aliasing components in a certain one direction such as a vertical direction to four times the original pixel number.

If it is assumed that the sampling frequency of an input image in a certain one direction such as, for example, in a vertical direction is a frequency fs, then in the input image where it includes aliasing components, signal components within the frequency region from −fs/2 to fs/2 exist as they are in the one direction while signal components in the regions exceeding the frequency region from −fs/2 to fs/2 exist as aliasing components within the frequency band from −fs/2 to fs/2.

Figure 7A:
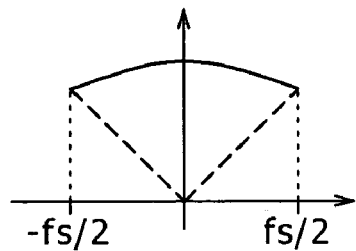
FIGS. 7A to 7D are diagrammatic views illustrating an expansion process of increasing the number of pixels in the vertical direction of an input image, which includes aliasing components, to four times that of the original pixel number.

FIG. 7A illustrates a frequency characteristic of an input image which includes aliasing components. Similarly as in the case of FIG. 6A, signal components indicated by a solid line curve and aliasing components indicated by a broken line curve exist within the frequency band from −fs/2 to fs/2.

If the pixel values of pixels of an input image, which includes aliasing components, juxtaposed successively in one direction such as, for example, a vertical direction are represented as y(0), y(1), y(2) and y(3) similarly as in the case of FIGS. 4A to 4D, then in order to increase the number of pixels of the input image in the vertical direction to four times, zero-value interpolation of inserting three zero-value points between each adjacent pixels is carried out similarly as in the case of FIGS. 5A to 5D.

It is to be noted that, in the zero-value interpolation, the original pixel values are adjusted so that the average value of the pixel value may not vary after the zero-value interpolation. As a result, the list of the pixel values of the four pixels, that is, y(0), y(1), y(2), y(3), is converted into another list of the pixel values of thirteen pixels, that is, (4y(0), 0, 0, 0, 4y(1), 0, 0, 0, 4y(2), 0, 0, 0, 4y(3)).

The zero-value interpolation of inserting three zero-value points between each adjacent pixels is equivalent to increase of the sampling frequency of the input image to the frequency 4fs which is four times the original sampling frequency fs. Although the signal components over the overall frequency band from −2fs to 2fs are reproduced on the image after the zero-value interpolations, that is, on the zero-value interpolation image, also aliasing components are reproduced. In other words, signal components and aliasing components exist in a mixed state within the frequency band from −2fs to 2fs.

Figure 7B:
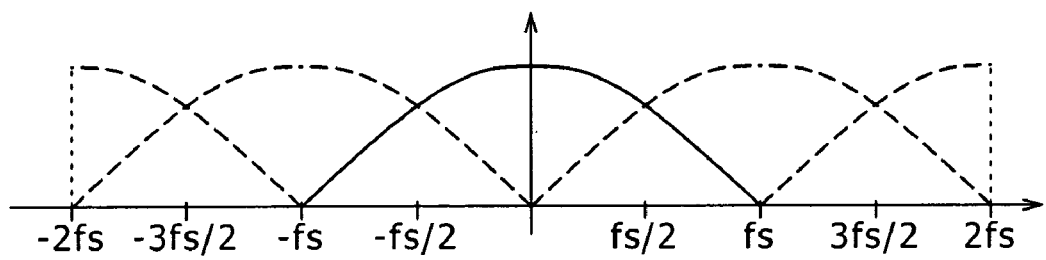

FIG. 7B illustrates a frequency characteristic of the input image after the zero-value interpolation, that is, the zero-value interpolation image.

In FIG. 7B, a solid line curve represents signal components, and broken line curves represent aliasing components.

An expanded image wherein aliasing components are attenuated can be obtained by applying a LPF whose pass-band is the frequency band from −fs/2 to fs/2 lower than the Nyquist frequency fs/2 to the zero-value interpolation image.

Figure 7C:
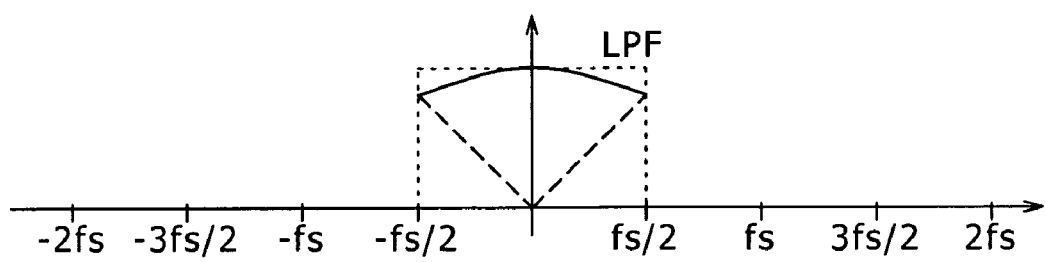

FIG. 7C illustrates a frequency characteristic of the expanded image obtained by applying a LPF whose pass-band is the frequency band from −fs/2 to fs/2 lower than the Nyquist frequency fs/2 to the zero-value interpolation image.

By applying a LPF whose pass-band is the frequency band from −fs/2 to fs/2 lower than the Nyquist frequency fs/2 to the zero-value interpolation image, aliasing components within the high frequency regions from −fs/2 to −2fs and from fs/2 to 2fs can be attenuated. However, in this instance, also the signal components in the high frequency regions from −fs/2 to −fs and from fs/2 to fs are attenuated.

Therefore, in an expansion process of an input image which includes aliasing components, filtering of a zero-value interpolation image is carried out using not a LPF whose pass-band is the frequency region from −fs/2 to fs/2 lower than the Nyquist frequency fs/2 but a wideband LPF as described hereinabove with reference to FIGS. 6A to 6D.

Figure 7D:
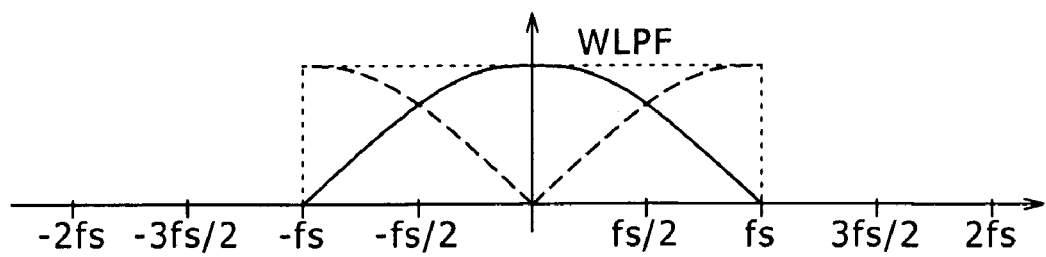

FIG. 7D illustrates a frequency characteristic of an expanded image obtained by applying a wideband LPF to the zero-value interpolation image.

Although the wideband LPF ideally is a filter which uses the sinc function as described hereinabove with reference to FIGS. 6A to 6D, if it is assumed that a LPF having filter coefficients {¼, ½, ¼} is uses as the LPF in order to simplify the description, then the list of pixel values after filtering of the list of pixel values of 13 pixels which is (4y(0), 0, 0, 0, 4y(1), 0, 0, 0, 4y(2), 0, 0, 0, 4y(3)) is (2y(0), y(0), 0, y(1), 2y(1), y(1), 0, y(2), 2y(2), y(2), 0, y(3), 2y(3)).

Accordingly, an expanded image obtained by applying a wideband LPF to a zero-value interpolation image is deteriorated in picture quality in that dark stripe patterns exist therein by an influence of zero-value points inserted by the zero-value interpolation.

Although an expanded image obtained by application of a wideband LPF includes aliasing components, it includes also signal components in a high frequency region as seen in FIG. 7D.

Accordingly, by weighted adding a plurality of expanded images to remove aliasing components included in the expanded images, it is possible to obtain an image of a high resolution in which not only signal components in the low frequency region but also signal components in the high frequency region are reproduced, that is, to carry out resolution enhancement of the input images.

As described above, resolution enhancement of an input image which includes aliasing components can be carried out making use of an expansion process of carrying out zero-value interpolation of inserting zero-value points into the input image and applying a wideband LPF to a zero-value interpolation image obtained by the zero-value interpolation, that is, filtering the zero-value interpolation image by the wideband LPF. The existing resolution enhancement technique disclosed in Patent Document 1 and so forth mentioned hereinabove makes use of this expansion process.

However, an expanded image obtained by application of a wideband LPF to a zero-value interpolation image is deteriorated in picture quality in that dark stripe patterns are included therein as described hereinabove.

In particular, where an input image including aliasing components has the aliasing components, for example, in one direction of a vertical direction, an expanded image obtained by applying a wideband LPF to a zero-value interpolation image obtained by carrying out zero-value interpolation of inserting zero-value points between each adjacent pixels in the vertical direction includes dark lateral stripes, that is, dark stripe patterns in the horizontal direction.

On the other hand, where an input image including aliasing components has aliasing components in two directions of a vertical direction and a horizontal direction, for example, like an image which is composed only of red pixels of a Bayer array, an expanded image obtained by applying a wideband LPF to a zero-value interpolation image obtained by carrying out zero-value interpolation of inserting a zero-value point between each adjacent pixels in the vertical direction and between each adjacent pixels in the horizontal direction includes dark striped patterns in both of the horizontal direction and the vertical direction.

Where images of a considerable number of frames are inputted as successive input images picked up at a high speed, an image of a high resolution wherein aliasing components are attenuated can be obtained by the existing resolution enhancement technique.

However, where only a small number of images are inputted as input images, extremely where only one image is inputted, an image obtained by the existing resolution enhancement technique is an expanded image itself which is obtained by application of a wideband LPF to a zero-value interpolation image, that is, an image which includes dark striped patterns and is deteriorated in picture quality. It is not desirable to provide such an image which includes dark stripe patters as just described to a user.

Thus, as another expansion process, a method of carrying out linear interpolation or nearest neighbor interpolation or else some other interpolation which uses peripheral pixels of an input image to produce an image having no dark striped pattern as an expanded image is available.

However, to carry out linear interpolation as an expansion process is equivalent to application of a LPF whose band-pass is the frequency band from $-fs/2$ to $fs/2$ lower than the Nyquist frequency $fs/2$ to a zero-value interpolation image as described hereinabove with reference to FIGS. 4A to 4D. In this instance, since signal components in a high frequency region are attenuated by application of the LPF to the zero-value interpolation image as described hereinabove with reference to FIG. 6C, whatever number of expanded images wherein signal components in such a high frequency region as mentioned above are attenuated are used to carry out weighted addition, the signal components in the high frequency region may not be reproduced.

This similarly applies also to a case wherein nearest neighbor interpolation or some other interpolation which uses peripheral pixels of an input image is used as the expansion process.

In particular, for example, in the nearest neighbor interpolation, as a pixel value of a pixel at a position at which a pixel value is to be interpolated, a pixel value of a pixel which is positioned nearest to the position of the pixel is interpolated.

In particular, if it is assumed that, for example, a list of pixel values of four pixels of an input image, which includes aliasing components, juxtaposed successively in one direction, for example, in a vertical direction is $(y(0), y(1), y(2), y(3))$, then nearest neighbor interpolation of increasing the number of pixels to twice converts the list of the pixel values of four pixels, that is, $(y(0), y(1), y(2), y(3))$, into another list of eight pixel values, that is, $(y(0), y(0), y(1), y(1), y(2), y(2), y(3), y(3))$.

This nearest neighbor interpolation can be carried out by an expansion process similar to that described hereinabove with reference to FIGS. 4A to 4D and 5A to 5D, that is, by zero-value interpolation and filtering by a LPF.

In particular, in order to increase the number of pixels of an input image in a vertical direction to twice, zero-value interpolation of inserting one zero-value point between every two pixels adjacent each other in the vertical direction is carried out.

By the zero-value interpolation, the original pixel values are doubled so that the average value of the pixel value may not vary after the zero-value interpolation. Accordingly, the list of the pixel values of four pixels, that is, $(y(0), y(1), y(2), y(3))$, is converted into another list of pixel values of seven pixels, that is, $(2y(0), 0, 2y(1), 0, 2y(2), 0, 2y(3))$.

Where the nearest neighbor interpolation is carried out as the expansion process, a LPF having filter coefficients of $\{½, ½, 0\}$ is applied to the list $(2y(0), 0, 2y(1), 0, 2y(2), 0, 2y(3))$ of the pixel values of seven pixels. If the LPF having the filter coefficients of $\{½, ½, 0\}$ is applied to the list $\{2y(0), 0, 2y(1), 0, 2y(2), 0, 2y(3)\}$ of the pixel values of seven pixels, then a list of pixel values of seven pixels, that is, $(y(0), y(0), y(1), y(1), y(2), y(2), y(3), y(3))$, is obtained.

The LPF having the filter coefficients of $\{½, ½, 0\}$ is a filter which displaces the positions of the pixels of an original image by a one-half pixel distance, that is, by one half the distance between adjacent pixels. This filter has a characteristic that, for the frequency band from $-fs$ to $fs$ corresponding to the sampling frequency of $2fs$, the gain when the frequency is 0 is 1, but the gain when the frequency is the maximum frequency $fs$ or $-fs$ is 0.

Therefore, in an expanded image obtained by applying a LPF having the filter coefficients of $\{½, ½, 0\}$ to a zero-value interpolation image, signal components in a high frequency region, particularly high frequency components having frequencies proximate to $fs$ and $-fs$, are attenuated.

Accordingly, where the nearest neighbor interpolation is carried out as the expansion process, the existing resolution enhancement technique carries out weighted addition of expanded images wherein signal components in the high frequency region are attenuated.

Also where the nearest neighbor interpolation of a magnification exceeding twice is carried out as the expansion process, the circumstance is same as that where the nearest neighbor interpolation of twice is carried out.

For example, to carry out nearest neighbor interpolation of four times as the expansion process is equivalent to application of a LPF having filter coefficients of $\{¼, ¼, ¼, ¼, 0\}$ to a zero-value interpolation image obtained by carrying out zero-value interpolation of inserting three zero-value points between each adjacent pixels.

The LPF having the frequency coefficients of $\{¼, ¼, ¼, ¼, 0\}$ has a characteristic that, for the frequency band from $-2fs$ to $2fs$ corresponding to the sampling frequency of $4fs$, the gain when the frequency is 0 is 1, but the gain when the frequency is the maximum frequency $2fs$ and $-2fx$ and the middle frequency $fs$ and $-fs$ is 0.

Therefore, in an expanded image obtained by application of the LPF having the filter coefficients of $\{¼, ¼, ¼, ¼, 0\}$ to a zero-value interpolation image, signal components in a high frequency region, particularly high frequency components whose frequency is in the proximity of $fs$ and $-fs$, are attenuated.

Accordingly, even if, in order to extract, from an expanded image obtained by application of a LPF having the filter coefficients of $\{¼, ¼, ¼, ¼, 0\}$ to a zero-value interpolation image, a frequency band from $-fs$ to $fs$ corresponding to a frequency $fs$ equal to twice the Nyquist frequency $fs/2$, the expanded image is filtered by a wideband LPF whose passband is the frequency band from $-fs$ to $fs$, in an expanded image obtained as a result of the filtering, signal components in the high frequency band, that is, high frequency components having frequencies proximate to $fs$ and $-fs$ remain in an attenuated state.

Accordingly, even where the nearest neighbor interpolation of four times is carried out as the expansion process, the existing resolution enhancement technique carries out weighted addition of expanded images wherein signal components in the high frequency region are attenuated.

Figure 8A:
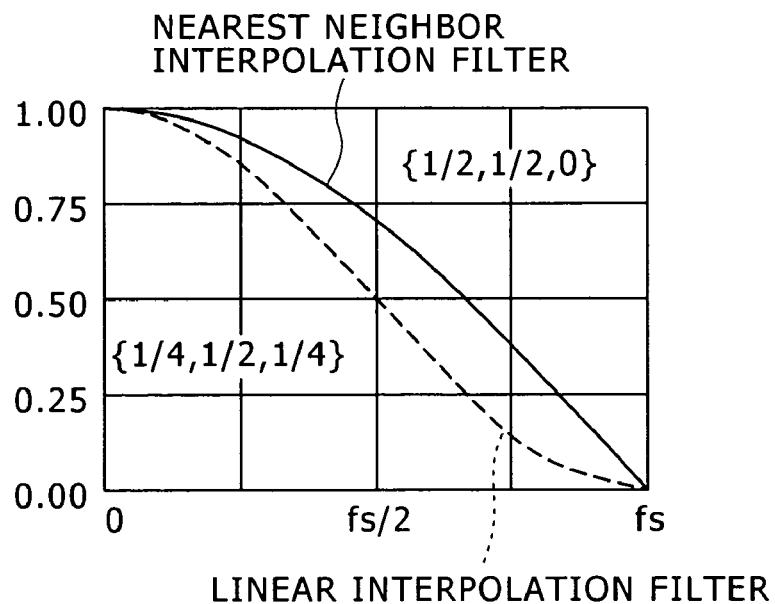
FIGS. 8A and 8B are diagrammatic views illustrating filter characteristics of filters for carrying out nearest neighbor interpolation.
Figure 8B:
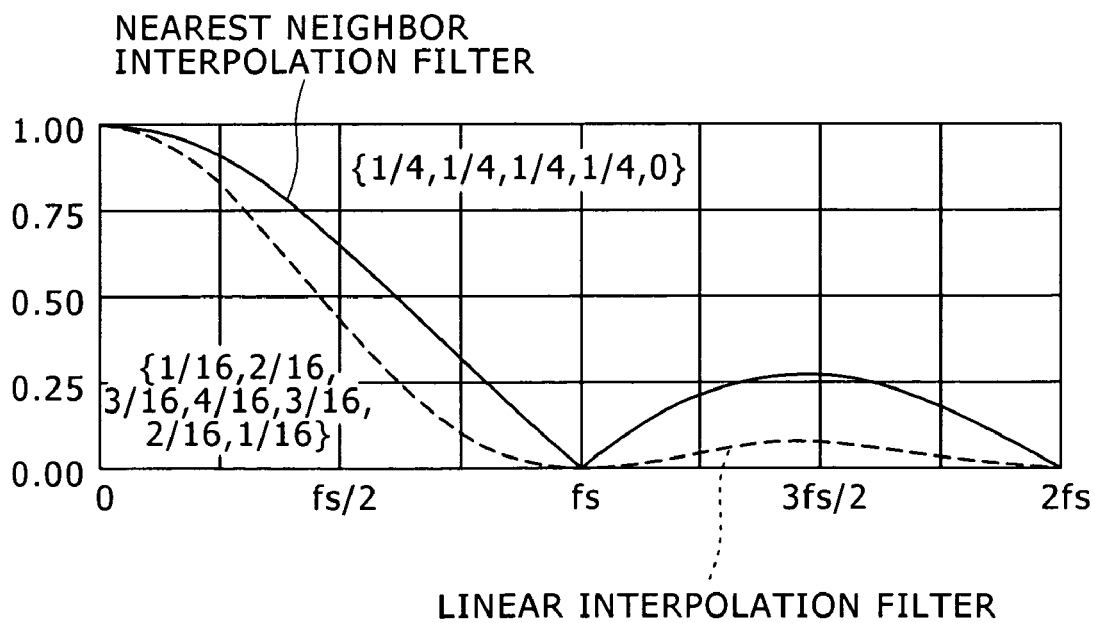

FIGS. 8A and 8B illustrate characteristics, in particular, frequency characteristics, of a filter where the nearest neighbor interpolation is carried out as the expansion process.

In particular, FIG. 8A illustrates a characteristic of a LPF, that is, a nearest neighbor interpolation filter, having the filter coefficients of $\{1/2, 1/2, 0\}$ for carrying out the nearest neighbor interpolation of twice, and FIG. 8B illustrates a characteristic of another LPF which has the filter coefficients of $\{1/4, 1/4, 1/4, 1/4, 0\}$ for carrying out the nearest neighbor interpolation of four times.

It is to be noted that FIG. 8A illustrates also a characteristic of a LPF, that is, a linear interpolation filter, having the filter coefficients of $\{1/4, 1/2, 1/4\}$ for carrying out linear interpolation of twice. Further, FIG. 8B illustrates also a characteristic of a LPF having the filter coefficients of $\{1/16, 2/16, 3/16, 4/16, 3/16, 2/16, 1/16\}$ for carrying out linear interpolation of four times.

Since the existing resolution enhancement technique carries out an expansion process of applying a wideband LPF to a zero-value interpolation image as described above, if the number of input images is small, for example, one, then an image whose picture quality is deteriorated in that dark striped patterns are included is obtained.

Further, where linear interpolation or nearest neighbor interpolation is adopted as the expansion process, whatever number of input images are used, weighted addition fails to (sufficiently) restore signal components in a high frequency region, and (sufficient) resolution enhancement may not be achieved.

Therefore, the image processing apparatus of FIG. 2 carries out a resolution enhancement process which can achieve flexible resolution enhancement of images without depending upon the number of input images.

In other words, according to the resolution enhancement process of the image processing apparatus of FIG. 2, where the number of input images is small, for example, one, an image which does not include dark striped patterns and maintains somewhat high picture quality although the resolution is not high is produced, and as the number of input images increases, an image of a higher resolution and higher picture quality is produced.

In the following, particular embodiments of the present invention applied to the image processing apparatus of FIG. 2 are described.

First Embodiment

Figure 9:
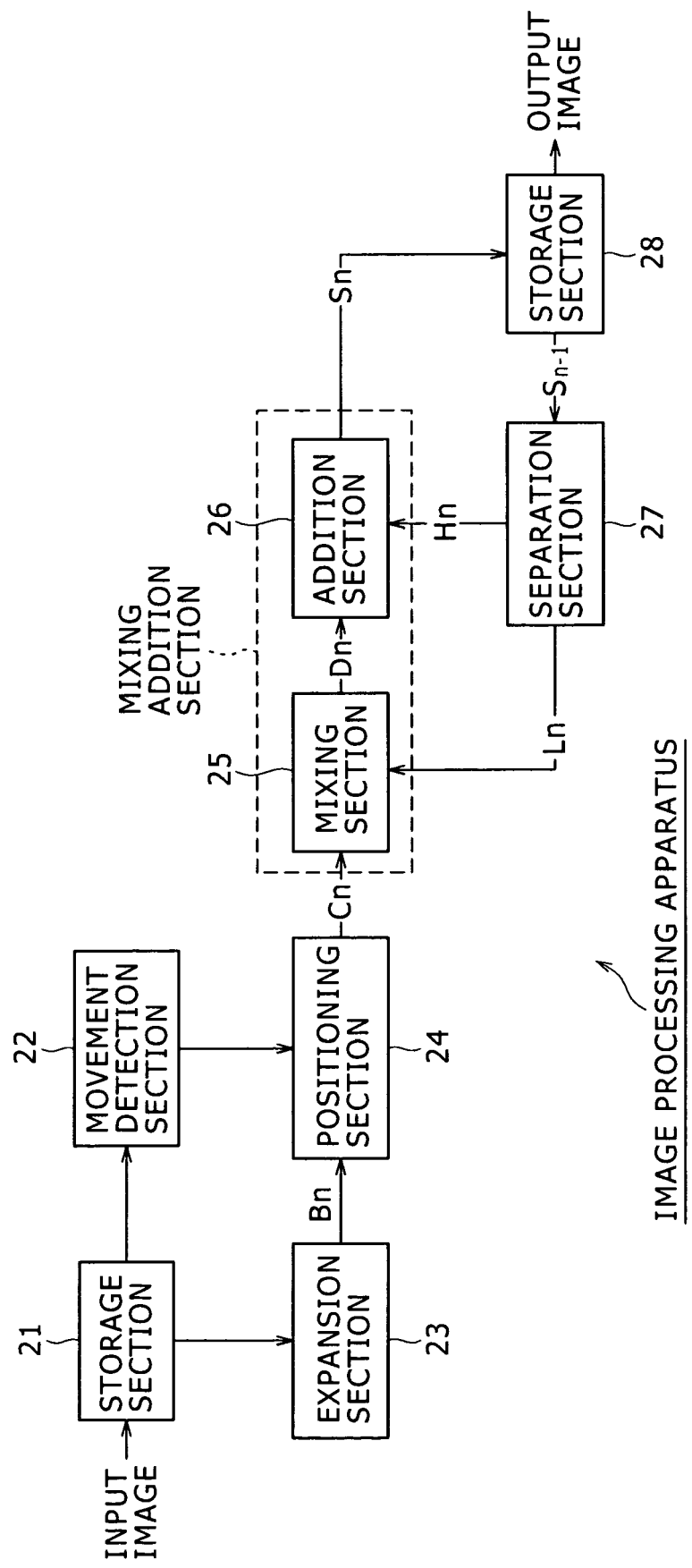
FIG. 9 is a block diagram showing an example of a configuration of the image processing apparatus of FIG. 2 according to a first embodiment of the present invention.

FIG. 9 shows an example of a configuration of the image processing apparatus of FIG. 2 according to a first embodiment of the present invention.

The image processing apparatus of FIG. 9 receives an image including aliasing components, for example, in one direction, that is, an image including one-dimensional aliasing components, as an input image to carry out a resolution enhancement process wherein expanded images obtained by expanding input images of more than one frame to twice are used.

An example of the input image which includes aliasing components in one direction is an interlaced image obtained, for example, by removing every other one of lines of an image which does not include aliasing components.

Further, it is assumed that, in the first embodiment, an input image is a still picture which includes only an image pickup object which exhibits no or little movement and more than one frame of such an input image are picked up and supplied at a high rate to the image processing apparatus.

Referring to FIG. 9, the image processing apparatus includes a storage section 21, a movement detection section 22, an expansion section 23, a positioning section 24, a mixing section 25, an addition section 26, a separation section 27 an a storage section 28.

The storage section 21 corresponds to the storage section 11 shown in FIG. 2. To the storage section 21, input images of more than one frame picked up at a high rate are supplied. The storage section 21 temporarily stores the input images of more than one frame supplied thereto.

The movement detection section 22 determines an input image of a certain one frame from among the input images of more than one frame stored in the storage section 21 as a standard for positioning and detects a motion vector of another input image with respect to the standard, and the supplies the detected motion vector to the positioning section 24.

For the standard input image, for example, the input image of the first frame from among the input images of more than one frame stored in the storage section 21 may be adopted, or alternatively an input image of a frame at or in the proximity of the center in time may be adopted.

In the image processing apparatus shown in FIG. 9 and also in image processing apparatus hereinafter described, an image of a high resolution is obtained by mixture-addition of input images of a plurality of frames picked up at a high rate. The resolution enhancement of an image by the image processing apparatus shown in FIG. 9 is carried out on the condition that the position of an input image sampled from each pixel, that is, the position of an image pickup object, is displaced delicately between different frames by camera shake or the like although this applies also to the existing resolution enhancement technique.

For example, in a case wherein input images of a plurality of frames picked up at a high rate by a digital still camera are to be synthesized to produce an image of a high resolution as one photograph, the number of frames of input images which can be picked up at a high rate for production of such one photogram is, for example, eight.

Then, camera shake while input images of eight frames are picked up at a high rate can be regarded as linear uniform motion. In this instance, if the input image of the fourth frame or the fifth frame in the proximity of the center in time is determined as a standard input image and positioning of the other input images with respect to the standard input image is carried out to carry out synthesis of the input images of eight frames, then the number of pixels which can be used for such synthesis becomes greater at a central portion of the standard input image in comparison with that in an alternative case wherein the input image of the first frame is used as a standard input image. As a result, an image which exhibits a higher resolution at a central portion thereof than that at peripheral portions thereof can be obtained.

It is to be noted that, in the following description, for example, an input image of the first frame from among input images of more than one frame stored in the storage section 21 is used as a standard input image.

The expansion section 23 corresponds to the expansion section 12 shown in FIG. 2. The expansion section 23 successively determines the input images of more than one frame stored in the storage section 11 as a noticed image and carries out an expansion process of expanding the input image determined as the noticed image by interpolation in which peripheral pixel values are used other than zero-value interpolation. Then, the expansion section 23 supplies an expanded image obtained by the expansion process to the positioning section 24.

Here in FIG. 9, the expansion section 23 carries out an expansion process of expanding an input image to twice in a vertical direction in which aliasing components exist. The expansion process may be, for example, such a process of applying a LPF to a zero-value interpolation image obtained by carrying out linear interpolation, that is, zero-value interpolation, as described hereinabove with reference to FIGS. 4A to 4D. It is to be noted that, for the LPF, a LPF which somewhat passes high frequency components exceeding the Nyquist frequency fs/2 therethrough is used.

It is to be noted that an input image of the nth frame from among the input images of more than one frame stored in the storage section 21 is sometimes referred to as input image An, and an expanded image of the input image An is sometimes referred to as expanded image Bn.

The positioning section 24 corresponds to the positioning section 13 shown in FIG. 2. The positioning section 24 carries out positioning of adjusting the position of an expanded image Bn supplied thereto from the expansion section 23 to the position of an output image Sn−1 obtained in the immediately preceding operation cycle and stored in the storage section 28 hereinafter described in accordance with a motion vector supplied thereto from the movement detection section 22. Then, the positioning section 24 supplies a positioned image Cn which is the expanded image Bn after the positioning to the mixing section 25.

The mixing section 25 receives, in addition to the positioned image Cn supplied from the positioning section 24, low frequency components Ln of the output image Sn−1 obtained in the immediately preceding operation cycle and stored in the storage section 28 from the separation section 27.

The mixing section 25 mixes the low frequency components Ln from the separation section 27 into the positioned image Cn from the positioning section 24, that is, into the expanded image Bn after the positioning, and supplies a mixture image Dn obtained by the mixing to the addition section 26.

The mixing of the low frequency components Ln into the positioned image Cn here signifies weighted addition of the positioned image Cn and the low frequency components Ln.

The addition section 26 receives, in addition to the mixture image Dn supplied from the mixing section 25, high frequency components Hn of the output image Sn−1 obtained in the immediately preceding operation cycle and stored in the storage section 28 from the separation section 27.

The addition section 26 adds the high frequency components Hn from the separation section 27 to the mixture image Dn from the mixing section 25 and outputs an image obtained by the addition as a new output image Sn, that is, as an image produced using the input image An.

The addition of the high frequency components Hn to the mixture image Dn here signifies simple addition of the mixture image Dn and the high frequency components Hn.

Further, the mixing section 25 and the addition section 26 in FIG. 9 correspond to the mixing addition section 15 shown in FIG. 2.

Such mixture and addition as described above are hereinafter referred to collectively as mixture-addition.

The separation section 27 corresponds to the separation section 14 shown in FIG. 2. The separation section 27 separates the output image Sn−1 obtained in the immediately preceding operation cycle and stored in the storage section 28 into low frequency components Ln and high frequency components Hn in order to produce a next output image Sn and supplies the low frequency components Ln and the high frequency components Hn to the mixing section 25 and the addition section 26. In particular, the low frequency components Ln are supplied to the mixing section 25, and the high frequency components Hn are supplied to the addition section 26.

The storage section 28 corresponds to the storage section 16 shown in FIG. 2. The storage section 28 stores the output image Sn outputted from the addition section 26 and outputs the output image Sn to the outside as occasion demands. Further, the storage section 28 supplies the output image Sn−1 stored in the preceding cycle, that is, the output image Sn−1 obtained in the immediately preceding operation cycle, to the separation section 27.

In the image processing apparatus shown in FIG. 9 having such a configuration as described above, for example, input images of N frames more than one frame picked up at a high rate and including aliasing components in the vertical direction are supplied to and stored into the storage section 21.

The expansion section 23 successively determines the input images of N frames stored in the storage section 11 as a notice image beginning with the input image of the first frame and carries out an expansion process of expanding the input image An determined as the noticed image by interpolation using the pixel values of peripheral pixels. Then, the expansion section 23 supplies an expanded image Bn obtained by the expansion process to the positioning section 24.

On the other hand, the movement detection section 22 determines the input image A1 of the first frame from among the input images of N frames stored in the storage section 21 as a standard input image and detects a motion vector of the input image An with respect to the standard input image. Then, the movement detection section 22 supplies the detected motion vector to the positioning section 24.

The positioning section 24 carries out positioning of adjusting the position of the expanded image Bn received from the expansion section 23 to the position of the output image Sn−1 obtained in the immediately preceding operation cycle and stored in the storage section 28 in accordance with the motion vector supplied thereto from the movement detection section 22. Then, the positioning section 24 supplies a positioned image Cn which is the expanded image Bn after the positioning to the mixing section 25.

Here, if the expanded image Bn supplied from the expansion section 23 to the positioning section 24 is the expanded image B1 of the input image A1 of the first frame which is the standard for the positioning, that is, if the noticed image is the input image A1 of the first frame, then the positioning section 24 supplies the expanded image B1 from the expansion section 23 as it is as the positioned image C1 to the mixing section 25.

On the other hand, the separation section 27 separates the output image Sn−1 obtained in the immediately preceding operation cycle and stored in the storage section 28 into low frequency components Ln and high frequency components Hn. The low frequency components Ln are supplied to the mixing section 25 and the high frequency components Hn are supplied to the addition section 26.

The mixing section 25 mixes, that is, weighted adds, the low frequency components Ln from the separation section 27 with the positioned image Cn from the positioning section 24, that is, with the expanded image Bn after the positioning, and supplies a mixture image Dn obtained by the mixing to the addition section 26.

The addition section 26 adds the high frequency components Hn from the separation section 27 to the mixture image Dn from the mixing section 25 and outputs an image obtained by the addition as a new output image Sn.

The output image Sn outputted from the addition section 26 is supplied to and stored into the storage section 28.

Thereafter, a similar sequence of processes is repeated until the input image of the Nth frame from among the input images of N frames stored in the storage section 21 is determined as a noticed image and an output image Sn corresponding to the input image of the Nth frame as the noticed image is stored into the storage section 28.

It is to be noted that, in a case wherein the noticed image is the input image of the first frame, since an output image obtained in the immediately preceding operation cycle is not stored in the storage section 28, the separation section 27 does not substantially carry out its processing. Further, also the mixing section 25 and the addition section 26 do not carry out their processing.

In this instance, the positioned image C1 obtained by the positioning section 24, which is equal to the expanded image B1 as described hereinabove, is stored as it is as an output image S1 into the storage section 28.

Now, the movement detection section 22 shown in FIG. 9 is described with reference to FIG. 10.

A motion vector detected by the movement detection section 22 is used for positioning of the expanded image Bn and the output image Sn−1 by the positioning section 24 as described hereinabove with reference to FIG. 9.

Here, in order to carry out positioning of the expanded image Bn and the output image Sn−1, positional displacement information representative of positional displacement between the expanded image Bn and the output image Sn−1 is desired.

For the positional displacement information, for example, a motion vector of the expanded image Bn with respect to the output image Sn−1 can be adopted.

However, since an expanded image (and also an output image) is an image obtained by increasing the number of pixels of an input image, it includes an increased number of pixels, and if detection of a motion vector is carried out taking such an image as just described which includes a great number of pixels as an object, then a large amount of mathematical operation is desired.

Therefore, the movement detection section 22 shown in FIG. 9 carries out detection of a motion vector using the input image An before expansion by the expansion section 23, which is an image having a smaller number of pixels, as an object thereby to reduce the amount of mathematical operation in comparison with an alternative case wherein the expanded image Bn is used as an object for detection of a motion vector.

Figure 10:
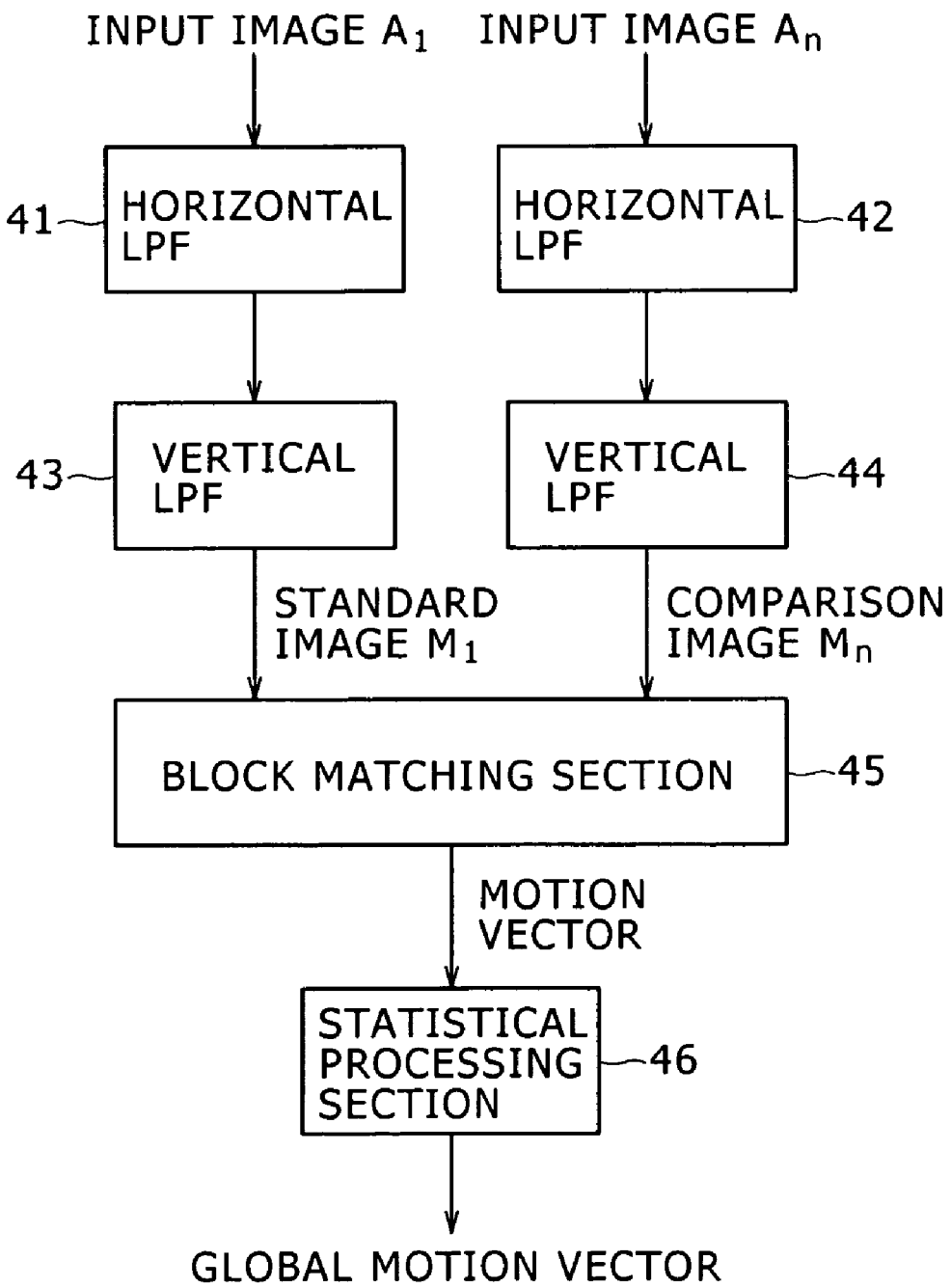
FIG. 10 is a block diagram showing an example of a configuration of a movement detection section shown in FIG. 9.

FIG. 10 shows an example of a configuration of the movement detection section 22 shown in FIG. 9.

Here, as a method for detection of a motion vector, a block matching method, a gradient method or some other arbitrary method can be used.

The movement detection section 22 shown in FIG. 10 adopts, for example, a block matching method as the method for detection of a motion vector.

Referring to FIG. 10, the movement detection section 22 includes horizontal LPFs 41 and 42, vertical LPFs 43 and 44, a block matching section 45 and a statistical processing section 46.

To the horizontal LPF 41, the input image A1 to be used as a standard input image is supplied from the storage section 21 (FIG. 9). To the horizontal LPF 42, a noticed image, that is, the input image An which is an object of detection of a motion vector with respect to the input image A1 to be used as the standard input image, is supplied from the storage section 21.

The horizontal LPF 41 filters the input image A1 in a horizontal direction and supplies the filtered input image A1 to the vertical LPF 43.

The vertical LPF 43 filters the input image A1 from the horizontal LPF 41 in a vertical direction and supplies the filtered input image A1 as a standard image M1, which is used as an standard image for detection of a motion vector, to the block matching section 45.

The horizontal LPF 41 and the vertical LPF 43 are applied in order to remove or reduce aliasing components, noise and so forth other than signal components included in the input image A1 and may be, for example, a filter having filter coefficients of $\{68/1024, 89/1024, 107/1024, 120/1024, 128/1024, 128/1024, 120/1024, 107/1024, 89/1024, 68/1024\}$.

Also the horizontal LPF 42 and the vertical LPF 44 are similar to the horizontal LPF 41 and the vertical LPF 43, respectively.

In particular, the horizontal LPF 42 filters the input image An as a noticed image in a horizontal direction and supplies the filtered input image An to the vertical LPF 44. The vertical LPF 44 filters the input image An from the horizontal LPF 41 in a vertical direction and supplies the filtered input image An as a comparison image Mn, which is to be used as an object of detection of a motion vector, to the block matching section 45.

The block matching section 45 divides the standard image M1 from the vertical LPF 43 into a plurality of small blocks. Now, if a small block of the standard image M1 is referred to as standard block, then the block matching section 45 carries out block matching of searching for a block most similar to the standard block from within the comparison image Mn from the vertical LPF 44 to detect motion vectors of individual standard blocks.

Then, after the block matching section 45 detects a motion vector from all standard blocks of the standard image M1, it supplies the motion vectors to the statistical processing section 46.

The statistical processing section 46 determines a global motion vector representative of a motion of the entire comparison image Mn with respect to the standard image M1 from the motion vectors of all standard blocks of the standard image M1 from the block matching section 45, for example, by a statistical process.

In particular, the statistical processing section 46 determines, for example, the length, that is, the vector length, of the motion vectors of all standard blocks of the standard image M1 and determines an average value p and a standard deviation a of the vector length. Further, the statistical processing section 46 excludes those of the motion vectors of all standard blocks of the standard image M1 whose vector length is not within the range of the average value $\mu \pm$standard deviation $\sigma$ and determines an average value of those motion vectors which remain after the exclusion as a global motion vector.

By excluding those motion vectors whose vector length is not included in the range of the average value $\mu \pm$standard deviation a in this manner, a global motion vector which represents the motion of the entire comparison image Mn with respect to the standard image M1 in high accuracy can be determined without those motion vectors which are wrong with high probability.

The positioning section 24 shown in FIG. 9 carries out positioning of the expanded image Bn using such a global motion vector as described above.

Referring back to FIG. 9, the expansion section 23 increases the number of pixels of the input image to twice only in the vertical direction to determine an expanded image. In this instance, the scale of the expanded image in the vertical direction is equal to twice that of the motion vectors or global motion vector determined by using the input image.

Therefore, the movement detection section 22 adjusts the scale of the global motion vector obtained by the statistical processing section 46 to the scale of the expanded image. In the present case, the movement detection section 22 increases the component in the vertical direction of the global motion vector obtained by the statistical processing section 46, that is, the y component, to twice and supplies the resulting global component to the positioning section 24.

Then, the positioning section 24 carries out positioning of moving the position of the expanded image based on the global motion vector from the movement detection section 22 thereby to produce a positioned image which is the expanded image positioned with respect to the output image.

Now, detection of a motion vector by the block matching section 45 shown in FIG. 10 is described in more detail with reference to FIGS. 11A and 11B.

Figure 11A:
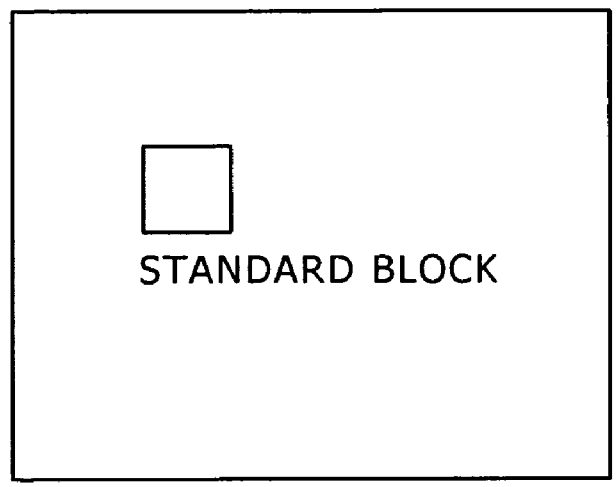
FIGS. 11A and 11B are schematic views illustrating a process of a block matching section shown in FIG. 9.
Figure 11B:
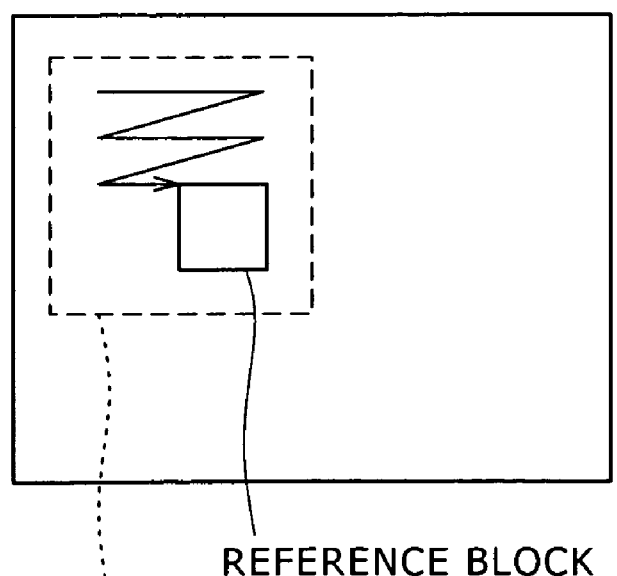

FIG. 11A illustrates the standard image M1 and FIG. 11B illustrates the comparison image Mn.

The block matching section 45 divides the standard image M1, for example, into a plurality of standard blocks having a size of 32 pixels×32 pixels in the horizontal and vertical directions and carries out block matching for the standard blocks. In particular, the block matching section 45 searches to what position of the comparison image Mn each standard block is displaced and detects the positional displacement amount as a motion vector of the standard block.

The search range of the comparison image Mn within which each standard block is to be searched is set, for example, as a range of 96 pixels×96 pixels in the horizontal and vertical directions with respect to the position of the standard block.

The block matching section 45 successively displaces a reference block of 32 pixels×32 pixels of a size same as that of a standard block in a unit of a pixel within the search range of the comparison image Mn to carry out a search for the position of the reference block most similar to the standard block.

In particular, the block matching section 45 uses a correlation value between the standard block and the reference block as an evaluation value for evaluating the degree of similarity between the standard block and the reference block and determines the correlation value with regard to each of the reference blocks at the individual positions within the search range.

Here, where the search range is a range of 96 pixels×96 pixels and the reference block is a block of 32 pixels×32 pixels, a relative position (vx, vy) of the reference block with respect to the standard block is represented by integral values vx and vy which are within ranges of an expression $-32 \leq vx \leq +32$ and another expression $-32 \leq vy \leq +32$, respectively. Accordingly, in this instance, the correlation value is determined regarding the reference blocks at 65×65 positions.

As the correlation value, for example, the sum total of absolute values of differences between luminance values of pixels of the standard block and luminance values of pixels at same positions of the reference block with regard to all pixels in the standard block and the reference block, that is, a difference absolute value sum total SAD (Sum of Absolute Difference), can be used.

Now, if the coordinate of the pixel at the left upper corner of the standard block is represented by (x0, y0) and the correlation value regarding the reference block whose relative coordinate from the standard block is (vx, vy) is represented by SAD(vx, vy), then the correlation value SAD(vx, vy) can be determined in accordance with the following expression (1):

$$SAD(vx,vy)=\Sigma x \Sigma y |M1(x0+x,y0+y)-Mn(x0+vx+x,y0+vy+y)| \quad (1)$$

where M1(x0+x, y0+y) represents a pixel value such as a luminance value of a pixel at the position or coordinate (x0+x, y0+y) of the standard image M1, Mn(x0+vx+x, y0+vy+y) a pixel value of a pixel at the position (x0+vx+x, y0+vy+y) of the standard image Mn, $\Sigma x$ the sum total where x is successively changed to an integral value from 0 to 31, and $\Sigma y$ the sum total where y is successively changed to an integral value from 0 to 31.

The block matching section 45 detects the coordinate, that is, the absolute coordinate, (vx, vy), which minimizes the correlation value SAD(vx, vy) of the expression (1), as a motion vector of the standard block.

Now, the expansion section 23 shown in FIG. 9 is described with reference to FIGS. 12A to 12E.

The expansion section 23 carries out an expansion process of increasing the pixel number of the input image An stored in the storage section 21 shown in FIG. 9 in the vertical direction to produce an expanded image Bn.

The existing resolution enhancement process adopts, as an expansion process of an input image including aliasing components, zero-value interpolation and filtering by a wideband LPF of a zero-value interpolation image obtained by the zero-value interpolation as described hereinabove with reference to FIGS. 6A to 6D or 7A to 7D. In this instance, the expanded image is equal to the zero-value interpolation image or the like and includes dark striped patterns.

On the other hand, the expansion section 23 includes, as an expansion process of an input image including aliasing components, zero-value interpolation which has been used for expansion of an input image which includes no aliasing component and filtering by a LPF which attenuations frequency components which exceed the Nyquist frequency fs/2 from within a zero-value interpolation image obtained by the zero-value interpolation but leaves a little amount of such frequency components.

As such an expansion process of the expansion section 23 as just described, various kinds of interpolation which use peripheral pixel values of an input image such as, for example, linear interpolation, nearest neighbor interpolation, and cubic convolution are available.

Although any interpolation may be adopted for the expansion process of the expansion section 23 only if it uses peripheral pixel values of an input image, preferably the interpolation leaves some amount of frequency components in a high frequency region of an input image, that is, some amount of frequency components around the frequency fs.

Figure 12A:
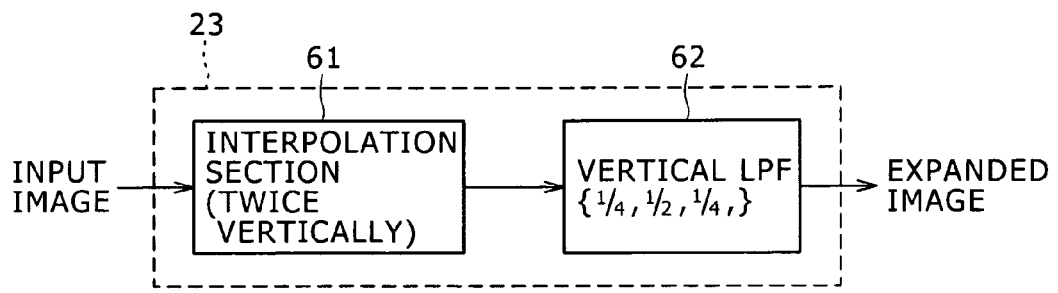
FIGS. 12A to 12E are diagrammatic views illustrating a process of an expansion section shown in FIG. 9.

FIG. 12A shows an example of a configuration of the expansion section 23 shown in FIG. 9.

The expansion section 23 shown in FIG. 12A expands an input image to an expanded image wherein the number of pixels in the vertical direction is doubled, for example, by linear interpolation.

Referring to FIG. 12A, the expansion section 23 includes an interpolation section 61 and a vertical LPF 62.

The interpolation section 61 receives an input image supplied thereto from the storage section 21 shown in FIG. 9. The interpolation section 61 carries out zero-value interpolation of inserting one zero-value point between each adjacent pixels in the vertical direction of the input image from the storage section 21 and supplies a zero-value interpolation image obtained by the zero-value interpolation to the vertical LPF 62.

It is to be noted that, in the zero-value interpolation, the original pixel values are adjusted so that the average value of the pixel value may not vary after the zero-value interpolation as described hereinabove with reference to FIGS. 4A to 7D.

In the following description, the description of such adjustment of the pixel values is suitably omitted.

The vertical LPF 62 has, for example, filter coefficients of {¼, ½, ¼} and filters a zero-value interpolation image from the interpolation section 61 in the vertical direction to produce an expanded image wherein the number of pixels of the input image in the vertical direction is doubled by linear interpolation. Then, the vertical LPF 62 supplies the produced expanded image to the positioning section 24 shown in FIG. 9.

Figure 12B:
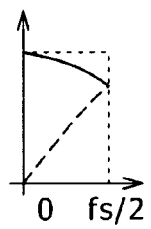

FIG. 12B illustrates a frequency characteristic in the vertical direction of an input image which is an object of the expansion process by the expansion section 23.

In the first embodiment, the input image includes aliasing components in the vertical direction as described hereinabove. In FIG. 12B, a solid line curve indicates signal components and a broken line curve indicates aliasing components.

Figure 12C:
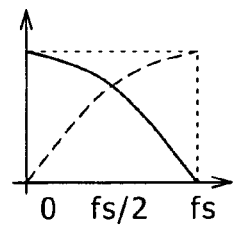

FIG. 12C illustrates a frequency characteristic in the vertical direction of a zero-value interpolation image after the zero-value interpolation of the input image obtained by the interpolation section 61.

Although signal components indicated by the solid line curve in FIG. 12C over the overall frequency band from −fs to fs are reproduced on the zero-value interpolation image obtained by carrying out zero-value interpolation for an input image including aliasing components, for example, an input image produced by removing every other one of lines of an image wherein the maximum frequency of frequency components is the frequency fs and has no aliasing component, also the aliasing components indicated by the broken line curve in FIG. 12C are reproduced as described hereinabove with reference to FIGS. 6A to 6D.

Figure 12D:
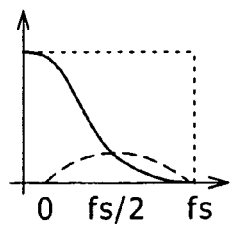

FIG. 12D illustrates a frequency characteristic of the image obtained by filtering the zero-value interpolation image shown in FIG. 12C by means of the vertical LPF 62, that is, of an expanded image obtained by linear interpolation of the input image.

Although, in the expanded image obtained by filtering the zero-value interpolation image shown in FIG. 12C by means of the vertical LPF 62, the aliasing components within the high frequency region from fs/2 to fs can be attenuated, also the signal components in the high frequency region from fs/2 to fs are attenuated. Conversely speaking, in the expanded image, although a little amount of aliasing components within the high frequency region from fs/2 to fs remains, also the signal components in the high frequency region from fs/2 to fs remain a little.

Figure 12E:
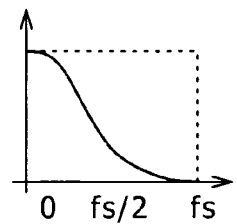

FIG. 12E illustrates a filter characteristic, that is, a frequency characteristic, of the vertical LPF 62.

The zero-value interpolation image shown in FIG. 12C becomes the expanded image shown in FIG. 12D wherein the frequency components in the high frequency region from fs/2 to fs are attenuated by being filtered by the vertical LPF 62 of the filter characteristic shown in FIG. 12E.

It is to be noted that, while, in FIGS. 12A to 12E, an expanded image wherein an input image is expanded by linear interpolation is produced by carrying out zero-value interpolation by means of the interpolation section 61 and filtering thus obtained zero-value interpolation image by means of the vertical LPF 62, in actual mounting, an expanded image can be produced by merely inserting interpolation values of linear interpolation into an input image. In this instance, the amount of mathematical operation desired for production of the expanded image can be reduced in comparison with an alternative case wherein zero-value interpolation and filtering are carried out.

Now, the positioning section 24 shown in FIG. 9 is described with reference to FIGS. 13A to 13G.

Figure 13A:
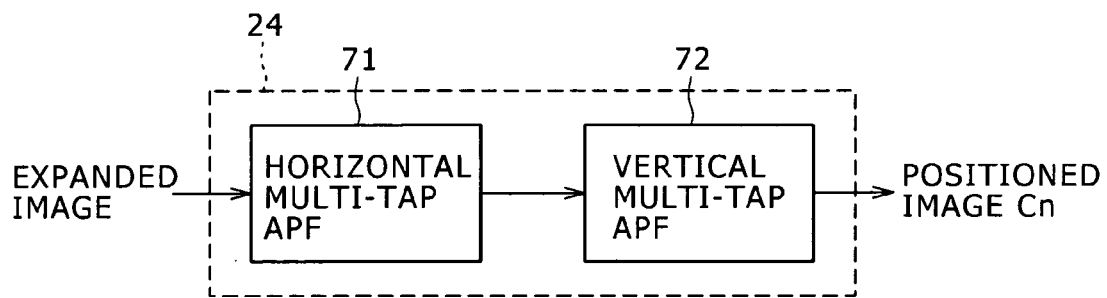
FIGS. 13A to 13G are diagrammatic views illustrating a process of a positioning section shown in FIG. 9.

FIG. 13A shows an example of a configuration of the positioning section 24 shown in FIG. 9.

Referring to FIG. 13A, the positioning section 24 includes a horizontal multi-tap APF (All Pass Filter) 71 and a vertical multi-tap APF 72.

To the horizontal multi-tap APF 71, an expanded image Bn is supplied from the positioning section 24 shown in FIG. 9 and a global motion vector determined using an input image An corresponding to the expanded image Bn is supplied as a motion vector of the expanded image Bn from the movement detection section 22 shown in FIG. 9.

The horizontal multi-tap APF 71 filters the expanded image Bn from the positioning section 24 based on a component of the motion vector of the expanded image Bn from the movement detection section 22 in the horizontal direction, that is, based on an x component of the motion vector, to move the expanded image Bn, that is, the position of the pixels of the expanded image Bn, by an amount corresponding to the x component of the motion vector of the expanded image Bn. Then, the horizontal multi-tap APF 71 supplies the thus moved expanded image Bn to the vertical multi-tap APF 72.

The vertical multi-tap APF 72 filters the expanded image Bn from the horizontal multi-tap APF 71 based on a component of the motion vector of the expanded image Bn from the movement detection section 22 in the vertical direction, that is, based on a y component of the motion vector, to move the expanded image Bn, that is, the position of the pixels of the expanded image Bn, by an amount corresponding to the y component of the motion vector of the expanded image Bn. Then, the vertical multi-tap APF 72 supplies thus obtained expanded image Bn as a positioned image Cn which is the expanded image Bn after the positioning with respect to the output image Sn−1 stored in the storage section 28, that is, the output image preceding by one frame, that is, as the expanded image Bn after the positioning, to the mixing section 25 shown in FIG. 9.

In the positioning section 24 configured in such a manner as described above, the horizontal multi-tap APF 71 and the vertical multi-tap APF 72 filter the expanded image Bn from the movement detection section 22 based on the motion vector of the expanded image Bn to produce the positioned image Cn wherein the pixels of the expanded image Bn are adjusted to the positions of corresponding pixels of the output image Sn−1 stored in the storage section 28, that is, to the positions of pixels on which an image of the same image pickup object is picked up.

In particular, if it is assumed that the motion vector V of the expanded image Bn from the movement detection section 22 is V=(−Vx, −Vy), then the positioning section 24 displays the expanded image Bn, that is, the pixels of the expanded image Bn, by the vector (Vx, Vy) corresponding to the motion vector V based on the motion vector V to adjust the expanded image Bn to the position of the output image Sn−1.

In particular, if attention is paid to the horizontal direction from between the horizontal direction and the vertical direction, then where the x component −Vx of the motion vector V is an integer, the horizontal multi-tap APF 71 moves the expanded image Bn by Vx in the horizontal direction to produce a positioned image Cn whose picture quality is not deteriorated in comparison with the expanded image Bn.

If the x component −Vx of the motion vector V is not an integer, then the horizontal multi-tap APF 71 moves the expanded image Bn by an integer int(Vx) (int(x) represents a maximum integer lower than x) in the horizontal direction. Further, the vertical multi-tap APF 72 carries out filtering of interpolating a pixel at a position displaced in the horizontal direction by a decimal fraction Vx−int(Vx) from each pixel of the expanded image Bn after the movement to produce an image composed of pixels obtained by such interpolation as just described as a positioned image Cn.

It is to be noted that, in order to produce an output image of a high resolution, that is, an output image including signal components of frequencies higher than the Nyquist frequency, preferably the high frequency components of the expanded image Bn are not deteriorated by the interpolation by the horizontal multi-tap APF 71.

Accordingly, although the sinc function is used as it is for filter coefficients for filtering for interpolation by the horizontal multi-tap APF 71, this makes the tap length infinite. Therefore, as the horizontal multi-tap APF 71, a LPF whose tap number is limited by multiplying the sinc function by a window function is used actually. It is to be noted that, in order to pass all of the frequency components included in the expanded image Bn as far as possible, the horizontal multi-tap APF 71 is formed with a number of taps as great as possible so that the frequency characteristic thereof becomes as flat as possible at frequencies lower than the maximum frequency among the frequency components included in the expanded image Bn and the roll-off becomes as steep as possible.

Here, if it is assumed that the horizontal multi-tap APF 71 carries out interpolation of pixels, for example, with an accuracy wherein a decimal fraction is represented by 8 bits, that is, with an accuracy wherein the distance between adjacent pixels of the expanded image Bn in the horizontal direction is equally divided into 28 sections, then the filter coefficient of one tap of the horizontal multi-tap APF 71 can assume 256 (=28) different values.

Further, if it is assumed that the number of taps of the horizontal multi-tap APF 71 is, for example, 8, then from the symmetry of the filter, the number of patterns of values which the filter coefficients of eight taps can assume is 256×8/2.

Accordingly, if filter coefficients of 256×8/2 patterns are determined from the sinc function and are stored as an array which uses 8 bits representative of the decimal fraction Vx−int(Vx) of the filter coefficient as an argument in the horizontal multi-tap APF 71, then the horizontal multi-tap APF 71 need not mathematically operate a filter coefficient every time filtering for interpolation is carried out. Consequently, the amount of mathematical operation can be reduced.

In this instance, the horizontal multi-tap APF 71 determines the decimal fraction Vx−int(Vx) from the motion vector from the movement detection section 22 shown in FIG. 9. Further, the horizontal multi-tap APF 71 determines filter coefficients using 8 bits representative of the decimal fraction Vx−int(Vx) as an argument and then carries out filtering.

Also the vertical multi-tap APF 72 carries out filtering of carrying out positioning of the expanded image Bn in a vertical direction in a similar manner as in the horizontal multi-tap APF 71.

It is to be noted that the expanded image B1 of the input image A1 of the first frame is stored as it is into the storage section 28 and becomes the output image Si. Accordingly, the positioning of the expanded image Bn to the output image Sn−1 by the positioning section 24 shown in FIG. 9 is equivalent to adjustment of the expanded image Bn to the position of the expanded image B1.

Figure 13B:
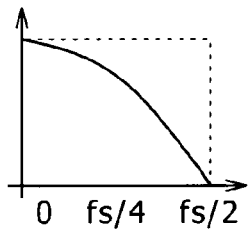

FIG. 13B illustrates a frequency characteristic in the horizontal direction of the expanded image Bn which is an object of positioning by the positioning section 24.

The expanded image Bn does not include aliasing components in the horizontal direction and accordingly includes only signal components existing in the frequencies lower than the Nyquist frequency fs/2.

Figure 13C:
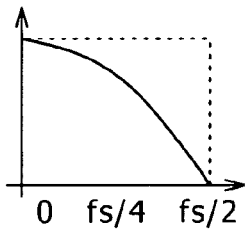

FIG. 13C illustrates a frequency characteristic in the horizontal direction of the positioned image Cn obtained by carrying out positioning of the expanded image Bn by the positioning section 24.

The horizontal multi-tap APF 71 is formed so as to include a number of taps as great as possible so that the frequency characteristic thereof becomes as flat as possible at frequencies lower than the maximum frequency fs/2 of frequency components in the horizontal direction included in the expanded image Bn in order to allow all of the horizontal components in the horizontal direction included in the expanded image Bn to pass therethrough as much as possible. Accordingly, the frequency characteristic in the horizontal direction of the positioned image Cn ideally is similar to the frequency characteristic in the horizontal direction of the expanded image Bn.

Figure 13D:
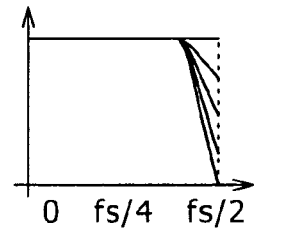

FIG. 13D illustrates a filter characteristic of the horizontal multi-tap APF 71.

The horizontal multi-tap APF 71 ideally passes all of frequency components in the horizontal direction included in the expanded image Bn, that is, frequency components lower than the frequency fs/2 from among the frequency components of the expanded image Bn which do not include any aliasing component in the horizontal direction.

It is to be noted that the filter characteristic of the horizontal multi-tap APF 71 somewhat differs depending upon the position in the horizontal direction of a pixel for which interpolation is carried out by filtering, that is, depending upon the decimal fraction Vx−int(Vx). In particular, the horizontal multi-tap APF 71 has such a filter characteristic that, as the decimal fraction Vx−int(Vx) increases, the gain in the proximity of the frequency fs/2 decreases.

Figure 13E:
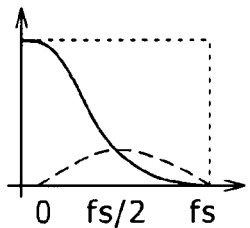

FIG. 13E represents a frequency characteristic in the vertical direction of the expanded image Bn which is an object of positioning by the positioning section 24.

FIG. 13E is same as FIG. 12D, and in the expanded image Bn, frequency components, that is, signal components and aliasing components, within the high frequency region from fs/2 to fs are attenuated. It is to be noted that a solid line curve indicates the signal components and a broken line curve indicates the aliasing components.

Figure 13F:
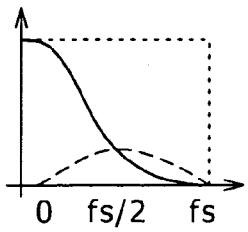

FIG. 13F illustrates a frequency characteristic in the vertical direction of a positioned image Cn obtained by carrying out positioning of the expanded image Bn by the positioning section 24.

The vertical multi-tap APF 72 is formed with a number of taps as great as possible so that the frequency characteristic thereof may become as flat as possible at frequencies lower than the maximum frequency fs of the frequency components in the vertical direction included in the expanded image Bn in order to allow all of the frequency components in the vertical direction included in the expanded image Bn to be passed as much as possible. Accordingly, the frequency characteristic in the vertical direction of the positioned image Cn ideally is similar to the frequency characteristic in the vertical direction of the expanded image Bn illustrated in FIG. 13E.

Figure 13G:
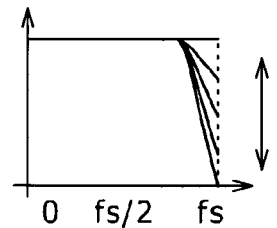

FIG. 13G illustrates a filter characteristic of the vertical multi-tap APF 72.

The vertical multi-tap APF 72 ideally passes all of frequency components in the vertical direction included in the expanded image Bn, that is, with regard to the expanded image Bn which include aliasing components in the vertical direction, passes all of the frequency components lower than the frequency fs.

It is to be noted that the filter characteristic of the vertical multi-tap APF 72 somewhat differs depending upon the position in the vertical direction of a pixel for which interpolation is carried out by filtering, that is, the decimal fraction Vy−int (Vy), similarly as in the case of the horizontal multi-tap APF 71. In particular, the vertical multi-tap APF 72 having a finite number of taps has such a filter characteristic that, as the decimal fraction Vy−int(Vy) increases, the gain in the proximity of the frequency fs decreases.

Now, the separation section 27 shown in FIG. 9 is described with reference to FIGS. 14A to 14C.

Figure 14A:
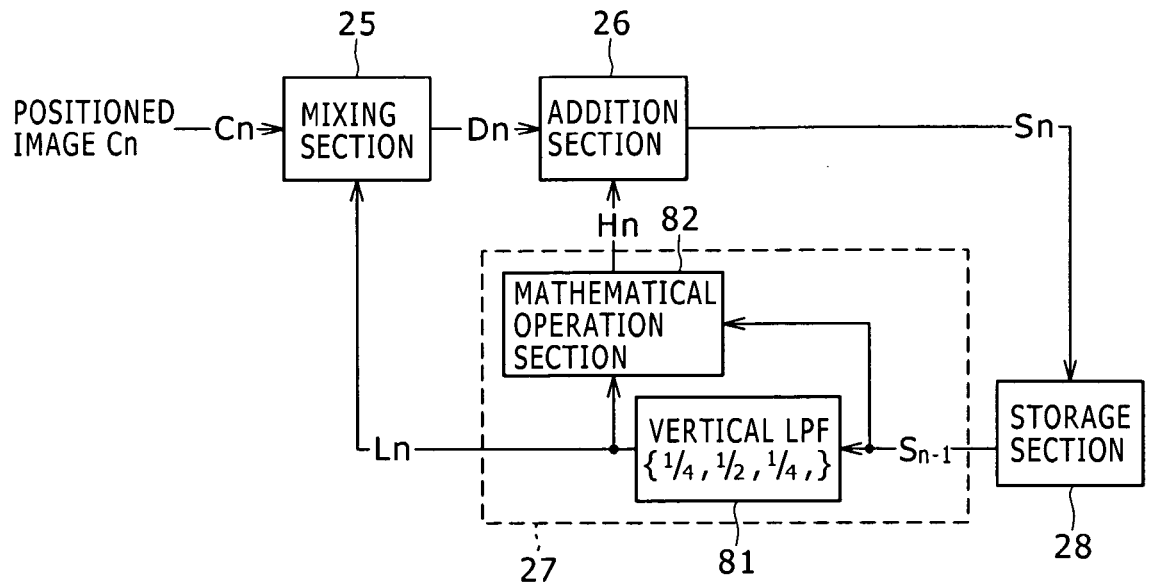
FIGS. 14A to 14C are diagrammatic views illustrating a process of a separation section shown in FIG. 9.

FIG. 14A shows an example of a configuration of the separation section 27 shown in FIG. 9.

Referring to FIG. 14A, the separation section 27 includes a vertical LPF 81 and a mathematical operation section 82 and separates an output image Sn−1 stored in the storage section 28 into low frequency components Ln and high frequency components Hn as described hereinabove.

In particular, the output image Sn−1 stored in the storage section 28 is supplied to the vertical LPF 81.

The vertical LPF 81 filters the output image Sn−1 from the storage section 28 in the vertical direction to extract low frequency components Ln of the output image Sn−1 and supplies the low frequency components Ln to the mathematical operation section 82 and the mixing section 25.

To the mathematical operation section 82, not only the low frequency components Ln are supplied from the vertical LPF 81, but also the output image Sn−1 stored in the storage section 28 is supplied.

The mathematical operation section 82 subtracts the low frequency components Ln supplied from the vertical LPF 81 from the output image Sn−1 supplied from the storage section 28 to extract high frequency components Hn from the output image Sn−1 and supplies the high frequency components Hn to the addition section 26.

Figure 14B:
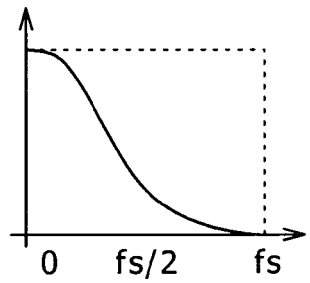

FIG. 14B illustrates a filter characteristic of the vertical LPF 81.

The vertical LPF 81 of the separation section 27 has, as a filter characteristic in the vertical direction which is a direction of aliasing components included in the input image, a same characteristic as that of a filter formed from a cascade connection of the vertical LPF 62 of the expansion section 23 shown in FIGS. 12A to 12E and the vertical multi-tap APF 72 of the positioning section 24 shown in FIGS. 13A to 13G.

It is to be noted that, since, in the image processing apparatus of FIG. 9, the vertical multi-tap APF 72 of the positioning section 24 shown in FIGS. 13A to 13G is a multi-tap APF which passes all of frequency components in the vertical direction included in the expanded image Bn, the filter characteristic of the vertical LPF 81 after all is same as that of the vertical LPF 62 of the expansion section 23 illustrated in FIG. 12E.

In the image processing apparatus of FIG. 9, the filter coefficients of the vertical LPF 62 of the expansion section 23 are {¼, ½, ¼} as described hereinabove, and accordingly, a LPF having filter coefficients of {¼, ½, ¼} is adopted as the vertical LPF 81.

Figure 14C:
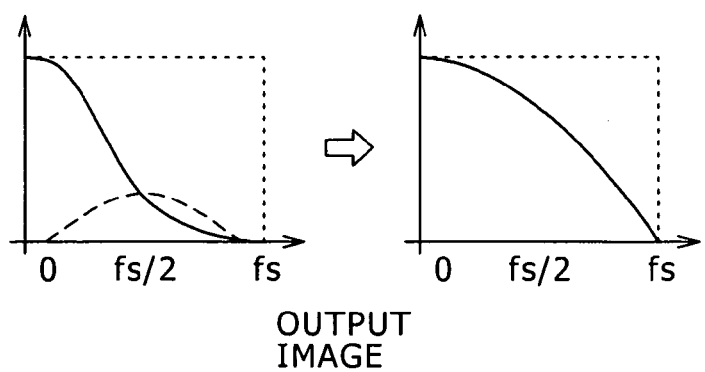

FIG. 14C illustrates a variation of the frequency characteristic in the vertical direction of the output image Sn obtained by the addition section 26.

It is to be noted that, in FIG. 14C, a solid line curve indicates signal components and a broken line curve indicates aliasing components.

If the first frame from among input images of N frames stored in the storage section 21 shown in FIG. 9 is determined as a noticed image, the expanded image B1 of the input image A1 of the first frame is stored as it is as an output image S1 into the storage section 28 as described hereinabove.

Thereafter, mixture-addition wherein the positioned image Cn from the positioning section 24 and the low frequency components Ln of the output image Sn−1 are mixed by the mixing section 25 to produce a mixture image Dn and the mixture image Dn and the high frequency components Hn of the output image Sn−1 are added by the addition section 26 to produce a new output image Sn is repeated while the input images of N frames stored in the storage section 21 shown in FIG. 9 are successively determined as a noticed image.

As a result, although the output image S obtained by the mixture-addition carried out using the input image A1 of the first frame as a noticed image has a resolution same as that of the input image A1 and includes aliasing components, as the mixture-addition progresses, that is, as the number of input images An used as a noticed image increases, the output image Sn obtained by the mixture-addition becomes an image of higher picture quality which has a higher resolution by restoration of signal components in the high frequency regions from fs/2 to fs and besides wherein the aliasing components are gradually attenuated.

That a filter having a characteristic same as that of a filter formed from a cascade connection of the vertical LPF 62 of the expansion section 23 shown in FIGS. 12A to 12E and the vertical multi-tap APF 72 of the positioning section 24 shown in FIGS. 13A to 13G is adopted as the vertical LPF 81 of the separation section 27 and besides, by carrying out mixture-addition of mixing or weighted adding the low frequency components Ln and adding the high frequency components Hn, signal components of the output image Sn in the high frequency region from fs/2 to fs are restored and aliasing components are attenuated as the mixture-addition progresses as described above depends upon the following principle. It is to be noted that the principle just described is hereinafter referred to as resolution enhancement principle.

In particular, in the separation section 27, the vertical LPF 81 filters the output image Sn−1 from the storage section 28 in the vertical direction to extract low frequency components Ln of the output image Sn−1 and supplies the low frequency components Ln to the mathematical operation section 82 and the mixing section 25.

Now, if the pixel value of a pixel at a position t of the output image Sn−1 is represented by s'(t), a low frequency component of the pixel value of the pixel at the position t from among the low frequency components Ln of the output image Sn−1 by l(t) and the high frequency component of the pixel value of the pixel at the position t from among the high frequency components Hn of the output image Sn−1 by h(t), then the mathematical operation section 82 carries out mathematical operation of an expression (2) given below for all pixels of the output image Sn−1 to determine the high frequency components Hn of the output image Sn−1. Then, the mathematical operation section 82 supplies the high frequency components Hn to the addition section 26.

$$h(t)=s'(t)-l(t) \qquad (2)$$

On the other hand, the mixing section 25 mixes the positioned image Cn from the positioning section 24 shown in FIG. 9 and the low frequency components Ln from the separation section 27 and supplies a mixture image Dn obtained by the mixture to the addition section 26.

In particular, if the pixel value of the pixel at the position t of the mixture image Dn is represented by d(t) and the pixel value of the pixel at the position t of the positioned image Cn is represented by c(t), then the mixing section 25 carries out mathematical operation, that is, weighted addition, of an expression (3) given below for all pixels of the mixture image Dn to determine mixture image Dn. Then, the mixing section 25 supplies the determined mixture image Dn to the addition section 26.

$$d(t)=\alpha \times c(t)+(1-\alpha) \times l(t) \qquad (3)$$

where the mixture ratio α is a weight used for the weighted addition of the mixture and has a real number value within the range of 0<α<1.

The mixture ratio α may be a fixed value such as, for example, 0.3.

Or, as hereinafter described, the mixture ratio α may be adjusted to another mixture ratio α', which is within a range of 0<α'<1, in response to the degree of the movement of the pixel at the position t such that the mixture ratio α' after the adjustment is used in place of the mixture ratio α.

Or else, the mixture ratio α may be, for example, such a variable value which depends upon the frame number of the input image An to which the positioned image Cn used for the mixture-addition as hereinafter described corresponds.

The addition section 26 adds the mixture image Dn from the mixing section 25 and the high frequency components Hn of the output image Sn−1 from the separation section 27 to produce a new output image Sn.

In particular, if the pixel value of the pixel at the position t of the output image Sn is represented by s(t), then the addition section 26 carries out mathematical operation, that is, addition, represented by an expression (4) given below for all pixels of the output image Sn to determine an output image Sn:

$$s(t)=d(t)+h(t) \qquad (4)$$

Here, the expansion section 23 shown in FIG. 9 produces an expanded image Bn wherein the frequency components in the vertical direction in the high frequency regions from to fs as described hereinabove with reference to FIGS. 12A to 12E are attenuated. Accordingly, if a positioned image Cn produced from such an expanded image Bn as just described and the output image Sn−1 are merely added, then the output image Sn obtained by the addition still becomes an image wherein the frequency components in the high frequency regions from fs/2 to fs are attenuated.

On the other hand, in the mixture-addition, the low frequency components Ln of the output image Sn−1 are mixed with the positioned image Cn and the high frequency components Hn are added to the positioned image Cn. Since such mixture-addition is carried out using positioned images Cn and hence input images An of a sufficient number of frames, an output image Sn wherein also the frequency components in the high frequency regions from fs/2 to fs are reproduced is produced.

In particular, a zero-value interpolation image obtained by zero-value interpolation of an input image An including aliasing components in the vertical direction by the interpolation section 61 of the expansion section 23 includes signal components A common to all of the successive input images A1 to AN picked up at a high rate and aliasing components Zn unique to the input image An of the nth frame. Accordingly, the zero-value interpolation image of the input image An can be represented by an expression of A+Zn.

Now, a characteristic of the filter formed from the cascade connection of the vertical LPF 62 of the expansion section 23 shown in FIGS. 12A to 12E which carries out filtering in the vertical direction which is a direction of aliasing components and the vertical multi-tap APF 72 of the positioning section 24 which carries out filtering in the vertical direction which is a direction of aliasing components is represented by F. In this instance, the positioned image Cn used for the mixture-addition is represented by the following expression (5):

$$Cn=F \times (A+Zn)=F \times A+F \times Zn \qquad (5)$$

Figure 1B:
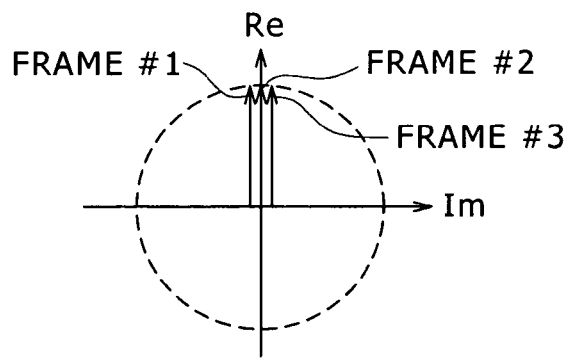
Figure 1C:
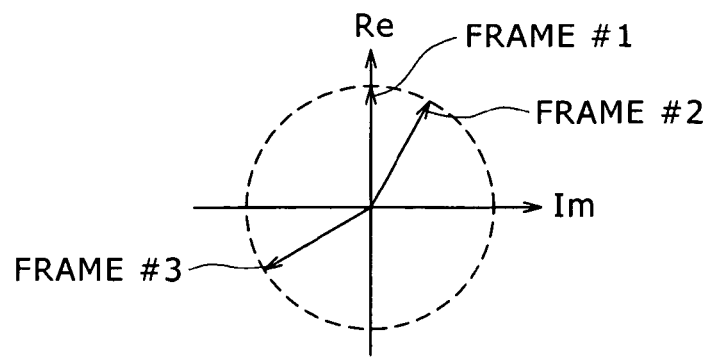

If the successive input images A1 to AN picked up at a high rate are different in the position of sampling, that is, in the position of an image pickup object, for example, by camera shake, then although the signal components A coincide or are common, the aliasing components Zn are different in phase as seen in FIG. 1.

Here, where the positioned image Cn and the output image Sn−1 are to be weighted added, that is, for example, where average values of n positioned images C1 to CN are used as the output image Sn, an output image Sn represented by the following expression (6) is obtained:

$$Sn=\Sigma k(Ck/n)=F \times A+F \times (\Sigma k(Zk))/n \qquad (6)$$

where Σk represents the sum total where k is successively changed to integral values from 1 to n.

In the expression (6), the sum total Σk(Zk) of the aliasing component Zk does not exhibit a very high value because the aliasing components Zk cancel one another to some degree. Then, as the frame number n of the positioned images Cn to be used for weighted addition increases, the second term F×(Σk(Zk))/n on the right side of the expression (6) decreases.

If the number of frames of the positioned images Cn to be used for weighted addition is sufficiently great, then the second term F×(Σk(Zk))/n on the right side of the expression (6) can be regarded as zero, and in this instance, the output image Sn of the expression (6) can be represented by the following expression (7):

$$Sn=F \times A \qquad (7)$$

As described above, where the positioned image Cn and the output image Sn−1 are to be weighted added, the aliasing components Zn can be removed by positioned images Cn of a sufficient frame number n.

However, the output image Sn of the expression (7) obtained only by weighted addition is a result of filtering of the signal components A by means of a LPF of the filter characteristic F, and signal components in the high frequency regions are not restored.

On the other hand, by the mixture-addition, addition is carried out in addition to mixture, that is, weighted addition, and therefore, restoration of signal components in the high frequency regions is carried out in addition to removal of aliasing components.

In particular, since the vertical LPF 81 of the separation section 27 shown in FIGS. 14A to 14C which carries out filtering in the vertical direction which is a direction of aliasing components has a characteristic same as the filter characteristic F of the filter formed from the cascade connection of the vertical LPF 62 of the expansion section 23 shown in FIGS. 12A to 12E and the vertical multi-tap APF 72 of the positioning section 24, the low frequency components Ln of the output image Sn−1 obtained by the vertical LPF 81 can be represented by the following expression (8):

$$Ln=F \times Sn-1 \qquad (8)$$

Meanwhile, the high frequency components Hn of the output image Sn−1 obtained by the mathematical operation section 82 of the separation section 27 can be represented by the following expression (9):

$$Hn=(1-F) \times Sn-1 \qquad (9)$$

Further, the mixture image Dn obtained by the mixture, that is, by the weighted addition, by means of the mixing section 25 shown in FIG. 9 can be represented by the following expression (10):

$$Dn = \alpha \times Cn + (1-\alpha) \times Ln \tag{10}$$

Further, a new output image Sn obtained by the addition by the addition section 26 shown in FIG. 9 can be represented by the following expression (11):

$$Sn = Dn + Hn \tag{11}$$

The expression (11) can be transformed into the following expression (12) from the expressions (8) to (11):

$$Sn = \alpha \times Cn + (1-\alpha) \times F \times Sn-1 + (1-F) \times Sn-1 \tag{12}$$

Further, by substituting the expression (5) into the expression (12) to erase Cn, the following expression (13) is obtained:

$$Sn = (1-\alpha F) \times Sn-1 + \alpha \times F \times A + \alpha \times F \times Zn \tag{13}$$

According to the expression (13), the new output image Sn obtained by the mixture-addition can be represented using the output image Sn−1 preceding by one frame, that is, the output image obtained in the immediately preceding operation cycle.

Since, in the mixture-addition, frequency components in the high frequency regions are added, if the frame number of the positioned images Cn to be used for the mixture-addition is sufficiently great, then the components in the high frequency regions from among the aliasing components Zn become zero or are removed similarly as in the case of the description given hereinabove in connection with the expressions (6) and (7).

Further, since, in the mixture-addition, frequency components in the low frequency region are added likewise by weighted addition wherein the mixture ratio α is used as a weight, or in other words, since the low frequency components of the positioned images Cn of the different frames are added at different rates, if the frame number n of the positioned images Cn to be used for the mixture-addition is sufficiently great, then low frequency components in the aliasing components Zn become zero.

Further, since, in the mixture-addition, frequency components in intermediate frequency regions between the high frequency regions and the low frequency region are added similarly to the frequency components in the low frequency region and the high frequency regions described above, where the frame number n of the positioned images Cn to be used for the mixture-addition is sufficiently great, the components in the intermediate frequency regions in the aliasing components Zn likewise become zero.

Accordingly, where the frame number n of the positioned images Cn to be used for the mixture-addition is sufficiently great, the aliasing components Zn of the expression (13) become zero and the output image Sn can be represented by the following expression (14):

$$Sn = (1-\alpha) \times Sn-1 + \alpha \times F \times A \tag{14}$$

By solving the expression (13) as a recursion formula, the following expression (14) is obtained:

$$Sn = A + (1-\alpha F)n-1 \times (S1-A) \tag{15}$$

If the LPF of the filter characteristic F has, for example, filter coefficients $\{¼, ½, ¼\}$ as described hereinabove, then the gain of the filter ranges from 0 to 1 over the overall frequency band, which is lower than fs here, such that the gain of the dc component is the maximum value 1 and the gain of frequency components in the high frequency region is the minimum value 0.

Accordingly, 1−αF in the expression (15) exhibits a value equal to or lower than 1 over the overall frequency region such that the minimum value thereof, that is, the minimum gain, is 1−α and the maximum value thereof, that is, the maximum gain, is 1.

Therefore, (1−αF)n−1 approaches zero as the frame number n of the positioned images Cn to be used for the mixture-addition increases and becomes equal to zero as the frame number n becomes sufficiently great.

Accordingly, the output image Sn has the initial value S1 and hence is the positioned image C1 first when the mixture-addition of the positioned image C1 is carried out, but as the mixture-addition is repeated, the output image Sn gradually approaches the signal components A. In other words, an output image Sn=A from which aliasing components are removed and signal components in the high frequency regions are restored can be obtained.

It is to be noted that, although, by the mixture-addition, aliasing components are removed and signal components in the high frequency regions are restored as described above, different from a popular emphasis process (enhance), particular frequency components are not emphasized.

In particular, if a popular emphasis process is repeated, then particular frequency components are sometimes emphasized excessively, by repetitions of the mixture-addition, the output image Sn approaches the signal component A included in the input images A1 to An.

As described above, with the image processing apparatus of FIG. 9 which carries out the mixture-addition, flexible resolution enhancement of an image can be achieved.

In particular, an output image of a high resolution, that is, an output image having frequency components restored in the high frequency regions, wherein aliasing components are reduced by an increasing amount as the number of frames of input images increases, that is, as the number of images to be used for the mixture-addition increases, is obtained.

Further, since the mixture-addition is carried out by the expansion section 23 using expanded images produced by interpolation which uses peripheral pixels of an input image such as linear interpolation, even if a small number of images are available as input images from some region, extremely even if only one image is available, different from the existing resolution enhancement technique, such a situation that an image which includes dark striped patterns is provided to a user can be prevented. In particular, for example, even in the worst case wherein only one image is available as an input image, as the picture quality of an image to be provided to a user, such picture quality as is worthwhile to actual use, that is, picture quality of an image obtained by linear interpolation or the like, is assured.

It is to be noted that, while the vertical LPF 62 which carries out linear interpolation of filter coefficients of $\{¼, ½, ¼\}$ is used as the filter of the expansion section 23 in FIG. 12, for example, another filter which carries out nearest neighbor interpolation having filter coefficients of $\{½, ½, 0\}$ or the like, a further filter which carries out cubic interpolation having filter coefficients of $\{-1/16, 0, 9/16, 9/16, 0, -1/16\}$ or some other filter can be used in place of the vertical LPF 62 as the filter of the expansion section 23.

Where such a filter which carries out nearest neighbor interpolation or a filter which carries out cubic interpolation as described above is adopted as the filter of the expansion section 23, a filter of the same filter characteristic as that of the filter of the expansion section 23 is adopted also in the separation section 27 shown in FIGS. 14A to 14C in place of the vertical LPF 81.

Further, while, in the case described hereinabove, a filter having a filter characteristic same as that of the filter formed from the cascade connection of the filter of the expansion section 23, that is, the vertical LPF 62 shown in FIGS. 12A to 12E and the filter of the positioning section 24, that is, the vertical multi-tap APF 72 shown in FIGS. 13A to 13G (the filter formed from the cascade connection is hereinafter referred to also as cascade connection filter) is adopted as the filter of the separation section 27, that is, as the vertical LPF 81 shown in FIG. 14, the filter of the separation section 27 may otherwise have a characteristic similar to the filter characteristic of the cascade connection filter.

Further, while, in the case described above, Zn represents aliasing components included in the input image An, Zn may otherwise represent noise components, which may include aliasing components, included in the input image An. If noise components are distributed in accordance with the Gaussian distribution, then since the noise components cancel each other by the addition, that is, by the weighted addition, an output image wherein noise components cancel each other can be obtained by the mixture-addition.

Further, while, in FIG. 10, the movement detection section 22 detects a motion vector and the positioning section 24 carries out positioning of an expanded image and an output image based on the motion vector, for example, the movement detection section 22 may otherwise determine coefficients of Affine transformation for making the positions of an expanded image and an output image coincide with each other, for example, by the least squares method and the positioning section 24 may carry out filtering based on the coefficients for Affine transformation to carry out positioning of the expanded image and the output image.

In particular, the positioning section 24 in this instance calculates coordinates of pixels of an expanded image when the position of the expanded image is adjusted to the position of an output image (the coordinates are hereinafter referred to as positioned coordinates) by Affine transformation based on the coefficients determined by the movement detection section 22. Then, the positioning section 24 uses a filter which carries out interpolation using pixel values of pixels at positions represented by the positioned coordinates of the expanded image to determine the pixel values of the pixels of the positioned image at the positions of the pixels of an output image.

Although positioning of an expanded image and an output image based on a motion vector is carried out only by parallel movement, positioning of an expanded image and an output image by filtering based on coefficients of Affine transformation is carried out using expansion or contraction and rotation in addition to parallel movement. Accordingly, the accuracy in positioning can be improved.

Second Embodiment

Figure 15:
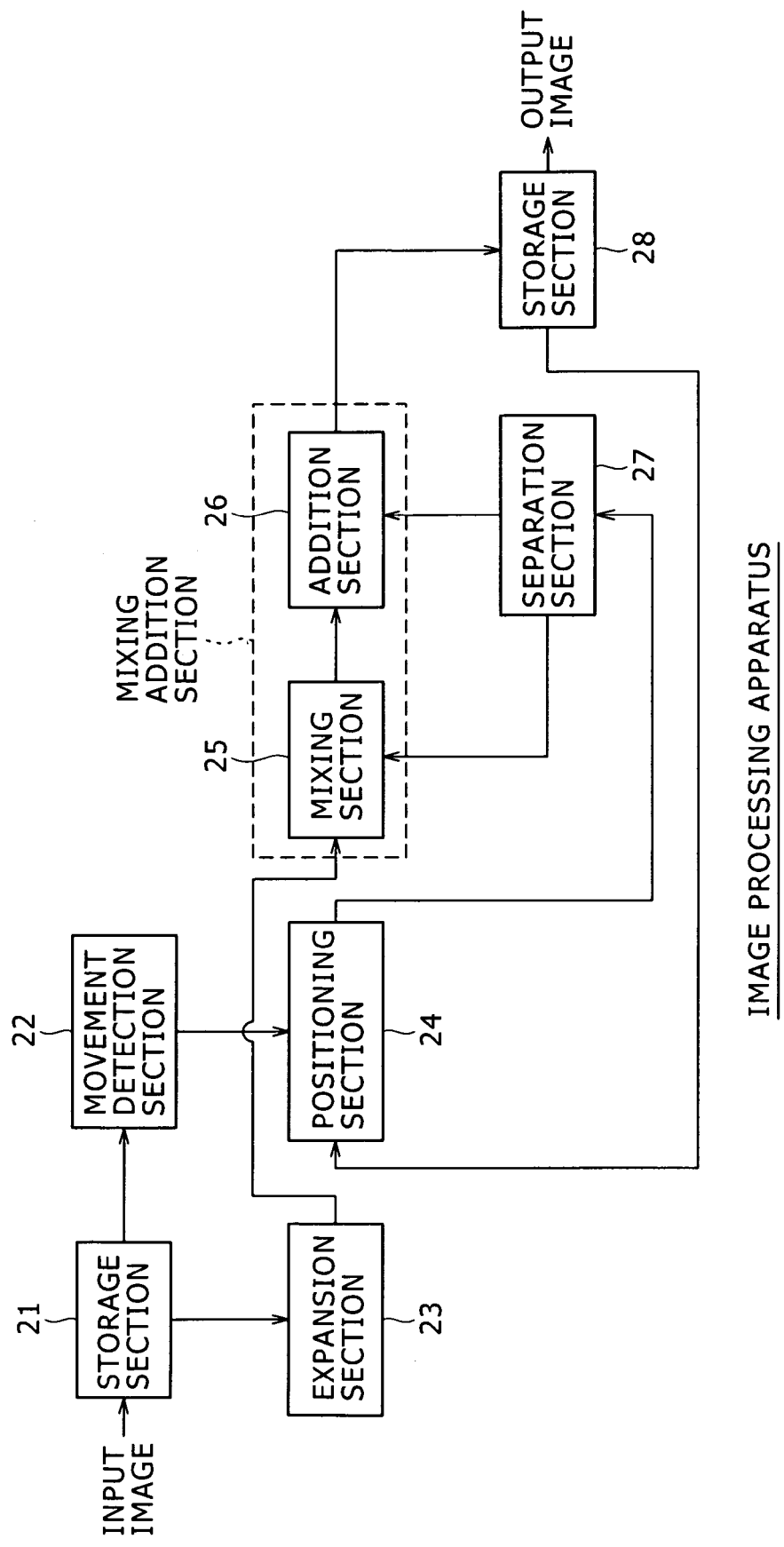
FIG. 15 is a block diagram showing an example of a configuration of the image processing apparatus of FIG. 2 according to a second embodiment of the present invention.

FIG. 15 shows an example of a configuration of the image processing apparatus according to a second embodiment of the present invention.

Referring to FIG. 15, the image processing apparatus includes a storage section 21, a movement detection section 22, an expansion section 23, a positioning section 24, a mixing section 25, a mixing section 25, an addition section 26, a separation section 27 and a storage section 28 similarly as in the image processing apparatus of FIG. 9.

It is to be noted, however, that, although the image processing apparatus of FIG. 9 carries out outputting of an output image from the storage section 28 after the mixture-addition of all of input images A1 to AN stored in the storage section 21, that is, outputting of positioned images C1 to CN obtained by positioning of expanded images B1 to BN produced from the input images A1 to AN and hence of the expanded images B1 to BN after the positioning, in the image processing apparatus of FIG. 15, outputting of an output image from the storage section 28 to the outside is carried out every time the mixture-addition of an input image An of one frame is carried out.

Therefore, while, in the image processing apparatus of FIG. 9, the positioning of an expanded image and an output image by the positioning section 24 is carried out by adjusting the position of the expanded image to the position of the output image, in FIG. 9, to the position of the expanded image B1 of the input image A1 which is used as a standard input image, in the image processing apparatus of FIG. 15, positioning of an expanded image and an output image by the positioning section 24 is carried out by adjusting the position of the output image to the position of the expanded image which is an object of the mixture-addition.

In particular, in the image processing apparatus of FIG. 15, an expanded image produced by the expansion section 23 is supplied to the mixing section 25 bypassing the positioning section 24. Further, the mixing section 25 and the addition section 26 carry out the mixture-addition using the expanded image from the expansion section 23, and a new output image obtained by the mixture-addition is supplied to and stored into the storage section 28. Then, the new output image is outputted to the outside from the storage section 28.

Further, the new output image stored in the storage section 28 is supplied as an output image obtained in the immediately preceding operation cycle, that is, an output image preceding by one frame, to the positioning section 24 when an expansion image of a next frame is to be produced by the expansion section 23. The positioning section 24 carries out positioning of adjusting the position of the output image from the storage section 28 to the position of an expanded image to be produced by the expansion section 23, and an output image after the positioning is supplied to the separation section 27.

The separation section 27 separates the output image after the positioning from the positioning section 24 into low frequency components and high frequency components, and supplies the low frequency components to the mixing section 25 and supplies the high frequency components to the addition section 26.

The mixing section 25 carries out mixing of the low frequency components of the output image after the positioning from the separation section 27 and the expanded image from the expansion section 23 and supplies a mixture image obtained by the mixture to the addition section 26.

The addition section 26 carries out addition of the low frequency components of the output image after the positioning from the separation section 27 and the mixture image from the mixing section 25 and supplies a resulting output image to the storage section 28.

In the image processing apparatus described hereinabove with reference to FIG. 9, when any input image An from among the input images A1 to AN of N frames is mixed and added, an output image in which an image of an image pickup object is picked up is produced at a position at which an image of the image pickup object is picked up in the input image A1 of the first frame.

On the other hand, in the image pickup apparatus of FIG. 15, when an input image An is mixed and added, an output image in which an image of an image pickup object is picked up is produced at a position at which an image of the image pickup object is picked up on the input image An.

Here, when any input image An from among the input images A1 to AN of N frames is mixed and added, the mixture-addition by which an output image on which an image of an image pickup object is picked up is produced at a position at which an image of the image pickup object is picked up on the input image A1 of the first frame is convenient, for example, where the input image An is a still picture. In this instance, also the output image is a still picture. Thus, the mixture-addition described is hereinafter referred to suitably as still picture mixture-addition.

On the other hand, the mixture-addition by which an image of an image pickup object is picked up at a position at which an image of the image pickup object is picked up on the input image An when the input image An is to be mixed and added is convenient, for example, where the input image An is a dynamic picture. In this instance, also the output image is a dynamic picture. Thus, the mixture-addition described is hereinafter referred to suitably as dynamic picture mixture-addition.

As described hereinabove, in the image processing apparatus of FIG. 15 wherein the dynamic picture mixture-addition is carried out, since outputting of an output image from the storage section 28 to the outside is carried out every time the mixture-addition of an input image An of one frame is carried out, the mathematical operation amount for obtaining an output image of one frame decreases in comparison with that of the image processing apparatus of FIG. 9 wherein the still picture mixture-addition is carried out and the outputting of an output image from the storage section 28 to the outside is carried out after the mixture-addition of all input images A1 to AN stored in the storage section 21 is carried out.

It is to be noted that, in the still picture mixture-addition, the movement detection section 22 shown in FIG. 10 determines the input image A1 of the first frame as a standard image and determines an input image An of an object of the mixture-addition as a comparison image to determine a motion vector, that is, a global motion vector as described hereinabove in connection with the first embodiment of the present invention.

Then, based on the motion vector determined by the movement detection section 22, the positioning section 24 carries out positioning of adjusting the position of the expanded image Bn of an object of the mixture-addition to the position of the output image Sn−1 determined in the immediately preceding operation cycle, which is the same as the position of the expanded image B1 of the input image A1 of the first frame.

On the other hand, in the dynamic picture mixture-addition, the movement detection section 22 shown in FIG. 10 determines an input image An of an object of the mixture-addition as a standard image and determines an input image An−1 immediately preceding to the input image An, that is, preceding by one frame, as a comparison image to determine a motion vector, that is, a global motion vector.

In other words, the movement detection section 22 determines a positional displacement amount of an expanded image Bn−1 of the immediately preceding input image An−1 from the expanded image Bn of the input image An of an object of the mixture addition, which is equal to a positional displacement amount of the output image Sn−1 obtained in the immediately preceding operation cycle.

Then, the positioning section 24 carries out positioning of adjusting the position of the output image Sn−1 obtained in the immediately preceding operation cycle to the position of the expanded image Bn of an object of the mixture-addition based on the positional displacement amount determined by the movement detection section 22.

Third Embodiment

FIG. 16 shows an example of a configuration of the image processing apparatus of FIG. 2 according to a third embodiment of the present invention.

Referring to FIG. 16, the image processing apparatus shown includes a storage section 21, a movement detection section 22, an expansion section 23, a positioning section 24, a mixing section 25, an addition section 26, a separation section 27 and a storage section 28 similarly to the image processing apparatus of FIG. 9.

However, the image processing apparatus of FIG. 16 is different from the image processing apparatus of FIG. 9 in that it additionally includes selection sections 101, 102 and 103.

Further, the image processing apparatus of FIG. 16 is configured such that still picture mixture-addition and dynamic picture mixture-addition can be carried out selectively. Which one of the still picture mixture-addition and the dynamic picture mixture-addition should be carried out on the image processing apparatus of FIG. 16 is selected, for example, in response to an operation of a user.

In the image processing apparatus of FIG. 16, an expanded image is supplied from the expansion section 23 to a terminal a of the selection section 101 while an output image preceding by one frame, that is, an output image obtained in the immediately preceding operation cycle, is supplied from the storage section 28 to another terminal b of the selection section 101.

The selection section 101 selects the expanded image supplied to the terminal a or the output image obtained in the immediately preceding operation cycle and supplied to the terminal b and supplies a selected image as an object of positioning to the positioning section 24.

Meanwhile, an image after positioning, that is, an expanded image or an output image, is supplied from the positioning section 24 to a terminal a of the selection section 102, and the expanded image is supplied from the expansion section 23 to another terminal b of the selection section 102.

The selection section 102 selects the image after the positioning supplied to the terminal a or the expanded image supplied to the terminal b and supplies a selected image to the mixing section 25.

Further, the output image preceding by one frame, that is, the output image obtained in the immediately preceding operation cycle, is supplied from the storage section 28 to a terminal a of the selection section 103, and the image after the positioning, that is, the expanded image or the output image, is supplied from the positioning section 24 to another terminal b of the selection section 103.

The selection section 103 selects the output image obtained in the immediately preceding operation cycle and supplied to the terminal a or the image after the positioning supplied to the terminal b and supplies a selected image to the separation section 27.

In the image processing apparatus configured in such a manner as described above, when the still picture mixture-addition is to be carried out, a first process hereinafter described is carried out, but when the dynamic picture mixture-addition is to be carried out, a second process hereinafter described is carried out.

In particular, in the first process, the terminal a from between the terminals a and b is selected by all of the selection sections 101 to 103.

As a result, the selection section 101 selects the expanded image supplied from the expansion section 23 to the terminal and supplies the expanded image to the positioning section 24.

The positioning section 24 carries out positioning of adjusting the position of the expanded image from the selection section 101 to the position of the output image obtained in the immediately preceding operation cycle and stored in the storage section 28 and supplies the expanded image after the positioning to the terminal a of the selection section 102.

The selection section 102 selects the expanded image after the positioning supplied from the positioning section 24 to the terminal a and supplies the expanded image after the positioning to the mixing section 25.

Meanwhile, the selection section 103 selects the output image obtained in the immediately preceding operation cycle and supplied from the storage section 28 to the terminal a and supplies the output image to the separation section 27.

Consequently, the components of the image processing apparatus of FIG. 16 from the storage section 21 to the storage section 28 are placed into a same connection state as that of the components of the image processing apparatus of FIG. 9 from the storage section 21 to the storage section 28, and the still picture mixture-addition is carried out by the mixing section 25, addition section 26 and separation section 27.

In particular, the separation section 27 separates the output image obtained in the immediately preceding operation cycle and supplied from the selection section 103 into low frequency components and high frequency components, and supplies the low frequency components to the mixing section 25 and supplies the high frequency components to the addition section 26.

The mixing section 25 mixes the low frequency components from the separation section 27 into the expanded image after the positioning, that is, the positioned image, supplied from the selection section 102 and supplies a resulting mixed image to the addition section 26.

The addition section 26 adds the high frequency components from the separation section 27 to the mixture image from the mixing section 25 to produce a new output image and supplies and stores the new output image to and into the storage section 28.

On the other hand, in the second process, the terminal b from between the terminals a and b is selected by all of the selection sections 101 to 103.

As a result, the selection section 101 selects the output image obtained in the immediately preceding operation cycle and supplied from the storage section 28 to the terminal b and supplies the output image to the positioning section 24.

The positioning section 24 carries out positioning of adjusting the position of the output image from the selection section 101 to the position of the expanded image produced by the expansion section 23 and supplies the output image after the positioning to the terminal b of the selection section 103.

Meanwhile, the selection section 102 selects the expanded image supplied from the expansion section 23 to the terminal b and supplies the expanded image to the mixing section 25.

The selection section 103 selects the output image after the positioning supplied from the positioning section 24 to the terminal b and supplies the output image after the positioning to the separation section 27.

Consequently, the components of the image processing apparatus of FIG. 16 from the storage section 21 to the storage section 28 are placed into a same connection state as that of the components of the image processing apparatus of FIG. 15 from the storage section 21 to the storage section 28, and the dynamic picture mixture-addition is carried out by the mixing section 25, addition section 26 and separation section 27.

In particular, the separation section 27 separates the output image after the positioning supplied from the selection section 103 into low frequency components and high frequency components, and supplies the low frequency components to the mixing section 25 and supplies the high frequency components to the addition section 26.

The mixing section 25 mixes the low frequency components from the separation section 27 into the expanded image supplied from the selection section 102 and supplies a resulting mixed image to the addition section 26.

The addition section 26 adds the high frequency components from the separation section 27 to the mixture image from the mixing section 25 to produce a new output image and supplies and stores the new output image to and into the storage section 28.

Fourth Embodiment

FIG. 17 shows an example of a configuration of the image processing apparatus of FIG. 2 according to a fourth embodiment of the present invention.

Referring to FIG. 17, the image processing apparatus shown includes a storage section 21, a movement detection section 22, a mixing section 25, an addition section 26 and a storage section 28 similarly to the image processing apparatus of FIG. 9.

However, the image processing apparatus of FIG. 17 is different from the image processing apparatus of FIG. 9 in that it includes an expansion section 111, a positioning section 112 and a separation section 113 in place of the expansion section 23, positioning section 24 and separation section 27, respectively.

While the image processing apparatus of FIG. 9 is configured such that the expansion section 23 expands an input image to twice in the vertical direction in which aliasing components are included to produce an expanded image and, in order to prevent deterioration of high frequency components of the expanded image, the filters of the positioning section 24, that is, the horizontal multi-tap APF 71 and the vertical multi-tap APF 72 shown in FIG. 13, are formed from a multi-tap APF, the multi-tap APF desires an increased scale and an increased mathematical operation amount of the apparatus.

On the other hand, if the filter of the positioning section 24 is formed from a filter having a smaller number of taps which carries out, for example, linear interpolation or cubic interpolation, then the scale and the mathematical operation amount of the apparatus can be reduced.

However, if the filter of the positioning section 24 is formed from a filter having a small number of taps, then a filter characteristic of the filter of the positioning section 24 particularly in high frequency regions varies depending upon the amount of movement when the position of an expansion image is adjusted to the position of an output image, that is, depending upon the global motion vector obtained by the movement detection section 22. As a result, the positioning deteriorates high frequency components of the expanded image and consequently deteriorates the picture quality of the output image.

Therefore, in the image processing apparatus of FIG. 17, the expansion section 111 carries out an expansion process of expanding an input image so that, even if a filter having a small number of taps is adopted as the filter for positioning, high frequency components of the expansion image, that is, signal components and aliasing components, may not be deteriorated.

The expansion process carried out by the expansion section 111 shown in FIG. 17 is described with reference to FIGS. 18A to 18G and 19.

It is to be noted that, although a case is described here wherein the expansion section 111 expands an input image, that is, increases the number of pixels, to twice in the horizontal direction and expands the input image to four times in the vertical direction, the expansion section 111 may otherwise carry out expansion of higher magnifications.

Also in the image processing apparatus of the fourth embodiment, it is assumed that, although the successive input images A1 to AN picked up at a high rate include aliasing components in the vertical direction, they include no or little aliasing components in the horizontal direction.

FIG. 18A shows an input image An.

Referring to FIG. 18A, a round mark indicates a pixel of the input image An.

It is assumed that the input image An is obtained by sampling a signal, which includes frequency components in the horizontal direction existing within a frequency band from −fh/2 to fh/2 and frequency components in the vertical direction existing within a frequency band from −fs to fs, with the sampling frequency fh in the horizontal direction and sampling the signal with the sampling frequency fs in the vertical direction.

FIG. 18B illustrates a frequency characteristic of the input image An.

It is to be noted that, in FIG. 18B, the axis of abscissa indicates the frequency in the horizontal direction, that is, the horizontal frequency, and the axis of ordinate indicates the frequency in the vertical direction, that is, the vertical frequency.

The input image An includes, in the horizontal direction, only signal components within the frequency band from −fh/2 to fh/2 and, in the vertical direction, within the frequency band from −fs/2 to fs/2, signal components of frequencies lower than the frequency fs/2 of the original signal and aliasing components which are folded back components of signal components having frequencies higher than the signal fs/2 of the original signal.

In FIG. 18B, a solid line curve indicates signal components, and a broken line curve indicates aliasing components.

As described hereinabove, the expansion section 111 shown in FIG. 17 expands the input image An to twice in the horizontal direction and to four times in the vertical direction as described hereinabove to produce an expanded image Bn having a number of pixel numbers equal to eight times that of the input image An.

In particular, the expansion section 111 first expands the input image An to twice in the horizontal direction.

Since the input image An does not include any aliasing component in the horizontal direction, the image obtained by expanding the input image An to twice in the horizontal direction (such image may be hereinafter referred to also as horizontally expanded image) is produced by the expansion process described hereinabove with reference to FIGS. 4A to 4D or 5A to 5D (such expansion process may be hereinafter referred to sometimes as normal expansion process).

In particular, production of a horizontally expanded image of the input image An is carried out by zero-value interpolation of inserting one zero-value point between each adjacent ones of pixels of the input image An in the horizontal direction and filtering of a zero-value interpolation image obtained by the zero-value interpolation by means of a LPF.

FIG. 18C shows a zero-value interpolation image obtained by the zero-value interpolation of inserting one zero-value point between each adjacent pixels in the horizontal direction of the input image An of FIG. 18A.

Referring to FIG. 18C, a blank round mark represents a pixel of the input image An, that is, an original pixel, and a solid round mark represents a pixel as a zero-value point, that is a pixel whose pixel value is zero.

FIG. 18D illustrates a frequency characteristic of the zero-value interpolation image of FIG. 18C.

In the zero-value interpolation image, aliasing components appear in the horizontal direction by the zero-value interpolation of inserting a zero-value point in the horizontal direction.

In order to remove the aliasing components, the expansion section 111 shown in FIG. 17 carries out filtering by a LPF whose pass-band is the frequency band from −fh/2 to fh/2. Although a LPF ideally having filter coefficients of the sinc function is preferably used as the LPF, it has an infinite tap length. Accordingly, the filter coefficients of the LPF are determined by applying a window function to the sinc function.

FIG. 18E shows a horizontally expanded image obtained by filtering the zero-value interpolation image by means of the LPF, and FIG. 18F illustrates a frequency characteristic of the horizontally expanded image.

It is to be noted that, in FIG. 18F, a solid line curve represents signal components and a broken line curve represents aliasing components.

The horizontally expanded image obtained by the filtering by the LPF includes, in the horizontal direction, signal components existing only within the low frequency band from −fh/2 to fh/2 but no signal components existing in the high frequency bands from fh/2 to fh and from −fh to −fh/2 with respect to the sampling frequency 2fh.

Then, the expansion section 111 shown in FIG. 17 expands the horizontally expanded image to four times in the vertical direction to produce an expanded image Bn. The expanded image Bn is obtained by expanding the input image An to twice in the horizontal direction and to four times in the vertical direction.

Since the input image An and hence the horizontally expanded image of the input image An include aliasing components in the vertical direction, production of an expanded image having a size expanded to four times in the vertical direction from the horizontally expanded image is carried out by an expansion process which leaves some high frequency components such as, for example, linear interpolation similarly to that by the expansion section 23 shown in FIG. 9.

In short, production of a vertically expanded image is carried out by zero-value interpolation of inserting three zero-value points between each adjacent pixels in the vertical direction of the horizontally expanded image and filtering of a zero-value interpolation image obtained by the zero-value interpolation by means of a LPF having a filter characteristic which leaves some high frequency components.

FIG. 18G shows a zero-value interpolation image obtained by inserting three zero-value points between each adjacent pixels in the vertical direction of the horizontally expanded image of FIG. 18E.

Referring to FIG. 18G, a blank round mark represents a pixel of the zero-value interpolation image and a solid round mark represents a pixel as a zero-value point.

FIG. 18H illustrates a frequency characteristic of the zero-value interpolation image of FIG. 18G.

In the zero-value interpolation image, signal components in the vertical direction are restored by the zero-value interpolation of inserting zero-value points in the vertical direction, and higher-order aliasing components are produced.

The expansion section 111 shown in FIG. 17 filters the zero-value interpolation image of FIG. 18H by means of a LPF which leaves some high frequency components in the vertical direction to produce an expanded image.

For this LPF, for example, a vertical LPF having filter coefficients of {1/16, 2/16, 3/16, 4/16, 3/16, 2/16, 1/16} can be adopted.

Figure 19:
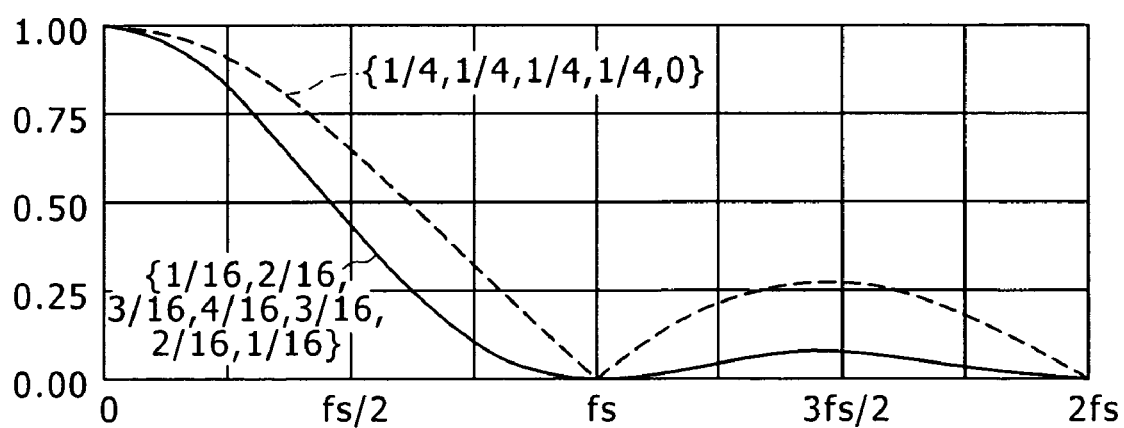
FIG. 19 is a diagrammatic view illustrating a filter characteristic of a vertical LPF having filter coefficients of $\{1/16, 2/16, 3/16, 4/16, 3/16, 2/16, 1/16\}$.

FIG. 19 illustrates a filter characteristic of a vertical LPF having the filter coefficients of {1/16, 2/16, 3/16, 4/16, 3/16, 2/16, 1/16}.

It is to be noted that FIG. 19 illustrates not only a filter characteristic of the filter having the filter coefficients of {1/16, 2/16, 3/16, 4/16, 3/16, 2/16, 1/16} but also another filter characteristic of another filter having filter coefficients of {1/4, 1/4, 1/4, 1/4, 0}.

Referring to FIG. 19, the filter characteristic of the vertical LPF having the filter coefficients of {1/16, 2/16, 3/16, 4/16, 3/16, 2/16, 1/16} is a moderate characteristic that, with respect to the sampling frequency 4fs, the gain is 1 at the frequency 0 and the gain is 0 at the frequency fs. Further, according to the filter characteristic of the vertical LPF having the filter coefficients of {1/16, 2/16, 3/16, 4/16, 3/16, 2/16, 1/16}, the gain increases from the frequency fs to the frequency 1.5fs and then decreases until it becomes back to zero at the frequency 2fs while frequency components in the proximity of the frequency 1.5fs are passed a little.

In the expanded image obtained by filtering the zero-value interpolation image of FIG. 18H by means of the vertical LPF of FIG. 19, aliasing components remain a little in the proximity of the frequency 1.5fs, that is, between the frequencies fs and 2fs.

In order to fully remove the aliasing components in the proximity of the frequency 1.5fs, it is necessary to further filter the expanded image using a wideband LPF whose passband is the frequency band from −fs to fs.

In the expanded image obtained in such a manner as described above, in the vertical direction, with respect to the sampling frequency 4fs, signal components and aliasing components exist in a mixed state within the low frequency region from −fs to fs while no frequency component exists between the high frequency bands from fs to 2fs and from −2fs to −fs.

As described above, in the expanded image obtained by the expansion section 111, frequency components exist only within the one half frequency band from −fh/2 to fh/2 on the low frequency side in the horizontal direction and within the half frequency band from −fs to fs on the low frequency side in the vertical direction while no frequency component exists in the other frequency band, that is, on the frequency band on the high frequency side.

Accordingly, in the image processing apparatus of FIG. 17, the filter of the positioning section 112 may have any filter characteristic in the high frequency band if it can pass the remaining half frequency band on the low frequency side.

In particular, for example, the image processing apparatus of FIG. 9 according to the first embodiment of the present invention desires a multi-tap APF in order to suppress the variation of the filter characteristic in the high frequency region of the filter of the positioning section 24 which varies depending upon the global motion vector obtained by the movement detection section 22.

In contrast, it is necessary for the filters of the positioning section 112 shown in FIG. 17 only to have a gain of 1 in a half frequency band on the lower frequency side from within a band lower than the Nyquist frequency of a zero-value interpolation image in both of the vertical direction and the horizontal direction. Therefore, the filters of the positioning section 112 can be formed using a filter which has a small number of taps and hence is low in characteristic on the high frequency side such as, for example, a four-tap filter which carries out cubic interpolation, that is, a four-tap cubic interpolation filter.

Also in the positioned image obtained by the positioning of the positioning section 112, frequency components exist only in the frequency band from −fh/2 to fh/2 which is one half on the low frequency side in the horizontal direction and in the frequency band from −fs to fs which is one half on the low frequency side in the vertical direction while no frequency component exists in the remaining band on the high frequency side similarly as in the expanded image produced by the expansion section 111.

Further, similarly as in the first embodiment, the positioned image includes no aliasing component in the horizontal direction but includes aliasing components only in the vertical direction. Accordingly, reproduction of signal components in the high frequency regions may be considered only with regard to the vertical direction.

Further, in the output image obtained by the mixture-addition using a positioned image in the image processing apparatus shown in FIG. 17, frequency components likely exist only in the frequency band from −fh/2 to fh/2 which is one half on the low frequency side in the horizontal direction and in the frequency band from −fs to fs which is one half on the low frequency side in the vertical direction while no frequency component exists in the remaining band on the high frequency side.

Accordingly, the separation section 113 shown in FIG. 17 may be configured taking only a frequency band in which such frequency components exist into consideration.

In particular, in the image processing apparatus of FIG. 17 wherein an output image of a high resolution is produced based on the resolution enhancement process described hereinabove, the separation section 113 is formed from a vertical LPF which extracts low frequency components of an output image in the vertical direction in which signal components in the high frequency regions are to be reproduced. For the vertical LPF, a filter having a filter characteristic same as that of the cascade connection filter wherein the filter of the expansion section 111 and the filter of the positioning section 112 are connected in cascade connection is adopted.

However, the vertical LPF of the separation section 113 may be configured taking only a frequency band of an output image in which frequency components exist as described above into consideration, and a filter having a filter characteristic same as that of the cascade connection filter in the frequency band can be adopted. Accordingly, for the vertical LPF of the separation section 113, for example, a filter which carries out filtering in the vertical direction in the expansion section 111, that is, a filter having filter coefficients of {1/16, 2/16, 3/16, 4/16, 3/16, 2/16, 1/16}, can be adopted.

With the image processing apparatus of FIG. 17, flexible resolution enhancement of an image can be anticipated similarly with the image processing apparatus of FIG. 9. Further, in the image processing apparatus of FIG. 17, the filters in the positioning section 112 can be formed from a filter having a smaller number of taps, and the scale and the mathematical operation amount of the apparatus can be reduced.

It is to be noted that, in an output image obtained by the image processing apparatus of FIG. 17, frequency components exist only in the frequency band from −fh/2 to fh/2 which is one half on the low frequency side in the horizontal direction and in the frequency band from −fs to fs which is one half on the low frequency side in the vertical direction while no frequency component exists in the remaining band on the high frequency side similarly as described hereinabove.

Accordingly, the output image can be reduced to one half in the number of pixels in the horizontal direction and/or the vertical direction.

Figure 20:
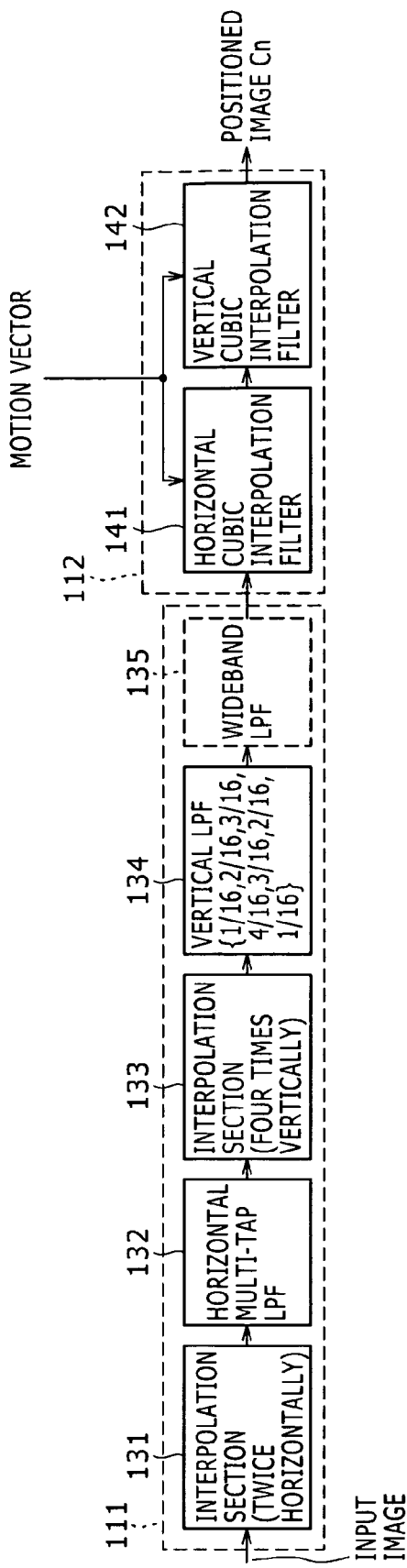
FIG. 20 is a block diagram showing an example of a configuration of an expansion section and a positioning section shown in FIG. 17.

FIG. 20 shows an example of a configuration of the expansion section 111 and the positioning section 112 shown in FIG. 17.

Referring to FIG. 20, the expansion section 111 shown includes an interpolation section 131, a horizontal multi-tap LPF 132, another interpolation section 133, a vertical LPF 134, and a wideband LPF 135.

The interpolation section 131 receives an input image supplied thereto from the storage section 21 shown in FIG. 17. The interpolation section 131 carries out zero-value interpolation of inserting one zero-value point between each adjacent pixels in the horizontal direction of the input image from the storage section 21 to produce a zero-value interpolation image wherein the number of pixels in the horizontal direction is twice that in the input image. Then, the interpolation section 131 supplies the produced zero-value interpolation image to the horizontal multi-tap LPF 132.

The horizontal multi-tap LPF 132 has filter coefficients determined, for example, by applying a window function to the sinc function and has a pass-band lower than the frequency fs/2. The horizontal multi-tap LPF 132 filters the zero-value interpolation image from the interpolation section 131 in the horizontal direction to produce a horizontally expanded image and supplies the horizontally expanded image to the interpolation section 133.

The interpolation section 133 carries out zero-value interpolation of inserting three zero-value points between each adjacent pixels in the vertical direction of the horizontally expanded image from the horizontal multi-tap LPF 132 to produce a zero-value interpolation image having a pixel number in the horizontal direction equal to twice that of the input image and having a pixel number in the vertical direction equal to four times that of the input image. Then, the interpolation section 133 supplies the produced zero-value interpolation image to the vertical LPF 134.

The vertical LPF 134 has, for example, filter coefficients of $\{1/16, 2/16, 3/16, 4/16, 3/16, 2/16, 1/16\}$ and filters the zero-value interpolation image from the interpolation section 133 to produce an expanded image having a pixel number in the horizontal direction equal to twice that of the input image and having a pixel number in the vertical direction equal to four times that of the input image. Then, the vertical LPF 134 supplies the expanded image to the wideband LPF 135.

It is to be noted that the zero-value interpolation by the interpolation section 133 and the filtering by the vertical LPF having the filter coefficients of $\{1/16, 2/16, 3/16, 4/16, 3/16, 2/16, 1/16\}$ in the vertical LPF 134 correspond to expansion of the number of pixels in the vertical direction to four times by linear interpolation.

The wideband LPF 135 has the frequency band from −fs to fs as a pass-band thereof, and filters the expanded image from the vertical LPF 134 in the vertical direction and supplies the filtered expanded image to the positioning section 112.

The positioning section 112 includes a horizontal cubic interpolation filter 141 and a vertical cubic interpolation filter 142.

To the positioning section 112, an expanded image is supplied from the expansion section 111 and a motion vector, that is, a global motion vector, is supplied from the movement detection section 22 shown in FIG. 17.

The horizontal cubic interpolation filter 141 filters, similarly to the horizontal multi-tap APF 71 shown in FIG. 13, the expanded image in the horizontal direction based on the motion vector from the movement detection section 22 to interpolate pixels at positions of pixels of the output image to adjust the position of the expanded image to the position of the output image in the horizontal direction. Then, the horizontal cubic interpolation filter 141 supplies a resulting expanded image to the vertical cubic interpolation filter 142.

The vertical cubic interpolation filter 142 filters, similarly to the vertical multi-tap APF 72 shown in FIG. 13, the expanded image in the vertical direction based on the motion vector from the movement detection section 22 to interpolate pixels at positions of pixels of the output image to adjust the position of the expanded image to the position of the output image in the vertical direction. Consequently, a positioned image whose position is adjusted to the position of the output image in both of the horizontal and vertical directions is produced, and the positioned image is supplied to the mixing section 25 shown in FIG. 17.

It is to be noted that the horizontal cubic interpolation filter 141 and the vertical cubic interpolation filter 142 carry out cubic interpolation by filtering. Further, the horizontal cubic interpolation filter 141 and the vertical cubic interpolation filter 142 can be formed with a small tap number such as, for example, four taps.

Now, processing carried out in the horizontal direction by the expansion section 111 shown in FIG. 20 is described with reference to FIGS. 21A to 21E.

Figure 21A:
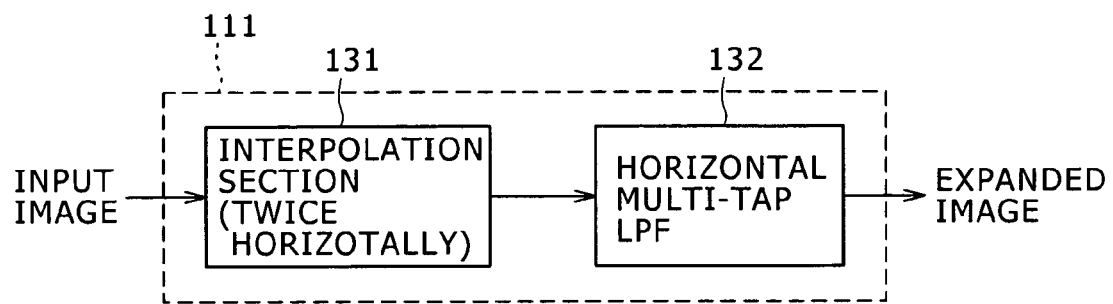
FIGS. 21A to 21E are diagrammatic views illustrating a process carried out for an image in the horizontal direction by the expansion section shown in FIG. 20.

FIG. 21A shows those blocks which carry out a process regarding the horizontal direction from among the components of the expansion section 111 from the interpolation section 131 to the wideband LPF 135.

In the expansion section 111, the interpolation section 131 and the horizontal multi-tap LPF 132 carry out a process regarding the horizontal direction as seen from FIG. 21A.

Figure 21B:
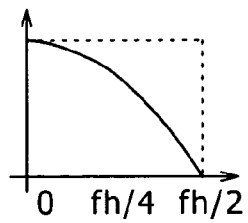

FIG. 21B illustrates a frequency characteristic in the horizontal direction of an input image supplied to the interpolation section 131.

As described hereinabove, the input image includes only signal components in the frequency band lower than the frequency fh/2 in the horizontal direction.

Figure 21C:
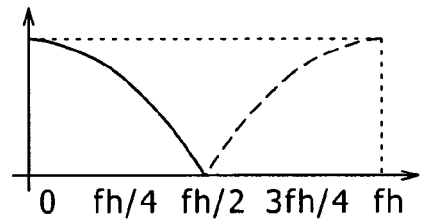

FIG. 21C illustrates a frequency characteristic in the horizontal direction of a zero-value interpolation image obtained by the zero-value interpolation of inserting one zero-value point between each adjacent pixels in the horizontal direction of the input image obtained by the interpolation section 131.

On the zero-value interpolation image, aliasing components are produced in the frequency band exceeding the frequency fh/2 in the horizontal direction by zero-value interpolation of inserting zero-value points in the horizontal direction.

Figure 21D:
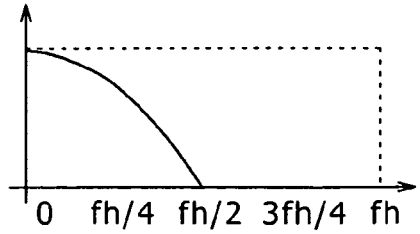
Figure 21E:
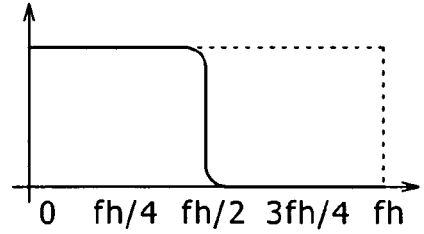

FIG. 21D illustrates a frequency characteristic of a horizontally expanded image obtained by filtering the zero-value interpolation image of FIG. 21C by means of the horizontal multi-tap LPF 132.

In the horizontally expanded image obtained by the filtering by the horizontal multi-tap LPF 132, signal components exist only in the frequency band lower than the frequency fh/2 while no frequency component exists at frequencies exceeding the frequency fh/2 in the horizontal direction.

FIG. 21D illustrates a filter characteristic of the horizontal multi-tap LPF 132.

The horizontal multi-tap LPF 132 has a pass-band lower than the frequency fh/2 and is formed with multiple taps such that the gain drops steeply, that is, steep roll-off is exhibited, at the frequency fh/2.

Now, a process carried out in the horizontal direction by the positioning section 112 shown in FIG. 20 is described with reference to FIGS. 22A to 22D.

Figure 22A:
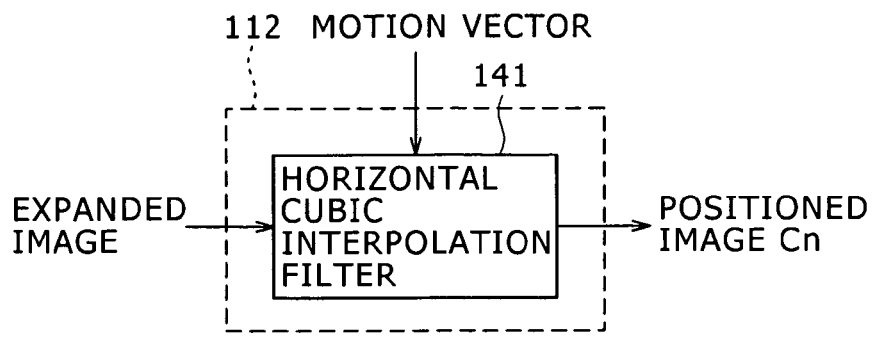
FIGS. 22A to 22D are diagrammatic views illustrating a process carried out for an image in the horizontal direction by the positioning section shown in FIG. 20.

FIG. 22A shows the component which carries out a process in the horizontal direction from among the horizontal cubic interpolation filter 141 and the vertical cubic interpolation filter 142 which compose the positioning section 112.

In the positioning section 112, the horizontal cubic interpolation filter 141 carries out processing regarding the horizontal direction as seen in FIG. 22A.

Figure 22B:
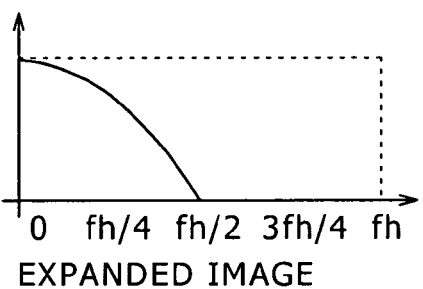

FIG. 22B illustrates a frequency characteristic of the horizontally expanded image supplied from the expansion section 111 shown in FIG. 20 to the horizontal cubic interpolation filter 141 and is same as FIG. 21D.

Figure 22C:
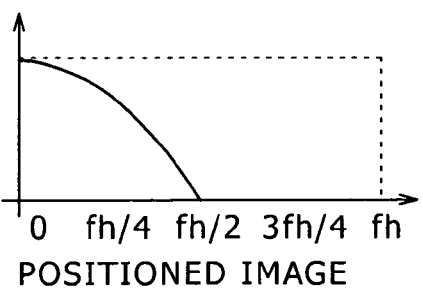

FIG. 22C illustrates a frequency characteristic of a positioned image obtained by adjusting the position in the horizontal direction of a horizontally expanded image, which is obtained by filtering the horizontally expanded image of FIG. 22B by means of the horizontal cubic interpolation filter 141, to the position of the output image.

Figure 22D:
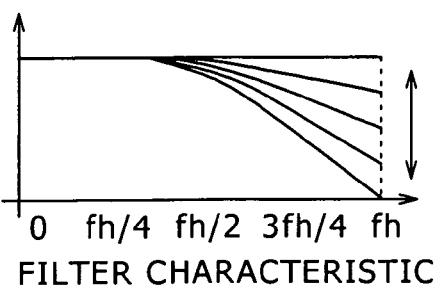

FIG. 22D illustrates a filter characteristic of the horizontal cubic interpolation filter 141.

The horizontal cubic interpolation filter 141 is, for example, a four-tap filter which carries out filtering of carrying out cubic interpolation in the horizontal direction based on a motion vector supplied from the movement detection section 22. The horizontal cubic interpolation filter 141 has a filter characteristic such that, as seen from FIG. 22D, the gain on the high frequency side, that is, on the frequency side exceeding the frequency fh/2, varies depending upon the motion vector supplied from the movement detection section 22, but on the low frequency side, that is, on the frequency side lower than the frequency fh/2, is substantially equal to 1.

Therefore, the positioned image obtained by filtering the expanded image, which has only frequency components lower than the frequency fh/2 of FIG. 22B, by means of the horizontal cubic interpolation filter 141 having the filter characteristic of FIG. 22D maintains the frequency characteristic of the expanded image of FIG. 22B as it is as seen in FIG. 22C.

Now, a process carried out with regard to the vertical direction by the expansion section 111 shown in FIG. 20 is described with reference to FIGS. 23A to 23G.

Figure 23A:
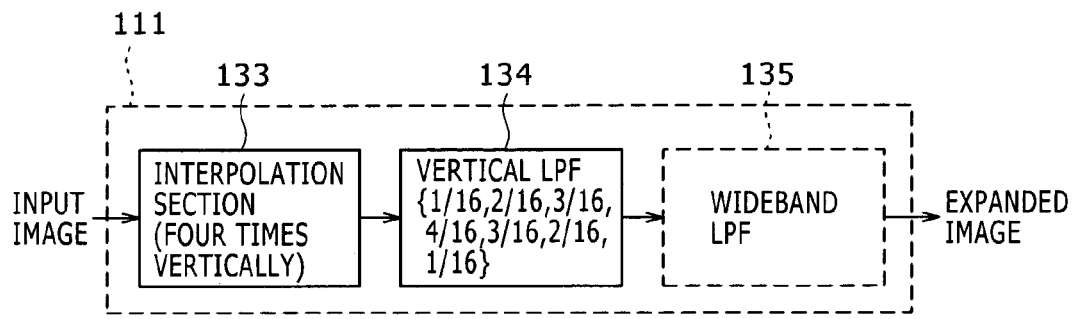
FIGS. 23A to 23G are diagrammatic views illustrating a process carried out for an image in the vertical direction by the expansion section shown in FIG. 20.

FIG. 23A shows those blocks which carry out processing regarding the vertical direction from among the components of the expansion section 111 from the interpolation section 131 to the wideband LPF 135.

In the expansion section 111, the interpolation section 133, vertical LPF 134 and wideband LPF 135 carry out processing regarding the vertical direction as seen in FIG. 23A.

Figure 23B:
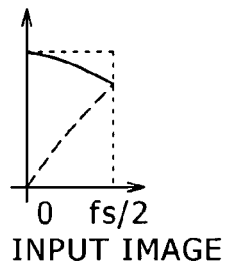

FIG. 23B illustrates a frequency characteristic in the vertical direction of an input image, that is, a horizontally expanded image, supplied to the interpolation section 133.

As described hereinabove, the input image includes, in the vertical direction, signal components and aliasing components lower than the frequency fs/2.

Figure 23C:
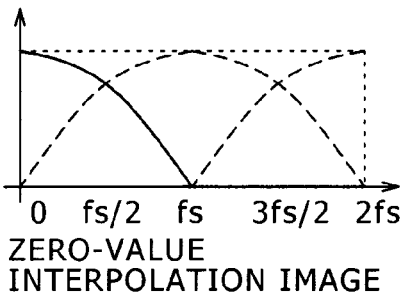

FIG. 23C illustrates a frequency characteristic in the vertical direction of a zero-value interpolation image obtained by zero-value interpolation of inserting three zero-value points between each adjacent pixels in the vertical direction of the input image of FIG. 23B obtained by the interpolation section 133.

In the zero-value interpolation image, although signal components in the frequency bands exceeding the frequency fs/2 in the vertical direction are reproduced by the zero-value interpolation of inserting zero-value points in the vertical direction, also aliasing components are reproduced.

Figure 23D:
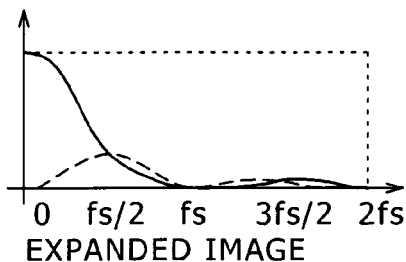

FIG. 23D illustrates a frequency characteristic in the vertical direction of an expanded image obtained by filtering the zero-value interpolation image of FIG. 23C by means of the vertical LPF 134.

Figure 23E:
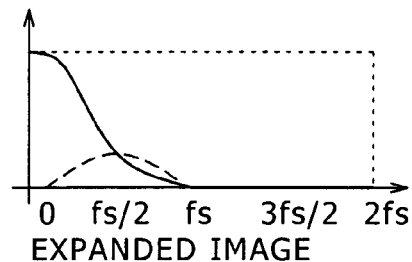

FIG. 23E illustrates a frequency characteristic in the vertical direction of an expanded image obtained by filtering the expanded image of FIG. 23D by means of the wideband LPF 135.

Figure 23F:
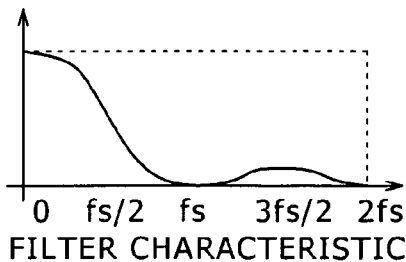
Figure 23G:
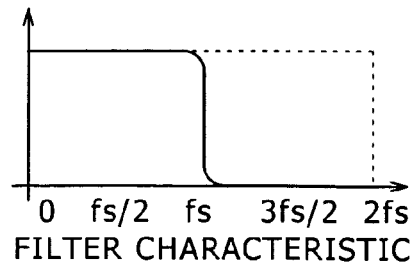

FIG. 23F illustrates a filter characteristic of the vertical LPF 134. FIG. 23G illustrates a frequency characteristic of the wideband LPF 135.

The vertical LPF 134 has filter coefficients of $\{1/16, 2/16, 3/16, 4/16, 3/16, 2/16, 1/16\}$ as described hereinabove with reference to FIG. 20 and has a moderate filter characteristic which indicates the gain 1 at the frequency 0 and indicates the gain 0 at the frequency fs as seen in FIG. 23F. Further, the vertical LPF 134 has such a filter characteristic that the gain increases from the frequency fs to 1.5fs but decreases until it becomes zero at the frequency 2fs and passes a little amount of frequency components in the proximity of the frequency 1.5fs.

Therefore, in the expanded image obtained by filtering the zero-value interpolation image of FIG. 23C, as seen from FIG. 23D, frequency components including signal components and aliasing components lower than the frequency fs/2 of FIG. 23C almost remain, and frequency components including signal components and aliasing components from the frequency fs/2 to the frequency fs of FIG. 23C remain a little amount while frequency components higher than the frequency fs of FIG. 23C remain a little amount.

The wideband LPF 135 has a filter characteristic that it has a pass-band lower than the frequency fs as seen in FIG. 23G and the gain drops steeply at the frequency fs.

When the expanded image of FIG. 23D is filtered by the wideband LPF 135 having the filter characteristic of FIG. 23G, frequency components which remain by a small amount at frequencies higher than the frequency fs are removed. Consequently, the expanded image is clear of frequency components higher than the frequency fs as seen in FIG. 23E.

Now, a process carried out in the vertical direction by the positioning section 112 shown in FIG. 20 is described with reference to FIGS. 24A to 24D.

Figure 24A:
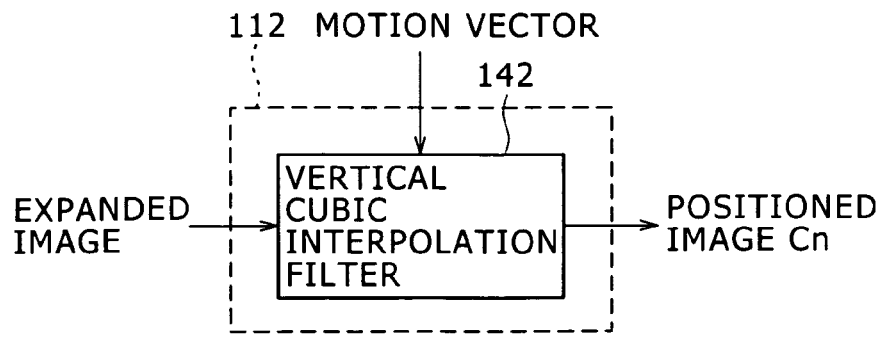
FIGS. 24A to 24D are diagrammatic views illustrating a process carried out for an image in the vertical direction by the positioning section shown in FIG. 20.

FIG. 24A shows the component which carries out a process in the vertical direction from among the vertical cubic interpolation filter 141 and the vertical cubic interpolation filter 142 which compose the positioning section 112.

In the positioning section 112, the vertical cubic interpolation filter 142 carries out processing regarding the vertical direction as seen in FIG. 24A.

Figure 24B:
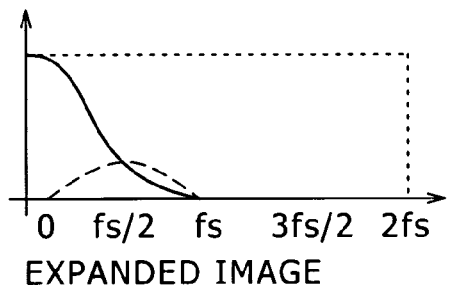

FIG. 24B illustrates a frequency characteristic of the expanded image supplied from the horizontal cubic interpolation filter 141 shown in FIG. 20 to the vertical cubic interpolation filter 142 and is same as FIG. 23E.

Figure 24C:
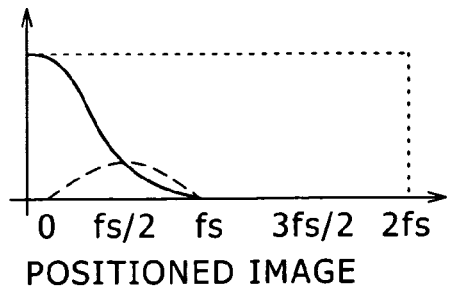

FIG. 24C illustrates a frequency characteristic in the vertical direction of a positioned image obtained by adjusting the position in the vertical direction of an expanded image, which is obtained by filtering the expanded image of FIG. 24B by means of the vertical cubic interpolation filter 142, to the position of the output image.

Figure 24D:
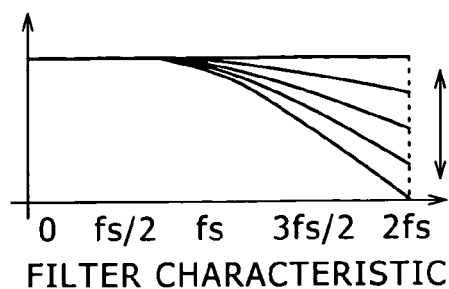

FIG. 24D illustrates a filter characteristic of the vertical cubic interpolation filter 142.

The vertical cubic interpolation filter 142 is, for example, a four-tap filter which carries out filtering of carrying out cubic interpolation in the vertical direction based on a motion vector supplied from the movement detection section 22. The vertical cubic interpolation filter 142 has a filter characteristic such that, as seen from FIG. 24D, the gain on the high frequency side, that is, on the frequency side exceeding the frequency fs, varies depending upon the motion vector supplied from the movement detection section 22, but on the low frequency side, that is, on the frequency side lower than the frequency fs, is substantially equal to 1.

Therefore, the positioned image obtained by filtering the expanded image, which has only frequency components lower than the frequency fs/2 of FIG. 24B, by means of the vertical cubic interpolation filter 142 having the filter characteristic of FIG. 24D maintains the frequency characteristic of the expanded image of FIG. 24B as it is as seen in FIG. 24C.

In particular, the positioned image obtained as a result of the filtering by the vertical cubic interpolation filter 142 includes signal components and aliasing components in the vertical direction at frequencies lower than the frequency fs.

Figure 25:
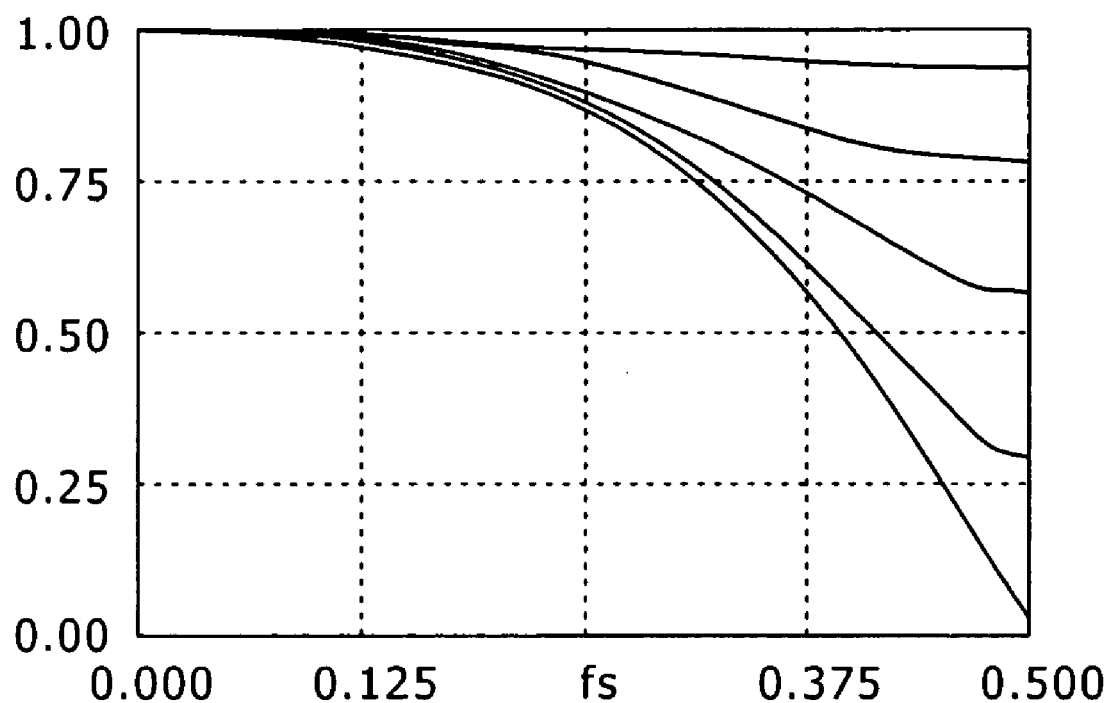
FIG. 25 is a diagrammatic view illustrating a detailed frequency characteristic of a vertical cubic interpolation filter shown in FIG. 24A.

FIG. 25 illustrates a more detailed frequency characteristic of the vertical cubic interpolation filter 142.

The vertical cubic interpolation filter 142 has such a filter characteristic that the gain on the frequency side exceeding the frequency sampling frequency fs varies depending upon the motion vector supplied from the movement detection section 22, but is substantially equal to 1 on the frequency side lower than the frequency fs.

Now, the separation section 113 shown in FIG. 17 is described with reference to FIGS. 26A to 26C.

Figure 26A:
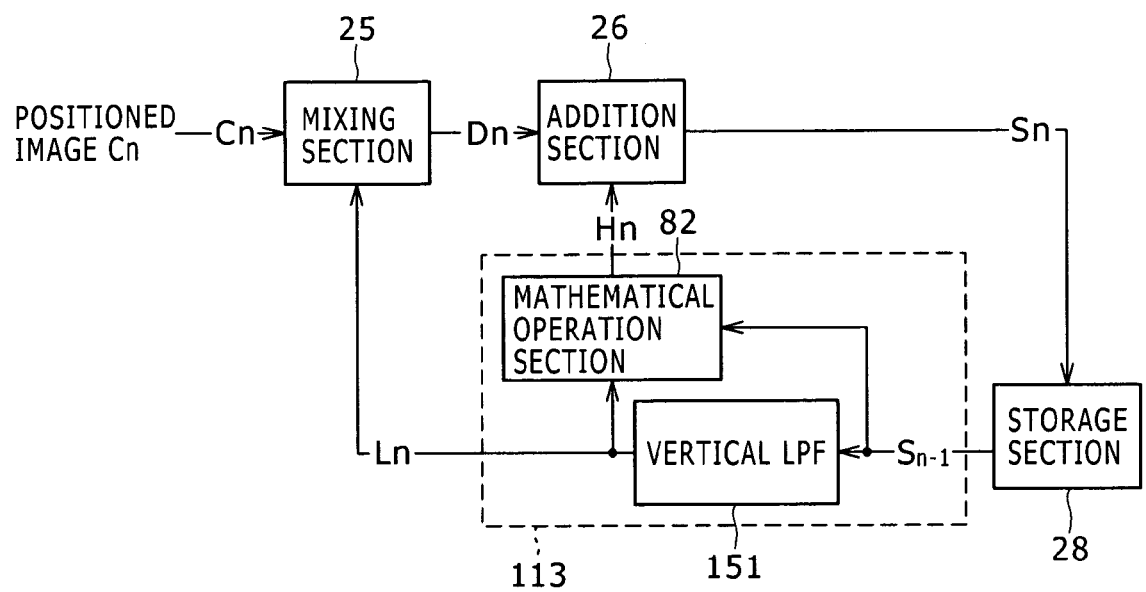
FIGS. 26A to 26C are diagrammatic views illustrating a process of a separation section shown in FIG. 17.

FIG. 26A shows an example of a configuration of the separation section 113 shown in FIG. 17.

Referring to FIG. 26A, the separation section 113 is common to the separation section 27 shown in FIG. 14A in that it includes the mathematical operation section 82 but is different from the separation section 27 shown in FIG. 14A in that it includes a vertical LPF 151 in place of the vertical LPF 81.

The vertical LPF 151 vertically filters the output image Sn−1 stored in the storage section 28 to extract low frequency components Ln of the output image Sn−1 and supplies the low frequency components Ln to the mathematical operation section 82 and the mixing section 25.

Figure 26B:
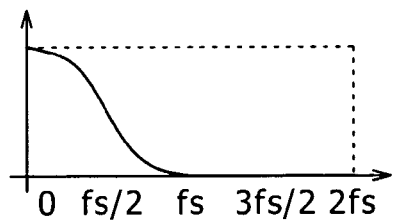

FIG. 26B illustrates a filter characteristic of the vertical LPF 151.

The vertical LPF 151 of the separation section 113 has, as a filter characteristic in the vertical direction which is a direction of aliasing components included in an input image, a characteristic same as that of a cascade connection filter wherein the interpolation section 133 and the wideband LPF 135 shown in FIG. 20 which are filters of the expansion section 111 and the vertical cubic interpolation filter 142 shown in FIG. 20 which is a filter of the positioning section 112 are connected in cascade connection.

Figure 26C:
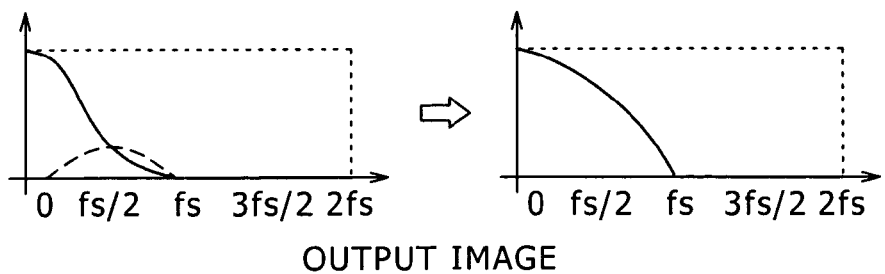

FIG. 26C illustrates a variation of the frequency characteristic in the vertical direction of the output image Sn obtained by the image processing apparatus of FIG. 17.

It is to be noted that, in FIG. 26C, a solid line curve indicates signal components and a broken line curve indicates aliasing components.

If the first frame from among the input images of N frames stored in the storage section 21 shown in FIG. 17 is determined as a noticed image, then an expanded image B1 of the input image A1 of the first frame is stored as it is as an output image S1 into the storage section 28.

Thereafter, mixture-addition wherein the positioned image Cn from the positioning section 112 and the low frequency components Ln of the output image Sn−1 are mixed by the mixing section 25 to produce a mixture image Dn and the mixture image Dn and the high frequency components Hn of the output image Sn−1 are added by the addition section 26 to produce a new output image Sn is repeated while the input images of N frames stored in the storage section 21 shown in FIG. 17 are successively determined as a noticed image.

When the mixture-addition described above is repeated, although the output image Sn obtained by the mixture-addition carried out using the input image A1 of the first frame as a noticed image has a resolution same as that of the input image A1 and includes aliasing components, as the mixture-addition progresses, that is, as the number of input images An used as a noticed image increases, the output image Sn obtained by the mixture-addition becomes an image of higher picture quality which has a higher resolution by restoration of signal components in the high frequency regions from fs/2 to fs and besides wherein the aliasing components are gradually attenuated as seen from FIG. 26C in accordance with the resolution enhancement principle described hereinabove.

Figure 27A:
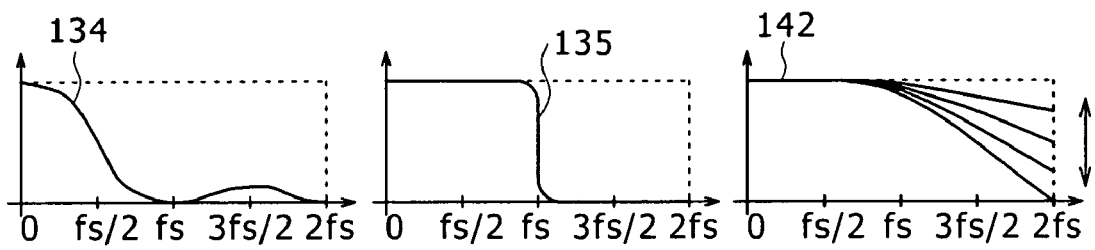
FIGS. 27A to 27C are diagrammatic views illustrating a filter characteristic of a vertical LPF shown in FIG. 26A.
Figure 27B:
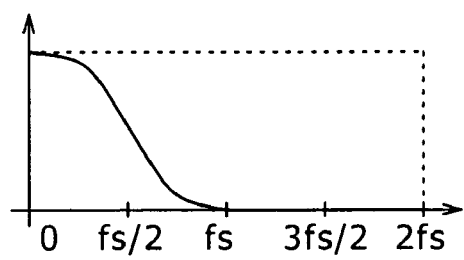
Figure 27C:
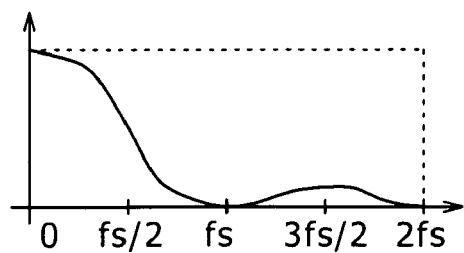

Now, a filter characteristic of the vertical LPF 151 included in the separation section 113 shown in FIG. 26A is described further with reference to FIGS. 27A to 27C.

FIG. 27A illustrates filter characteristics of the vertical LPF 134 and wideband LPF 135 of the expansion section 111 and the vertical cubic interpolation filter 142 of the positioning section 112 shown in FIG. 20.

FIG. 27B illustrates a filter characteristic of a cascade connection filter wherein the vertical LPF 134 and the wideband LPF 135 of the expansion section 111 and the vertical cubic interpolation filter 142 of the positioning section 112 shown in FIG. 20 are connected in cascade connection.

According to the cascade connection filter, the gain at frequencies lower than the frequency fs is similar to that of the vertical LPF 134 illustrated in FIG. 27A and is zero at frequencies higher than the frequency fs as seen in FIG. 27B.

Here, the gain at frequencies higher than the frequency fs of the cascade connection filter is zero by an influence of the wideband LPF 135 shown in FIG. 27A.

For the vertical LPF 151 of the separation section 113 shown in FIG. 26, ideally a LPF of a filter characteristic whose gain is zero at frequencies higher than the frequency fs as illustrated in FIG. 27B should be adopted.

However, the vertical LPF 134 of the expansion section 111 shown in FIG. 20 merely passes, at frequencies higher than the frequency fs, a little amount of frequency components in the proximity of the frequency 1.5fs as described hereinabove with reference to FIG. 23F. Accordingly, the gain of the vertical LPF 134 at frequencies higher than the frequency fs is very close to zero.

Accordingly, the vertical LPF 134 of the expansion section 111 has a filter characteristic similar to that of the cascade connection filter illustrated in FIG. 27B. For the vertical LPF 151 of the separation section 113 shown in FIG. 26A, not only a filter having a filter characteristic same as that of the cascade connection filter but also a filter same as the vertical LPF 134 having a filter characteristic similar to the filter characteristic just described can be adopted.

In particular, since the vertical LPF 134 shown in FIG. 20 is a vertical LPF having the filter coefficients of $\{1/16, 2/16, 3/16, 4/16, 3/16, 2/16, 1/16\}$, also for the vertical LPF 151 of the separation section 113 shown in FIG. 26A, a vertical LPF having the filter coefficients of $\{1/16, 2/16, 3/16, 4/16, 3/16, 2/16, 1/16\}$ can be adopted.

Figure 28:
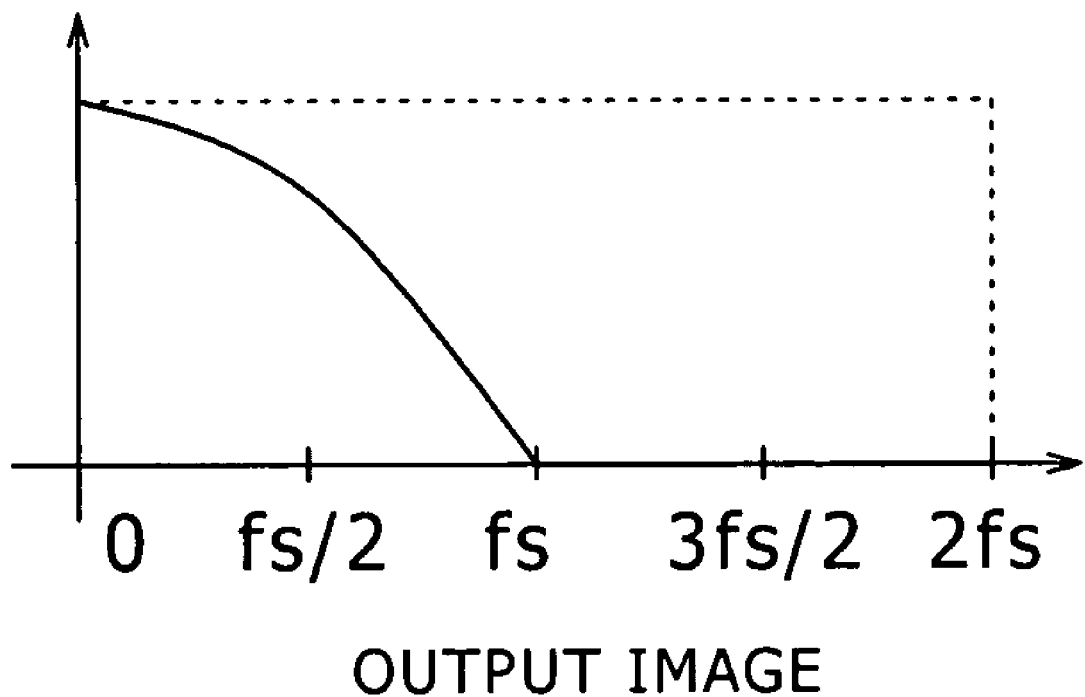
FIG. 28 is a diagrammatic view illustrating a frequency characteristic of an output image of the image processing apparatus of FIG. 17.

FIG. 28 illustrates a frequency characteristic in the vertical direction of an output image obtained by the image processing apparatus of FIG. 17.

As described hereinabove, the output image obtained by the image processing apparatus of FIG. 17 includes, in the vertical direction, frequency components only in the frequency band lower than the frequency fs, but includes no frequency components in the frequency bands of the higher frequency side including the frequency band from fs to 2fs. Accordingly, the output image whose sampling frequency in the vertical direction is raised to the frequency 4fs by the zero-value interpolation can be reduced to ½ in terms of the pixel number in the vertical direction.

It is to be noted that, while, in the expansion section 111 shown in FIG. 20, the interpolation section 133 carries out zero-value interpolation and the vertical LPF 134 carries out filtering to increase the number of pixels in the vertical direction to four times, in actual packaging, the number of pixels in the vertical direction can be increased to four times by merely carrying out linear interpolation.

Further, while, in the expansion section 111 shown in FIG. 20, the vertical LPF 134 and the wideband LPF 135 are provided separately from each other, they may otherwise be formed from a single filter.

Furthermore, since the vertical LPF 134 of the expansion section 111 shown in FIG. 20 has the gain which is proximate to zero at frequencies higher than the frequency fs as seen in FIG. 23F, the expansion section 111 may be configured without including the wideband LPF 135 for removing frequency components of frequencies higher than the frequency fs.

Further, while, in the expansion section 111 shown in FIG. 20, the vertical LPF 134 which carries out linear interpolation is adopted as a filter of the expansion section 111, for example, a filter which carries out nearest neighbor interpolation, another filter which carries out cubic interpolation or some other filter can be adopted in place of the vertical LPF 134.

Further, the image processing apparatus of FIG. 17 can produce an output image from which noise components are removed as well as an output image from which aliasing components are removed similarly to the image processing apparatus of FIG. 9 and so forth.

Fifth Embodiment

Figure 29:
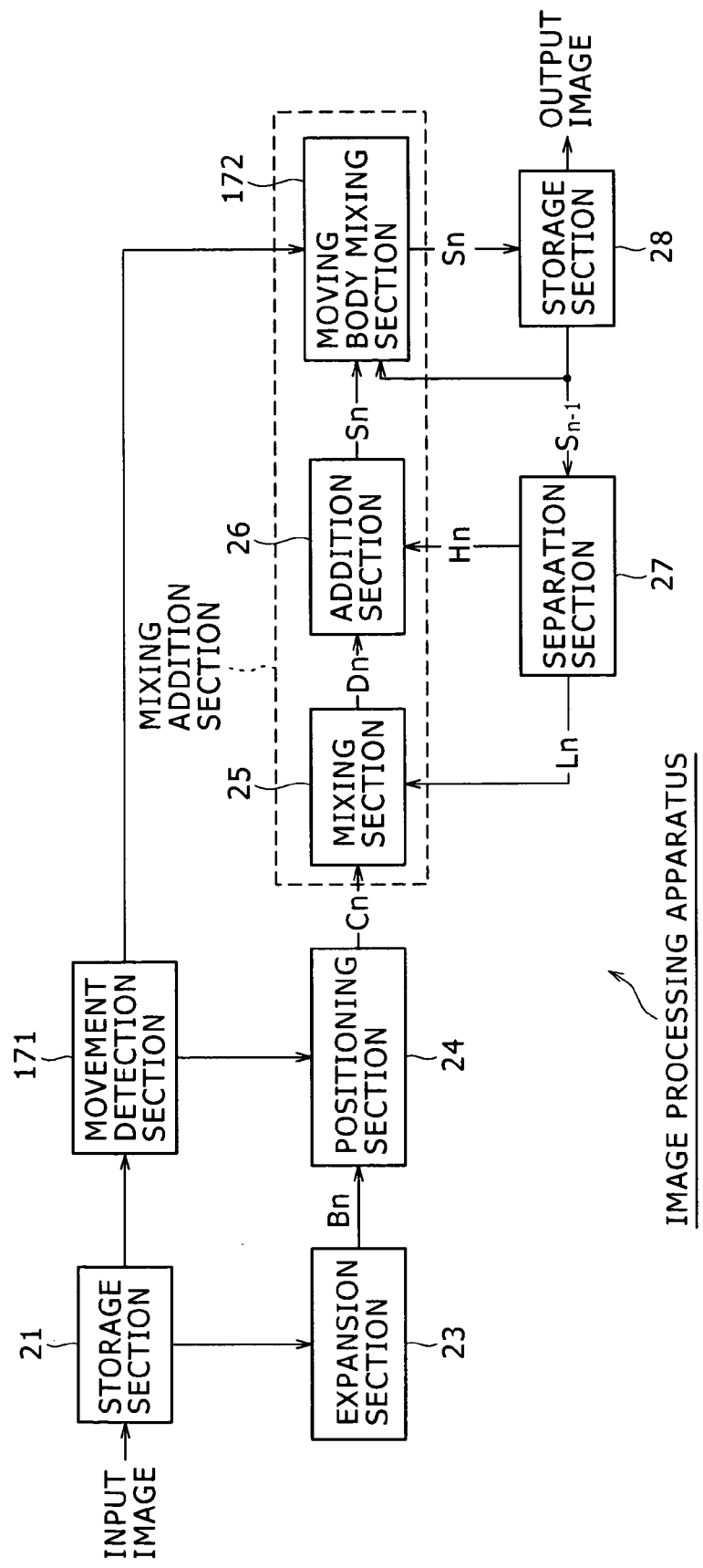
FIG. 29 is a block diagram showing an example of a configuration of the image processing apparatus of FIG. 2 according to a fifth embodiment of the present invention.

FIG. 29 shows an example of a configuration of the image processing apparatus of FIG. 2 according to a fifth embodiment of the present invention.

Referring to FIG. 29, the image processing apparatus shown includes a storage section 21, an expansion section 23, a positioning section 24, a mixing section 25, an addition section 26, a separation section 27 and a storage section 28 similarly to the image processing apparatus of FIG. 9.

However, the image processing apparatus of FIG. 29 is different from the image processing apparatus of FIG. 9 in that it includes a movement detection section 171 in place of the movement detection section 22 and additionally includes a moving body mixing section 172.

It is to be noted that not the image processing apparatus of FIG. 9 but an image processing apparatus which carries out still picture mixture-addition such as, for example, the image processing apparatus described hereinabove with reference to FIG. 17 may be configured in such a manner as shown in FIG. 29.

While it is assumed that, in the image processing apparatus of FIG. 9, only an image of an image pickup object which exhibits no or little movement is included in the input image An, the input image An may possibly include an image of a moving image pickup object, which is hereinafter referred to as moving body.

Where the input image An includes an image of a moving body, according to the image processing apparatus of FIG. 9, the moving body whose image is included in and which is positioned at different positions of the input images A1 to AN of N frames appears on the output image as a result of the mixture-addition. Consequently, the output image comes to have movement blurring as in the case of a photograph which is picked up for a long period of exposure time.

In the image processing apparatus of FIG. 29, even if an image of a moving body is included in the input image An, an output image free from movement blurring can be produced.

In particular, referring to FIG. 29, the movement detection section 171 detects a motion vector similarly to the movement detection section 22 shown in FIGS. 9 and 10 and supplies the motion vector to the positioning section 24. Further, the movement detection section 171 uses the input image A1 stored in the storage section 21 and determined as a standard image and the input image An stored in the storage section 21 and determined as an object of mixture-addition to decide the degree of a movement of each pixel of an expanded image Bn after positioning, that is, of a positioned image Cn, with respect to the expanded image B1 and hence an output image Sn−1 obtained in the immediately preceding operation cycle. Then, the movement detection section 171 supplies movement information representative of degrees of such movement to the moving body mixing section 172.

It is to be noted that the degree of the movement of each pixel of the expanded image Bn to be decided by the movement detection section 171 can be decided not from the input images A1 and An but from expanded images B1 and Bn. However, since the input images A1 and An include a smaller number of pixels than the expanded images B1 and Bn, the mathematical operation amount can be reduced where the input images A1 and An are used rather than where the expanded images B1 and Bn are used.

The moving body mixing section 172 corresponds to the mixing section 25 and addition section 26 and to the mixing addition section 15 shown in FIG. 2.

To the moving body mixing section 172, motion information is supplied from the movement detection section 171 and a new output image Sn is supplied from the addition section 26 and besides the output image Sn−1 obtained in the immediately preceding operation cycle is supplied.

The moving body mixing section 172 carries out moving body mixture of mixing the output image Sn−1 obtained in the immediately preceding operation cycle and the new output image Sn in accordance with the weight determined based on the motion information supplied from the movement detection section 171 such that, in regard to a pixel which exhibits some movement, the weight has a high value for the output image Sn−1 obtained in the immediately preceding operation cycle, but in regard to a pixel which exhibits no movement, the weight has a high value for the new output image Sn to correct the new output image Sn. Then, the moving body mixing section 172 supplies the corrected output image Sn to the storage section 28.

Here, it is assumed that the movement information supplied from the movement detection section 171 to the moving body mixing section 172 is represented by $\beta$ and assumes a real number value within a range from 0 to 1. It is to be noted that, when the movement information $\beta$ has the value of 0, it represents that the pixel is in a stationary state or exhibits no movement, and as the value of the movement information $\beta$ increases, the magnitude of the movement increases.

Further, from within the movement information $\beta$, the movement information representing a degree of movement of a pixel at a position t of the expanded image Bn after the positioning is represented by $\beta(t)$, the pixel value of the pixel at the position t of the new output image Sn by $s(t)$, and the pixel value of the pixel at the position t of the output image Sn−1 obtained in the immediately preceding operation cycle by $s'(t)$.

The moving body mixing section 172 carries out moving body mixture for each pixel of the output image Sn−1 obtained in the immediately preceding operation cycle, which is also a pixel of the new output image Sn, in accordance with the following expression (15) to correct the new output image Sn:

$$s(t)=\beta(t)\times s'(t)+(1-\beta(5))\times s(t) \quad (15)$$

Now, if it assumed that the movement information β is 0 or 1 in order to simply the description, then according to the expression (15), for a pixel whose movement information β is 0 and which exhibits no movement, the pixel value of the new output image Sn is adopted as it is as a pixel value of the new output image Sn after the correction, but for another pixel whose movement information β is 1 and which exhibits some movement, the pixel value of the output image Sn obtained in the immediately preceding operation cycle is adopted as a pixel value of the new output image Sn after the correction.

In this instance, at a portion of an output image which corresponds to a portion of the input images A1 and An at which an image of a moving body is included, the input image A1 appears, and at the other portion of the output image, an image whose picture quality is enhanced by the mixture-addition appears.

With the image processing apparatus of FIG. 29, flexible resolution enhancement of an image can be achieved similarly to the image processing apparatus of FIG. 9.

Further, since, in the image processing apparatus of FIG. 29, a result of the mixture-addition of a portion at a moving body by the moving body mixture does not appear on an output image, where the input image An includes an image of a moving body, appearance of movement blurring arising from the moving body on the output image can be prevented. It is to be noted that, as regards a portion any other than the portion at the moving body, that is, as regards a portion of an image of an image pickup object in a stationary state, aliasing components are removed by the mixture-addition and besides the resolution is enhanced, that is, signal components of frequencies higher than the Nyquist frequency are restored.

The image processing apparatus of FIG. 29 can be applied to a home use video camera or the like which handles images of the interlace type and has, for example, a function of producing a still picture of high quality from a plurality of consecutive frames of a dynamic picture and storing the still picture into a storage or recording medium such as an external memory.

It is to be noted that, with the existing resolution enhancement technique which involves the motion detection process, wideband interpolation process and weighted addition process described hereinabove, it is difficult to vary the number of frames or images for which mixture or weighted addition is carried out by a weighted addition process depending upon whether or not an image of a moving body is included in a processing object image.

Figure 30:
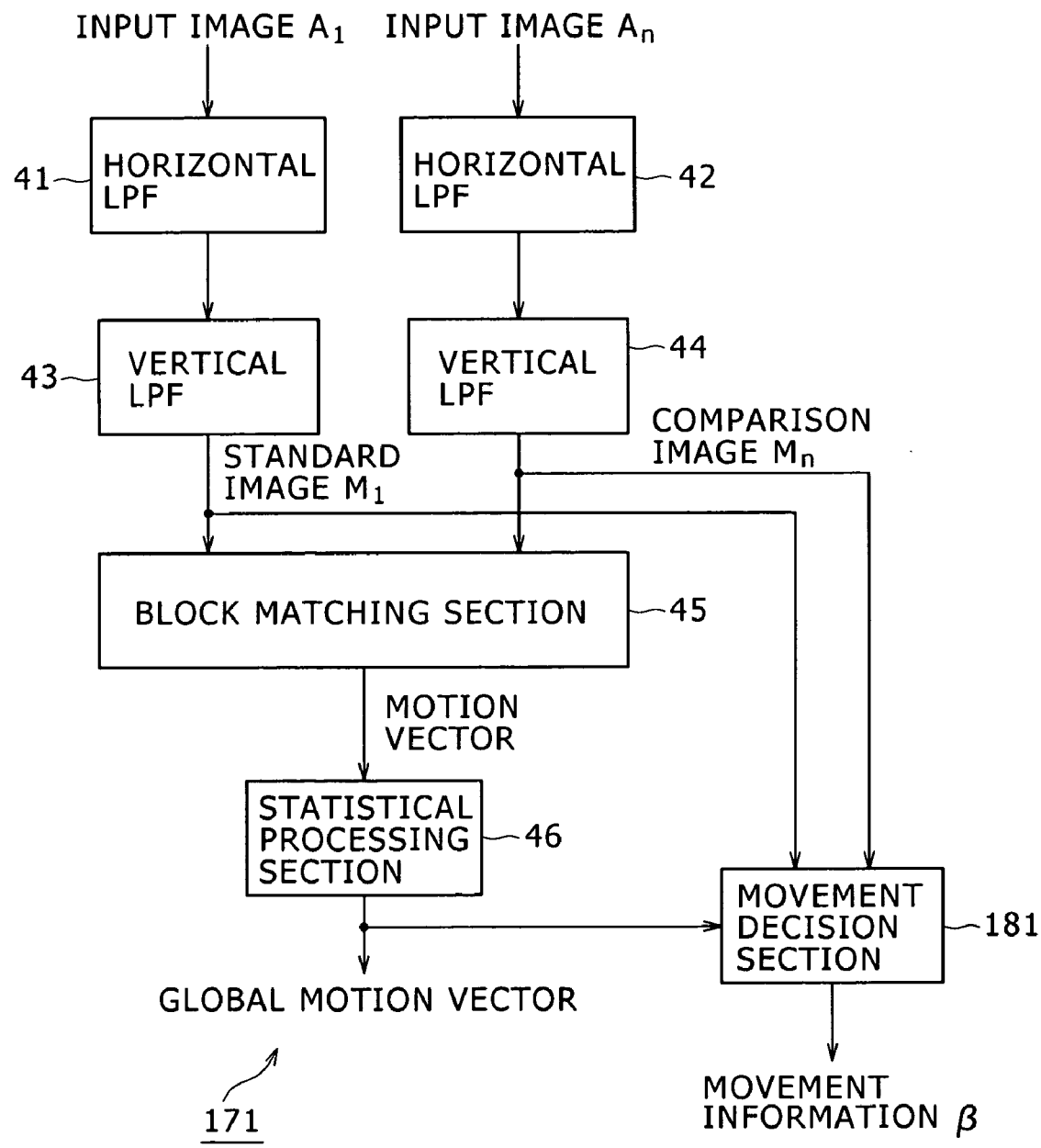
FIG. 30 is a block diagram showing an example of a configuration of a movement detection section shown in FIG. 29.

FIG. 30 shows an example of a configuration of the movement detection section 171 shown in FIG. 29.

Referring to FIG. 30, the movement detection section 171 shown is common to the movement detection section 22 of FIG. 10 in that it includes horizontal LPFs 41 and 42, vertical LPFs 43 and 44, a block matching section 45 and a statistical processing section 46 but is different from the movement detection section 22 of FIG. 10 in that it additionally includes a movement decision section 181.

To the movement decision section 181, a standard image M1 is supplied from the vertical LPF 43 and a comparison image Mn is supplied from the vertical LPF 44. Further, a motion vector, that is, a global motion vector, is supplied from the statistical processing section 46 to the movement decision section 181.

The movement decision section 181 carries out positioning of adjusting the position of the comparison image Mn from the vertical LPF 44 to the position of the standard image M1 from the vertical LPF 43 based on the motion vector from the statistical processing section 46. The movement decision section 181 successively determines the pixels of the comparison image Mn after the positioning as a noticed pixel.

Further, the movement decision section 181 determines a difference absolute value s of pixel values of the noticed pixel of the comparison image Mn after the positioning and a corresponding pixel of the standard image M1, that is, a pixel of the standard image M1 at a position same as that of the noticed pixel.

Then, the movement decision section 181 decides a relationship in magnitude between the difference absolute value s and a predetermined threshold value and decides the degree of movement of the noticed pixel based on the decided relationship in magnitude to determine movement information β representative of the degree of the movement of the noticed pixel.

In particular, the movement decision section 181 uses two threshold values Th1 and Th2, which satisfy an expression of Th1<Th2, to set the movement information β such that, for example, when the difference absolute value s satisfies an expression of s<Th1, the movement information β is set to β=0.0, but when the difference absolute value s satisfies another expression of Th1≦s≦Th2, the movement information β is set to β=(s−Th1)/(Th2−Th1).

On the other hand, where the difference absolute value s satisfies a further expression of s>Th2, the movement decision section 181 sets the movement information β=1.0.

Here, if the pixel values of the standard image M1 and the comparison image Mn are represented, for example, in 10 bits, then the threshold values Th1 and Th2 may be set, for example, to Th1=8.0 and Th2=16.0, respectively.

It is to be noted that, while, in the case described above, the movement information β is determined based on the difference absolute value s determined in a unit of a pixel, it is otherwise possible, for example, to determine, in a unit of a block composed of a plurality of pixels, the sum total s' of the difference absolute value of the pixel value of the pixels which form the block and use the sum total s' in a similar manner to the difference absolute value s to determine the movement information β. In this instance, the movement information β of those pixels which form each block is same among the pixels.

The movement information β obtained for each pixel of the comparison image Mn may be further subjected to a dilation process in order to prevent inadvertent drop of a moving portion.

Here in FIG. 29, since an expanded image having a number of pixels doubled only in the vertical direction of an input image is determined by the expansion section 23, the number of pixels in the vertical direction of the expanded image Bn after the positioning is equal to twice the number of pixels in the vertical direction of the comparison image Mn after the positioning.

Therefore, the movement detection section 171 determines the movement information β of each pixel of the expanded image Bn after the positioning by linear interpolation or the like using the movement information β of each pixel of the comparison image Mn after the positioning and supplies the determined movement information β to the moving body mixing section 172.

Further, while, in the case described above, the movement detection section 171 determines the movement information β of each pixel of the expanded image Bn after the positioning, that is, of the positioned image Cn, the movement detection section 171 may determine the movement information β of each pixel of the expanded image Bn before the positioning in place of the expanded image Bn after the positioning, that is, of the positioned image Cn, as occasion demands.

In particular, while the image processing apparatus of FIG. 29 carries out still picture mixture-addition, when the still picture mixture-addition is carried out, the movement detection section 171 determines the movement information β of each pixel of the expanded image Bn after the positioning.

Further, in an image processing apparatus hereinafter described which carries out dynamic picture mixture-addition, the movement detection section 171 determines an input image An of an object of the mixture-addition as a standard image and determines an input image An-1 preceding by one frame to the standard image as a comparison image to determine a motion vector and a global motion vector. Further, the movement detection section 171 carries out positioning of adjusting the position of the input image An-1 preceding by one frame to the position of the input image An based on the motion vector. Then, the movement detection section 171 determines the difference absolute value s between the input image An and the input image An-1 after the positioning in regard to the pixels of the input image An, and determines the movement information β of each pixel of the expanded image Bn before the positioning based on the difference absolute value s in such a manner as described above.

Sixth Embodiment

Figure 31:
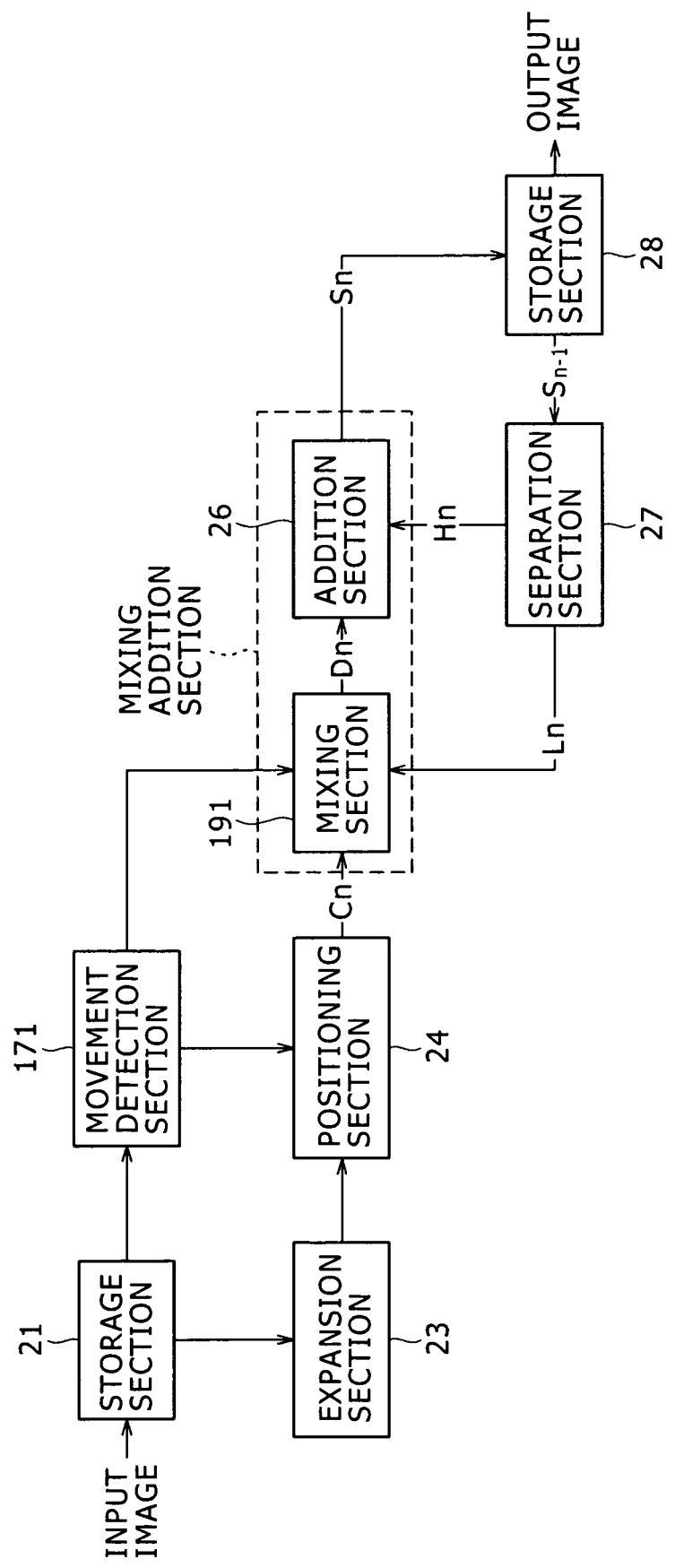
FIG. 31 is a block diagram showing an example of a configuration of the image processing apparatus of FIG. 2 according to a sixth embodiment of the present invention.

FIG. 31 shows an example of a configuration of the image processing apparatus of FIG. 2 according to a sixth embodiment of the present invention.

Referring to FIG. 31, the image processing apparatus shown includes a storage section 21, an expansion section 23, a positioning section 24, an addition section 26, a separation section 27, a storage section 28 and a movement detection section 171 similarly to the image processing apparatus of FIG. 29.

However, the image processing apparatus of FIG. 31 is different from the image processing apparatus of FIG. 29 in that it includes a mixing section 191 in place of the mixing section 25 and does not include the moving body mixing section 172 which carries out moving body mixture.

The mixing section 191 carries out mixture, which is carried out by the mixing section 25, and moving body mixture, which is carried out by the moving body mixing section 172, at the same time.

In particular, if the pixel value of a pixel at the position t of a mixture image Dn obtained by the mixing section 25 is represented by d(t), the pixel value of a pixel at the position t of a positioned image Cn obtained by the positioning section 24 is represented by c(t) and a low frequency component of the pixel value of a pixel at the position t from among low frequency components Ln of an output image Sn-1 obtained by the separation section 27 is represented by l(t), then the mixing section 25 carries out mathematical operation of the expression (3) given hereinabove in which the mixture ratio α is used, that is, the expression of $d(t)=α×c(t)+(1-α)×l(t)$, to determine a mixture image Dn. Then, the mixing section 25 supplies the determined mixture image Dn to the addition section 26.

Meanwhile, to the mixing section 191, the positioned image Cn is supplied from the positioning section 24 and low frequency components Ln of the output image Sn-1 are supplied from the separation section 27. Further, the movement information β is supplied from the movement detection section 171 to the mixing section 191.

The mixing section 191 adjusts the mixture ratio α to another mixture ratio α' (0<α'<1) in response to the movement information β from the movement detection section 171 and uses the mixture ratio α' after the adjustment in place of the mixture ratio α to carry out the mixture carried out by the mixing section 25 and the moving body mixture carried out by the moving body mixing section 172 at the same time.

In particular, the mixing section 191 adjusts the mixture ratio α to the mixture ratio α' in accordance with an expression (16) given below and then mathematically operates an expression (17) given below which uses the mixture ratio α' after the adjustment to determine a mixture image Dn, and then supplies the mixture image Dn to the addition section 26.

$$α'=α×(1-β(t)) \quad (16)$$

$$d(t)=α'×c(t)+(1-α')×l(t) \quad (17)$$

where β(t) is the movement information β of a pixel at the position t.

As regards a pixel which exhibits a movement, that is still image, as regards, for example, a pixel whose movement information β is 1, the mixture ratio α' after the correction is 0 and the output image Sn-1 obtained in the immediately preceding operation cycle appears and hence the low frequency component l(t) of the expanded image B1 of the input image A1 appears. On the other hand, as regards a pixel which exhibits no movement, that is, as regards, for example, a pixel whose movement information β is 0, the mixture ratio α' after the correction is the original mixture ratio α, and mixture, that is, weighted addition, of the positioned image Cn(c(t)) and the low frequency component Ln(l(t)) of the output image Sn-1 with the weight of the mixture ratio α is carried out.

In this manner, in the image processing apparatus of FIG. 31, since the mixing section 191 carries out the mixture which is carried out by the mixing section 25 in the image processing apparatus of FIG. 29 and the moving body mixture which is carried out by the moving body mixing section 172 at the same time, the amount of mathematical operation can be reduced.

It is to be noted that the mixture ratio α may be a variable value which varies depending upon to what numbered frame of the input image An the positioned image Cn used for the mixture-addition corresponds.

In particular, when the mixture-addition of the positioned image Cn is to be carried out, the mixture ratio α can be set, for example, to 1/n. In this instance, in the mixture-addition, low frequency components of the positioned images C1 to CN are individually mixed at a uniform ratio.

Seventh Embodiment

Figure 32:
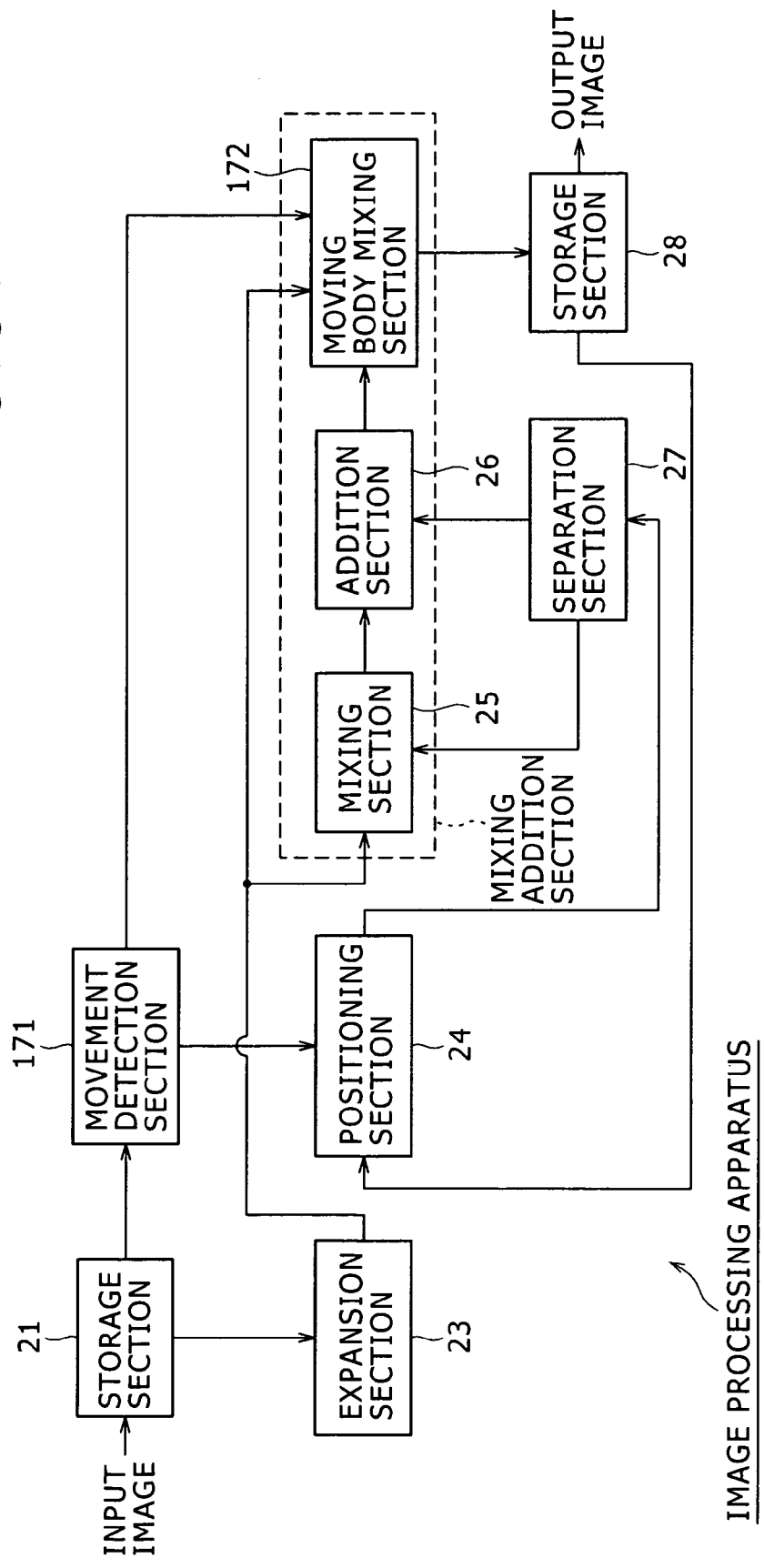
FIG. 32 is a block diagram showing an example of a configuration of the image processing apparatus of FIG. 2 according to a seventh embodiment of the present invention.

FIG. 32 shows an example of a configuration of the image processing apparatus of FIG. 2 according to a seventh embodiment of the present invention.

Referring to FIG. 32, the image processing apparatus shown includes a storage section 21, an expansion section 23, a positioning section 24, a mixing section 25, an addition section 26, an separation section 27 and a storage section 28 similarly to the image processing apparatus of FIG. 15.

However, the image processing apparatus of FIG. 32 is different from the image processing apparatus of FIG. 15 in that it includes the movement detection section 171 shown in FIG. 29 in place of the movement detection section 22 and additionally includes the moving body mixing section 172 shown in FIG. 29.

In the image processing apparatus of FIG. 32, the input image An is a dynamic picture, and dynamic picture mixture-addition is carried out.

Accordingly, the movement detection section 171 determines an input image An of an object of mixture-addition as a standard image and determines another input image An−1 in the immediately preceding operation cycle or preceding by one frame as a comparison image to determine a motion vector or global motion vector as described hereinabove with reference to FIG. 15.

Further, the movement detection section 171 determines movement information β representative of a degree of movement of each pixel of the expanded image Bn prior to positioning with respect to the expanded image Bn−1 preceding by one frame and supplies the movement information β to the moving body mixing section 172.

Further, in the image processing apparatus of FIG. 32 which carries out dynamic picture mixture-addition, different from that in the case of FIG. 29, the expanded image Bn from the expansion section 23 is supplied to the moving body mixing section 172 in place of the output image Sn−1 from the storage section 28.

If the movement information β representative of a degree of movement of a pixel at the position t of the expanded image Bn before the positioning from within the movement information β supplied from the movement detection section 171 to the moving body mixing section 172 is represented by β(t), the pixel value of a pixel at the position t of the new output image Sn supplied from the addition section 26 to the moving body mixing section 172 is represented by s(t) and the pixel value of a pixel at the position of the expanded image Bn before positioning supplied from the expansion section 23 to the moving body mixing section 172 is represented by b(t), then the moving body mixing section 172 carries out moving body mixture in accordance with an expression (18) given below for each pixel of the expanded image Bn, which is also a pixel of the new output image Sn, to correct the output image Sn:

$$s(t)=\beta(t) \times b(t)+(1-\beta(t)) \times s(t) \quad (18)$$

According to the expression (18), the moving body mixing section 172 carries out moving body mixture of mixing the expanded image Bn and the new output image Sn in accordance with a weight such that, for a pixel which exhibits a movement, the weight of the expanded image Bn is higher, but for another pixel which exhibits no movement, the weight of the new output image Sn is higher.

In particular, if it is assumed now that the movement information β is 0 or 1 in order to simplify the description, then according to the expression (18) given above, for a pixel whose movement information β is 0, that is, for a pixel which exhibits no movement, the pixel value of the new output image Sn is adopted as it is as the pixel value of the new output image Sn after the correction, but for a pixel whose movement information β is 1, that is, for a pixel which exhibits some movement, the pixel value of the expanded image Bn is adopted as a pixel value of the new output image Sn after the correction.

In this instance, at a portion of the output image corresponding to a portion of the expanded image Bn at which an image of a moving body is included, the expanded image Bn appears, but at the other portion of the output image, an image whose picture quality is improved by the mixture-addition appears.

With the image processing apparatus of FIG. 32, flexible resolution enhancement of an image can be achieved similarly to the image processing apparatus of FIG. 9.

Further, with the image processing apparatus of FIG. 32, since dynamic picture mixture-addition and moving body mixture are carried out, an output image Sn of one frame can be outputted with respect to an input image An of one frame, and enhancement of the picture quality of a portion of the input image An of a dynamic picture at which an image of an image pickup object in a stationary state is included can be achieved.

It is to be noted that, with the image processing apparatus of FIG. 32, for example, IP conversion of a dynamic picture can be carried out, and consequently, the image processing apparatus can be applied to a television receiver which carries out IP conversion.

Eighth Embodiment

Figure 33:
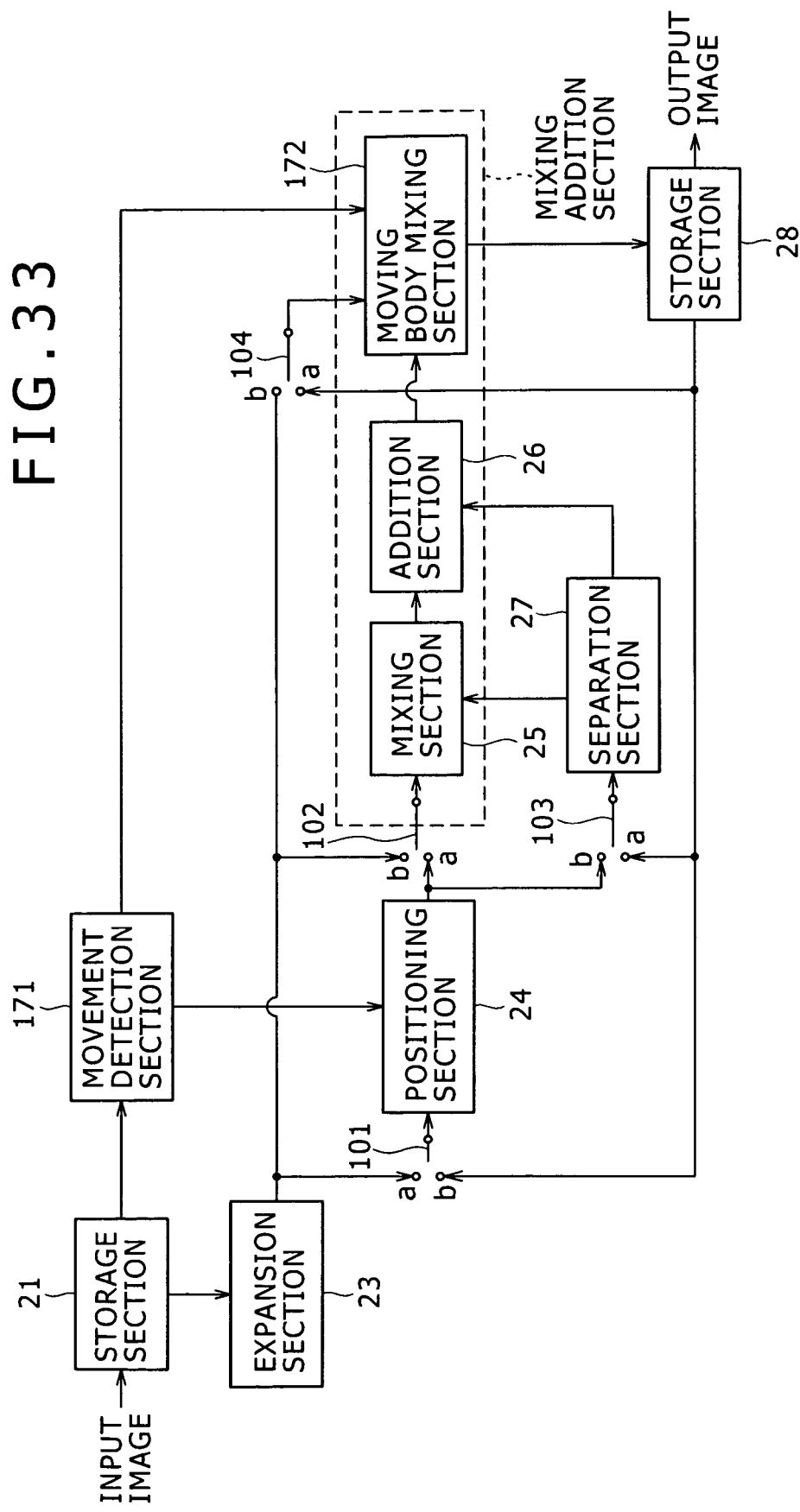
FIG. 33 is a block diagram showing an example of a configuration of the image processing apparatus of FIG. 2 according to an eighth embodiment of the present invention.

FIG. 33 shows an example of a configuration of the image processing apparatus of FIG. 2 according to an eighth embodiment of the present invention.

Referring to FIG. 33, the image processing apparatus shown includes a storage section 21, an expansion section 23, a positioning section 24, a mixing section 25, an addition section 26, a separation section 27, a storage section 28 and selection sections 101 to 103 similarly to the image processing apparatus of FIG. 16.

However, the image processing apparatus of FIG. 33 is different from the image processing apparatus of FIG. 16 in that it includes the movement detection section 171 shown in FIG. 32 in place of the movement detection section 22 and additionally includes the moving body mixing section 172 shown in FIG. 32 and a selection section 104.

In the image processing apparatus of FIG. 33, still picture mixture-addition and dynamic picture mixture-addition can be carried out selectively. Which one of the still picture mixture-addition and the dynamic picture mixture-addition should be carried out on the image processing apparatus of FIG. 33 is selected, for example, in response to an input image supplied to the storage section 21.

In particular, in the image processing apparatus of FIG. 33, for example, it is decided which one of a still picture and a dynamic picture an input image supplied to the storage section 21 is, and if the input image is a still picture, then the still picture mixture-addition is carried out, but if the input image is a dynamic picture, then the dynamic picture mixture-addition is carried out.

Further, in the image processing apparatus of FIG. 33, whether the still picture mixture-addition or the dynamic picture mixture-addition should be carried out can be selected in response to an operation of a user for selection regarding whether image pickup of a still picture should be carried out or image pickup of a dynamic picture should be carried out.

Referring to FIG. 33, an expanded image is supplied from the expansion section 23 to the terminal a of the selection section 104, and an output image preceding by one frame, that is, an output image obtained in the immediately preceding operation cycle, is supplied from the storage section 28 to the terminal b of the selection section 104.

The selection section 104 selects the expanded image supplied to the terminal a or the output image obtained in the immediately preceding operation cycle and supplied to the terminal b and supplies the selected image as an object of the moving body mixture to the moving body mixing section 172.

When the still picture mixture-addition should be carried out in the image processing apparatus of FIG. 33, the terminal a from between the terminals a and b is selected by all of the selection sections 101 to 103 as the first process as described hereinabove with reference to FIG. 16. Further, the terminal a from between the terminals a and b is selected also by the selection section 104.

As a result, the selection section 104 selects the output image obtained in the immediately preceding operation cycle and supplied from the storage section 28 to the terminal a and supplies the selected output image to the moving body mixing section 172.

Consequently, in the image processing apparatus of FIG. 33, the storage section 21, components from the expansion section 23 to the storage section 28, movement detection section 171 and moving body mixing section 172 are placed into a same connection state as that of the storage section 21, components from the expansion section 23 to the storage section 28, movement detection section 171 and moving body mixing section 172, and similar processes to those carried out by the image processing apparatus of FIG. 29 are carried out.

Accordingly, in the image processing apparatus of FIG. 33, the moving body mixing section 172 carries out mathematical operation of the expression (15) given hereinabove to carry out moving body mixture of mixing the output image Sn−1 obtained in the immediately preceding operation cycle and the new output image Sn in accordance with the weight determined based on the motion information supplied from the movement detection section 171 such that, in regard to a pixel which exhibits a movement, the weight has a high value for the output image Sn−1 obtained in the immediately preceding operation cycle and supplied from the storage section 28, but in regard to a pixel which exhibits no movement, the weight has a high value for the new output image Sn from the addition section 26.

As a result, for example, in a case wherein an image of a moving body is included in an input image of a still picture, it is possible to prevent appearance of movement blurring arising from the moving body on the output image.

On the other hand, when the dynamic picture mixture-addition is carried out in the image processing apparatus of FIG. 33, the terminal b from between the terminals a and b is selected by all of the selection sections 101 to 103 as the second process as described hereinabove with reference to FIG. 16. However, the terminal b from between the terminals a and b is selected also by the selection section 104.

As a result, the selection section 104 selects the expanded image supplied from the expansion section 23 to the terminal b, that is, selects the expanded image before positioning, and supplies the selected expanded image to the moving body mixing section 172.

Consequently, in the image processing apparatus of FIG. 33, the storage section 21, components from the expansion section 23 to the storage section 28, movement detection section 171 and moving body mixing section 172 are placed into a same connection state as that of the storage section 21, components from the expansion section 23 to the storage section 28, movement detection section 171 and moving body mixing section 172, and similar processes to those carried out by the image processing apparatus of FIG. 32 are carried out.

Accordingly, in the image processing apparatus of FIG. 33, the moving body mixing section 172 carries out mathematical operation of the expression (18) given hereinabove to carry out moving body mixture of mixing the expanded image Bn obtained and the new output image Sn in accordance with the weight determined based on the motion information supplied from the movement detection section 171 such that, in regard to a pixel which exhibits a movement, the weight has a high value for the expanded image Bn from the expansion section 23, but in regard to a pixel which exhibits no movement, the weight has a high value for the new output image Sn from the addition section 26.

As a result, in response to an input image of a dynamic picture, an output image as a dynamic picture whose picture quality is improved at a portion at which an image of an image pickup object in a stationary state is included can be outputted.

As described above, the image processing apparatus of FIG. 33 can carry out both of the process carried out by the image processing apparatus of FIG. 29, that is, the still picture mixture-addition, and the process carried out by the image processing apparatus of FIG. 32, that is, the dynamic picture mixture-addition while the apparatus scale increases only a little as a result of addition of the switches 101 to 104 including the amount of codes of a program for a computer where the image processing apparatus is implemented by causing a computer to execute the program.

Ninth Embodiment

Figure 34:
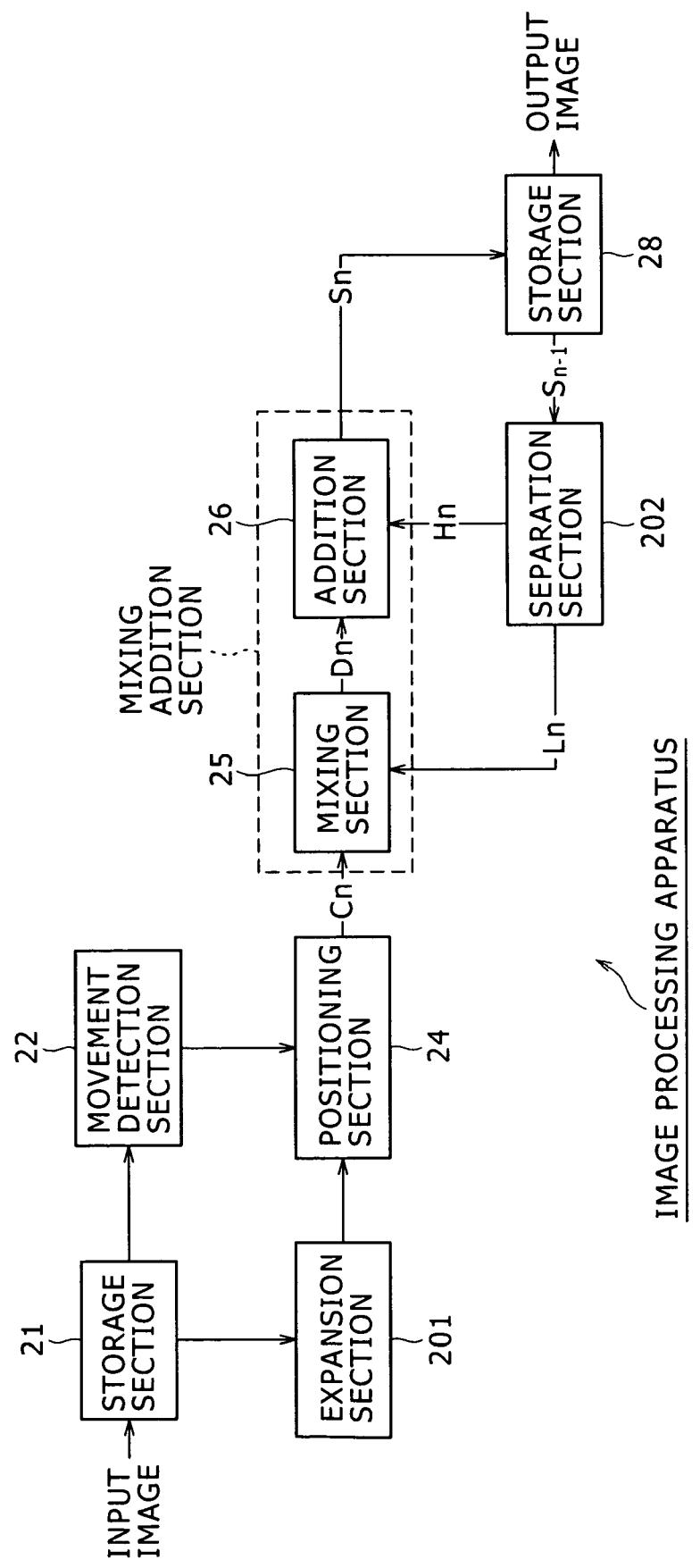
FIG. 34 is a block diagram showing an example of a configuration of the image processing apparatus of FIG. 2 according to a ninth embodiment of the present invention.

FIG. 34 shows an example of a configuration of the image processing apparatus of FIG. 2 according to a ninth embodiment of the present invention.

Referring to FIG. 34, the image processing apparatus shown includes a storage section 21, a movement detection section 22, a positioning section 24, a mixing section 25, an addition section 26 and a storage section 28 similarly to the image processing apparatus of FIG. 9.

However, the image processing apparatus of FIG. 34 is different from the image processing apparatus of FIG. 9 in that it includes an expansion section 201 in place of the expansion section 23 and includes a separation section 202 in place of the separation section 27.

While the image processing apparatus of FIG. 9 processes an input image which includes aliasing components in the vertical direction which is one direction, the image processing apparatus of FIG. 34 processes an input image which includes aliasing components in the horizontal direction and the vertical direction which are two directions to produce an output image from which the aliasing components are removed and whose resolution is enhanced.

Here, the input image which includes aliasing components in the horizontal direction and the vertical direction may be, for example, an image picked up by and outputted from a monochromatic image pickup device or an image pickup device of a digital camera of the single plate type.

An image outputted from an image pickup device is considered as an image formed by filtering an image having no aliasing components by means of an optical filter which corresponds to integration, that is, integration of charge, by various lenses of different characteristics or an image pickup device as a sensor and then sampling a result of the filtering by means of pixels of an image pickup device. Since it is difficult to form the optical filter from an ideal filter which has a pass-band lower than ½ of the sampling frequency of sampling by pixels of the image pickup device, an image outputted from the image pickup device includes, as aliasing components, high frequency components of the signal after filtering by the optical filter.

It is to be noted that a set of two-dimensional pixels and a two-dimensional filter are represented as given below.

In particular, for example, a set of 3×3 pixels in the lateral and longitudinal directions is represented as ((A, B, C), (D, E, F), (G, H, I)). In the set of 3×3 pixels ((A, B, C), (D, E, F), (G, H, I)) here, the pixels or pixel values A, B and C are juxtaposed in order from the left in the first row, and in the second row, the pixels D, E and F are juxtaposed in order from the left. Further, in the third row, the pixels G, H and I are juxtaposed in order from the left.

Further, for example, the filter coefficients of a two-dimensional filter (FIR filter) of 3×3 taps in the lateral and longitudinal direction are represented as {{a, b, c}, {d, e, f}, {g, h, i}}.

A result of filtering of the pixel E at the center of the set of 3×3 pixels ((A, B, C), (D, E, F), (G, H, I)) described above by means of the two-dimensional filter whose filter coefficients are {{a, b, c}, {d, e, f}, {g, h, i}}, is represented, for example, by an expression aA+bB+cD+dD+eE+fF+gG+hH+iI.

A process of the expansion section 201 shown in FIG. 34 is described with reference to FIGS. 35A to 35D.

Figure 35A:
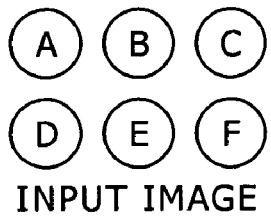
FIGS. 35A to 35D are diagrammatic views illustrating a process of an expansion section shown in FIG. 34.

FIG. 35A shows an input image of an object of processing by the image processing apparatus of FIG. 34.

The input image of an object of processing by the image processing apparatus of FIG. 34 is an image of a monochromatic still picture which includes aliasing components, for example, in the horizontal direction and the vertical direction.

The expansion section 201 shown in FIG. 34 produces an expanded image whose pixel number is doubled in the horizontal direction and the vertical direction with respect to the input image.

In particular, the expansion section 201 inserts one zero-value point between each adjacent ones of the pixels, for example, in the horizontal direction from between the horizontal direction and the vertical direction of the input image and further inserts one zero-value point between adjacent pixels in the vertical direction of an image obtained by the insertion of a zero-value point to produce a zero-value interpolation image having a pixel number doubled in the horizontal direction and the vertical direction of the input image.

Figure 35B:
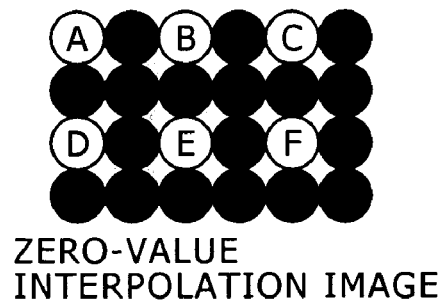

FIG. 35B shows the zero-value interpolation image produced from the input image of FIG. 35A.

In FIG. 35B, a blank round mark represents a pixel, that is, an original pixel, of the input image, and a solid round mark represents a zero-value point.

Now, if the sampling frequency of the input image in the horizontal direction and the vertical direction is the frequency fs, then the sampling frequency of a zero-value interpolation image obtained by inserting zero-value points in the horizontal direction and the vertical direction is a frequency 2fs equal to twice the sampling frequency fs of the input image.

Figure 35C:
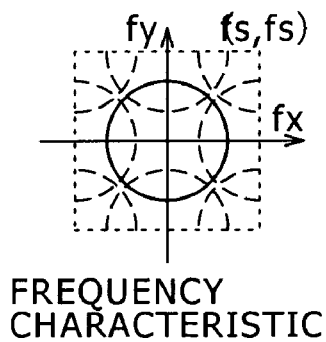

FIG. 35C illustrates a frequency characteristic of the zero-value interpolation image of FIG. 35B.

Referring to FIG. 35C, the axis of abscissa indicates the frequency in the horizontal direction, that is, the horizontal frequency, and the axis of ordinate indicates the frequency in the vertical direction, that is, the vertical frequency.

Further, in FIG. 35C, a solid line curve indicates signal components and a broken line curve indicates aliasing components.

While, in the zero-value interpolation image, high frequency components of signal components of the input image are restored, also aliasing components are generated. Consequently, the signal components and the aliasing components exist in a mixed manner.

The expansion section 201 adjusts the original pixel values so that the average value of the pixel value may not vary after the zero-value interpolation. In other words, the expansion section 201 increases the pixel values of the pixels of the input image from among the pixels of the zero-value interpolation image to four times.

Thereafter, the expansion section 201 filters the zero-value interpolation image, for example, by means of a two-dimensional filter having filter coefficients of {{1/16, 1/8, 1/16}, {1/8, 1/4, 1/8}, {1/16, 1/8, 1/16}} to produce an expanded image.

Figure 35D:
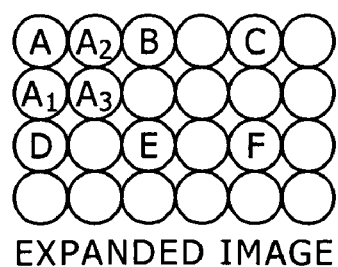

FIG. 35D shows the expanded image produced from the zero-value interpolation image of FIG. 35B.

Referring to FIG. 35D, the pixels A, B, C, D, E and F are pixels of the input image, and the other pixels are pixels at positions at which a zero-value point is inserted.

The pixel value of the pixel A1 between the pixels A and D in FIG. 35D is an average value between the pixel values of the pixels A and D, that is, (A+D)/2. Meanwhile, the pixel value of the pixel A2 between the pixels A and B is an average value between the pixel values of the pixels A and B, that is, (A+B)/2. Further, the pixel value of the pixel A3 at the position of the center of the pixels A, B, D and E is an average value among the pixel values of the pixels A, B, D and E, that is, (A+B+D+E)/4.

Accordingly, the expansion section 201 substantially carries out two-dimensional linear interpolation of the input image to produce an expanded image whose pixel number is increased to twice in the horizontal direction and the vertical direction of the input image.

In the image processing apparatus of FIG. 34, the filter of the separation section 202 has a characteristic same as that of a cascade connection filter wherein the two-dimensional filter which is a filter of the expansion section 201 and has filter coefficients of {{1/16, 1/8, 1/16}, {1/8, 1/4, 1/8}, {1/16, 1/8, 1/16}} and the horizontal multi-tap APF 71 and the vertical multi-tap APF 72 shown in FIGS. 13A to 13G which are a filter of the positioning section 24 are connected in cascade connection similarly as in the case of the image processing apparatus of FIG. 9.

Accordingly, with the image processing apparatus of FIG. 34, flexible resolution enhancement of an image can be achieved based on the resolution enhancement principle described hereinabove, and an output image from which aliasing components in the horizontal direction and the vertical direction of the input image are removed and which has an enhanced resolution is produced.

It is to be noted that, since the horizontal multi-tap APF 71 and the vertical multi-tap APF 72 of the positioning section 24 shown in FIGS. 13A to 13G are formed from a multi-tap APF which passes all of frequency components included in the expanded image as described hereinabove, the filter characteristic of the filter of the separation section 202 is after all same as that of the filter of the expansion section 201, that is, of a two-dimensional filter whose filter coefficients are {{1/16, 1/8, 1/16}, {1/8, 1/4, 1/8}, {1/16, 1/8, 1/16}}.

FIG. 36 shows an example of a configuration of the expansion section 201 shown in FIG. 34.

Referring to FIG. 36, the expansion section 201 includes interpolation sections 211 and 212 and a two-dimensional LPF 213.

To the interpolation section 211, an input image stored in the storage section 21 is supplied. The interpolation section 211 carries out zero-value interpolation of inserting one zero-value point between each adjacent pixels in the horizontal direction of the input image from the storage section 21 and supplies an image obtained by the zero-value interpolation to the interpolation section 212.

The interpolation section 212 carries out zero-value interpolation of inserting one zero-value point between each adjacent pixels in the vertical direction of the image from the interpolation section 211 and supplies a zero-value interpolation image obtained as a result of the zero-value interpolation and having a pixel number equal to twice that of the input image in both of the horizontal direction and the vertical direction to the two-dimensional LPF 213.

The two-dimensional LPF 213 has filter coefficients of {{1/16, 1/8, 1/16}, {1/8, 1/4, 1/8}, {1/16, 1/8, 1/16}} described hereinabove and filters the zero-value interpolation image from the interpolation section 212 in both of the horizontal direction and the vertical direction. Then, the two-dimensional LPF 213 supplies an expanded image obtained as a result of the filtering to the positioning section 24 shown in FIG. 34.

Now, another example of the configuration of the expansion section 201 shown in FIG. 34 is described with reference to FIGS. 37A to 37C.

FIG. 37A shows another configuration example of the expansion section 201 shown in FIG. 34.

Referring to FIG. 37A, the expansion section 201 shown is common to that of FIG. 36 in that it includes interpolation sections 211 and 212.

However, the expansion section 201 is different from that of FIG. 36 in that it does not include the two-dimensional LPF 213 but includes a horizontal LPF 221 and a vertical LPF 222 instead.

In FIG. 37A, a zero-value interpolation image produced by the interpolation section 211 carrying out zero-value interpolation of inserting one zero-value point between each adjacent pixels in the horizontal direction of the input image is supplied to the horizontal LPF 221.

The horizontal LPF 221 has, for example, filter coefficients of {1/4, 1/2, 1/4}, and filters the zero-value interpolation image from the interpolation section 211 in the horizontal direction and supplies an image obtained by the filtering to the interpolation section 212.

The interpolation section 212 carries out zero-value interpolation of inserting one zero-vale point between each adjacent pixels in the vertical direction of the image from the horizontal LPF 221 and supplies a zero-value interpolation image obtained as a result of the zero-value interpolation to the vertical LPF 222.

The vertical LPF 222 has filter coefficients of {1/4, 1/2, 1/4}, and filters the zero-value interpolation image from the interpolation section 212 and supplies an expanded image obtained as a result of the filtering to the positioning section 24 shown in FIG. 34.

FIG. 37B illustrates a filter characteristic of the LPF which has the filter coefficients of {1/4, 1/2, 1/4} and from which the horizontal LPF 221 and the vertical LPF 222 are formed.

FIG. 37C indicates filter coefficients of a two-dimensional filter which carries out filtering in the horizontal direction by the LPF of the filter coefficients of {1/4, 1/2, 1/4} and filtering in the vertical direction at the same time.

The filter coefficients of the two-dimensional filter which carries out filtering in the horizontal direction by the LPF of the filter coefficients of {1/4, 1/2, 1/4} are {{1/16, 1/8, 1/16}, {1/8, 1/4, 1/8}, {1/16, 1/8, 1/16}}. Accordingly, filtering similar to that of the two-dimensional LPF 213 shown in FIG. 36 is carried out by filtering in the horizontal direction by the horizontal LPF 221 and filtering in the vertical direction by the vertical LPF 222.

In particular, the two-dimensional LPF 213 which is a filter of the expansion section 201 shown in FIG. 36 and the combination of the horizontal LPF 221 and the vertical LPF 222 which are filters of the expansion section 201 shown in FIG. 37A are same filters.

Figure 38:
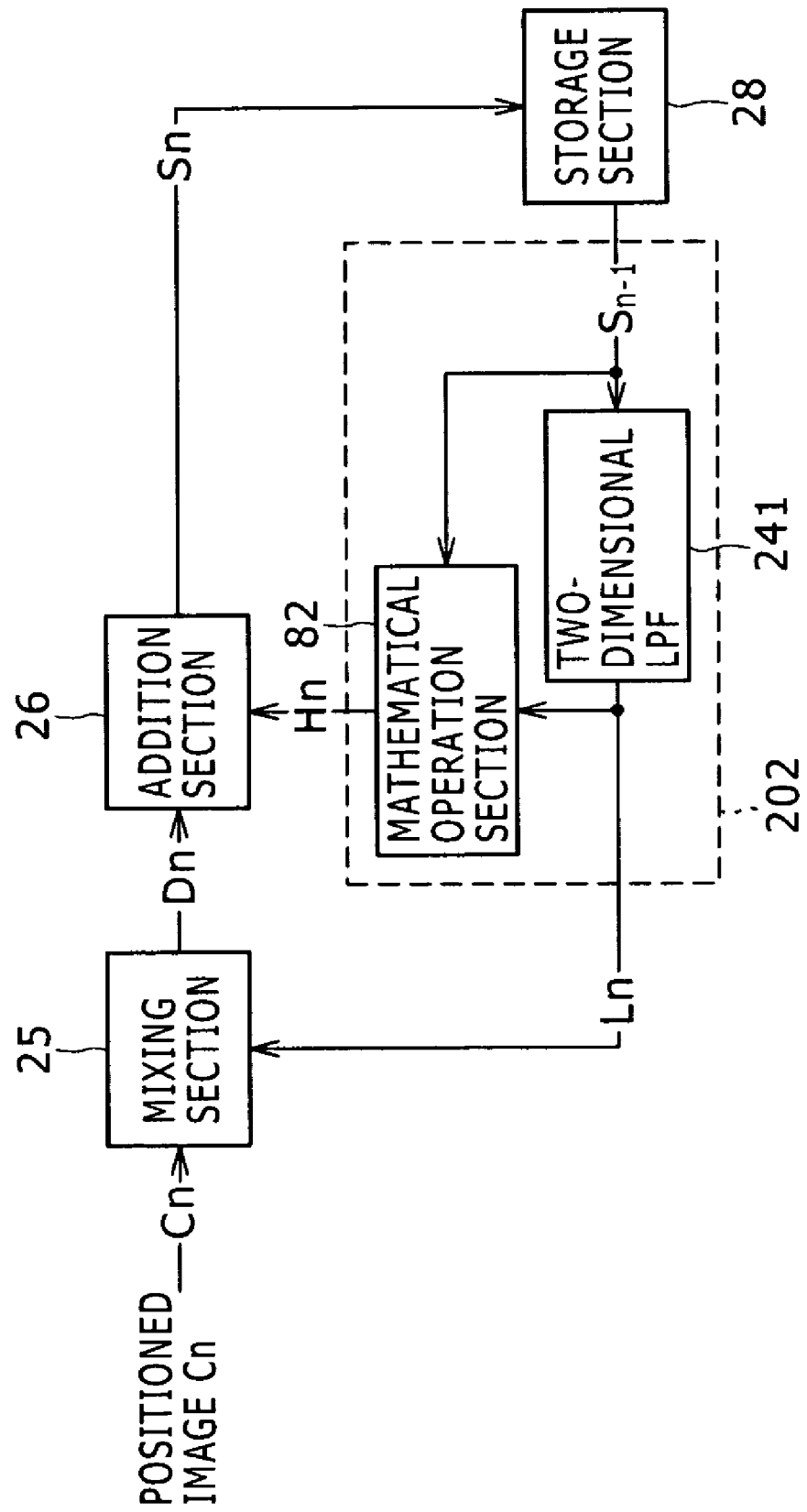
FIG. 38 is a block diagram showing an example of a configuration of a separation section shown in FIG. 34.

FIG. 38 shows an example of a configuration of the separation section 202 shown in FIG. 34.

The separation section 202 shown in FIG. 38 is common to the separation section 27 shown in FIGS. 14A to 14C in that it includes a mathematical operation section 82 but is different from the separation section 27 shown in FIGS. 14A to 14C in that it includes a two-dimensional LPF 241 in place of the vertical LPF 81.

In order to produce an output image from which aliasing components of an input image are removed and which has an enhanced resolution based on the resolution-enhancement principle described hereinabove, it is necessary for the filter of the separation section 202 to have a characteristic same as or similar to that of a cascade connection filter wherein the two-dimensional LPF 213 shown in FIG. 36 which is a filter of the expansion section 201 and the horizontal multi-tap APF 71 and vertical multi-tap APF 72 shown in FIGS. 13A to 13G which are filters of the positioning section 24 are connected in cascade connection.

Therefore, the two-dimensional LPF 241 of the separation section 202 has a characteristic same as that of such a cascade connection filter as just described.

It is to be noted that, since the horizontal multi-tap APF 71 and the vertical multi-tap APF 72 of the positioning section 24 shown in FIGS. 13A to 13G are a multi-tap APF which pass all of frequency components included in the expanded image as described hereinabove, the two-dimensional LPF 241 of the separation section 202 is after all a two-dimensional filter having filter coefficients of {{1/16, 1/8, 1/16}, {1/8, 1/4, 1/8}, {1/16, 1/8, 1/16}} same as those of the two-dimensional LPF 213 of the expansion section 201.

Here, the frequency characteristics of the input image, 0-value interpolation image, expanded image, positioned image and output image of the image processing apparatus of FIG. 34 in the horizontal direction and the vertical direction are same as the frequency characteristics of the input image, zero-value interpolation image, expanded image, positioned image and output image of the image processing apparatus of the first embodiment shown in FIGS. 9 to 14C in the horizontal direction and the vertical direction, respectively. Therefore, description of them is omitted herein to avoid redundancy.

With the image processing apparatus of FIG. 34, flexible resolution enhancement can be achieved with regard to an input image which includes aliasing components in the horizontal direction and the vertical direction similarly to the image processing apparatus of FIG. 9.

It is to be noted that also the image processing apparatus of FIG. 34 can be modified such that the expansion ratios of an input image in the horizontal direction and the vertical direction by the expansion section 201 are set not to twice but to four times or more and the filters for carrying out positioning of an expanded image and an output image, that is, the filters of the positioning section 24, are formed from a filter of a reduced number of taps.

In this instance, in the image processing apparatus of FIG. 34, the process carried out with regard to the vertical direction by the image processing apparatus of FIG. 17 is carried out with regard to the horizontal direction and the vertical direction.

Further, the process for an input image including aliasing components in the horizontal direction and the vertical direction as in the image processing apparatus of FIG. 34 can be adopted also by the image processing apparatus, for example, of FIGS. 29, 32, 33 and so forth by adopting a two-dimensional filter.

The image processing apparatus of FIG. 34 can be applied suitably, for example, to a digital still camera of the three-plate type which can pick up a still picture and a dynamic picture of high picture quality.

Tenth Embodiment

Figure 39:
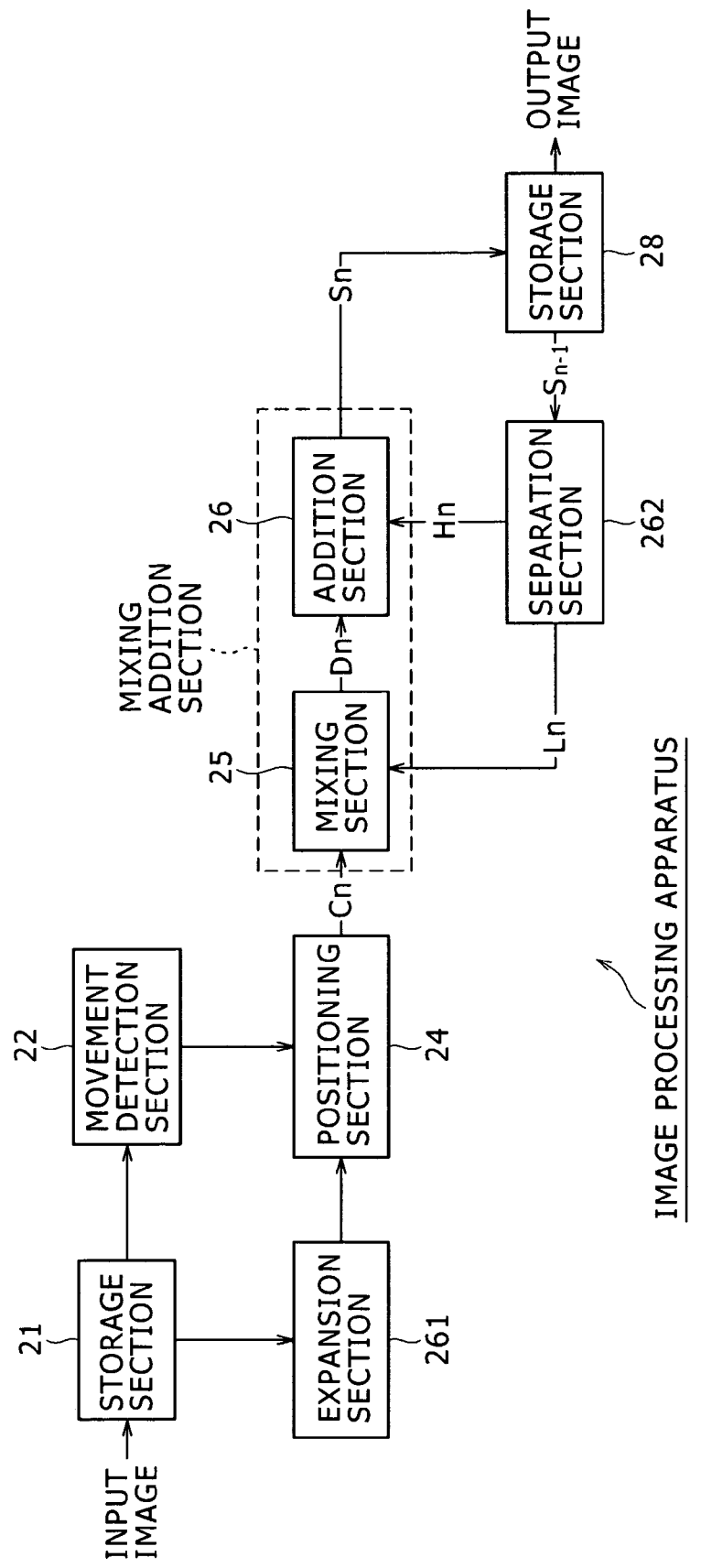
FIG. 39 is a block diagram showing an example of a configuration of the image processing apparatus of FIG. 2 according to a tenth embodiment of the present invention.

FIG. 39 shows an example of a configuration of the image processing apparatus of FIG. 2 according to a tenth embodiment of the present invention.

Referring to FIG. 39, the image processing apparatus includes a storage section 21, a movement detection section 22, a positioning section 24, a mixing section 25, an addition section 26 and a storage section 28 and coincides with the image processing apparatus of FIG. 9.

The image processing apparatus of FIG. 34 is different from the image processing apparatus of FIG. 9 in that it includes an expansion section 261 in place of the expansion section 23 and includes a separation section 262 in place of the separation section 27.

For example, in a digital camera of the single plate type which outputs a color image, an image picked up by an image pickup device is, for example, an image of the Bayer array wherein one pixel has one color component as a pixel value.

In an image of the Bayer array, a pixel of a G component and a pixel of a B component are arranged alternately in the first line while a pixel of a R component and a pixel of a G component are arranged alternately in the second line, and the arrangements of pixels in the first and second lines are repeated. It is to be noted that an image of the Bayer array includes a number of pixels of the G component equal to twice that of pixels of each of the R component and the B component.

If attention is paid to a certain one color component of an image of the Bayer array which does not include aliasing components, then pixels of the noticed color component are arranged at every other positions, and an image composed of pixels of the noticed color components includes many repeated components.

In the image processing apparatus of FIG. 39, an image composed only of pixels of the G component and hereinafter referred to as G image, another image composed only of pixels of the B component and hereinafter referred to as B image and a further image composed only of pixels of the R component and hereinafter referred to as R components, obtained from an image of the Bayer array, are processed separately to produce a G image, a B image and a R image from which repeated components are removed and which have an enhanced resolution, respectively.

In particular, in the image processing apparatus of FIG. 39, an image of the Bayer array is supplied and stored as an input image to and into the storage section 21.

The movement detection section 22 uses, for example, the pixels of the G component, the number of which is greatest, from among the pixels of the input image stored in the storage section 21 to determine a motion vector, that is, a global motion vector, for positioning.

In particular, the movement detection section 22 replaces the pixels other than the pixels of the G component from among the pixels of the input image, that is, replaces the pixels of the B component and the pixels of the R component, into zero-value points. Since the input image after the replacement includes many aliasing components, the movement detection section 22 filters the input image after the replacement to produce an image which does not include aliasing components but is composed only of frequency components proximate to that of dc current. Then, the movement detection section 22 uses the image as a standard image and a comparison image described hereinabove with reference to FIG. 10 to determine motion vectors.

The motion vectors are used commonly for positioning of the G image, B image and R image.

In the image processing apparatus of FIG. 39, the positioning section 24, mixing section 25, addition section 26, separation section 262 and storage section 28 carry out processes similar to those of the expansion section 23, positioning section 24, mixing section 25, addition section 26, separation section 27 and storage section 28 shown in FIG. 9 for the G image, B image and R image.

First, the process for the B image is described.

It is to be noted that the B image and the R image are images which coincide with each other by parallel movement of the positions of the images, that is, images whose patterns of pixel arrangement are same as each other. Accordingly, the process for the R image is same as the process for the B image hereinafter described, and therefore, overlapping description of the process is omitted herein to avoid redundancy.

FIGS. 40A to 40E illustrate a process carried out for a B image by the expansion section 261 shown in FIG. 39.

In particular, FIG. 40A shows an image of the Bayer array.

In an image of the Bayer array, a pixel of a G component and a pixel of a B component are arranged alternately in the first line while a pixel of a R component and a pixel of a G component are arranged alternately in the second line, and the arrangements of pixels in the first and second lines are repeated.

FIG. 40B shows arrangement of pixels of the B component from within the image of the Bayer array of FIG. 40A.

The pixels of the B component are arranged at every other position in both of the horizontal direction and the vertical direction in the image of the Bayer arrangement, and the B image composed of such pixels of the B component includes many and strong aliasing components in the horizontal direction and the vertical direction.

It is to be noted that, in FIG. 40B, a blank round mark represents a pixel of the B component and a solid round mark represents a pixel of any other color component.

The expansion section 261 shown in FIG. 39 carries out zero-value interpolation of inserting one zero-value point between each adjacent pixels in the horizontal direction of the B image and then carries out zero-value interpolation of inserting one zero-value point between each adjacent pixels in the vertical direction of the B image after the zero-value interpolation.

In other words, the expansion section 261 carries out zero-value interpolation of inserting a zero-value point at the position of each pixel of the color components other than the B component indicated by a solid round mark in FIG. 40B to produce a zero-value interpolation image wherein the pixel numbers in the horizontal direction and the vertical direction are increased to twice those of the original B image.

It is to be noted that the expansion section 261 adjusts the original pixel values so that the average value of the pixel value does not vary after the zero-value interpolation. In particular, the expansion section 261 increases the pixel values of the original pixels of the B image from among the pixels of the zero-value interpolation images to four times.

The zero-value interpolation image of the B image obtained by the expansion section 261 has the pixel numbers increased to twice the pixel numbers in the horizontal direction and the vertical direction of the B image, and therefore, has a size or pixel number same as that of the original image of the Bayer array. Now, if the sampling frequency in the horizontal direction and the vertical direction of the B image, that is, the sampling frequency for the pixels of the B component, is a frequency fs, then the sampling frequency of the zero-value interpolation image of the B image is the frequency 2fs equal to twice the original sampling frequency of the B image in both of the horizontal direction and the vertical direction.

FIG. 40C illustrates a frequency characteristic of the zero-value interpolation image of the B image.

In FIG. 40C, the axis of abscissa indicates the frequency in the horizontal direction, that is, the horizontal frequency, and the axis of ordinate indicates the frequency in the vertical direction, that is, the vertical frequency.

In FIG. 40C, a solid line curve indicates signal components and a broken line curve indicates aliasing components.

In the zero-value interpolation image, although high frequency components of signal components of the B image are restored, also aliasing components are generated, and the signal components and the aliasing components exist in a mixed manner.

Thereafter, the expansion section 261 filters the zero-value interpolation image, for example, by a two-dimensional filters having filter coefficients of $\{\{¼, ¼, 0\}, \{¼, ¼, 0\}, \{0, 0, 0\}\}$ to produce an expanded image of the B image.

FIG. 40D shows the expanded image produced from the zero-value interpolation image of the B image.

Referring to FIG. 40D, pixels A, B, C, D, E and F are pixels of the original B images and the other pixels are pixels at positions to which a zero-value point is inserted.

In FIG. 40D, a pixel a1 positioned adjacent on the lower side of the pixel A, another pixel a2 positioned adjacent on the right side and a further pixel a3 positioned adjacent on the right lower side have pixel values all equal to the pixel value of the pixel A. Similarly, the pixel value of a pixel indicated by an alphabetical small letter is the same as the pixel value of a pixel represented by the same alphabetical but capital letter.

Accordingly, the expansion section 261 substantially carries out two-dimensional nearest neighbor interpolation of the B image to produce an expanded image whose pixel number is increased to twice that of the B image in both of the horizontal direction and the vertical direction.

As described above, where such nearest neighbor interpolation wherein the pixel number is doubled in the horizontal direction and the vertical direction as described above is applied, each pixel produced by the nearest neighbor interpolation, that is, a pixel represented by an alphabetical small letter like a pixel ai shown in FIG. 40D, is produced at a position displaced by one-half pixel distance in the horizontal direction, in the vertical direction or in both of the horizontal direction and the vertical direction of the original B image, that is, one half the distance between positions adjacent each other in the horizontal or vertical direction.

Accordingly, it can be considered that the pixels of the expanded image are positioned at four positions displaced, as indicated by small blank round marks in FIG. 40E, from a pixel of the original B image centered among the four positions by a one-half pixel distance in both of the horizontal direction and the vertical direction.

It is to be noted that, in FIG. 40E, the pixels A, B, C, D, E and F are pixels of the original B image. Further, in FIG. 40E, four pixels including the pixel a1 at the position displaced by a one-half pixel distance in the leftwardly upward direction from the pixel A, the pixel a2 at the position displaced by a one-half pixel distance in the rightwardly upward direction, the pixel a3 at the position displaced by a one-half pixel distance in the leftwardly downward direction and the pixel a4 at the position displaced by a one-half pixel distance in the rightwardly downward direction have pixel values all equal to the pixel value of the pixel A. Similarly, in FIG. 40E, the pixel value of a pixel indicated by an alphabetical small letter is the same as the pixel value of a pixel represented by the same alphabetical but capital letter.

In order to produce an output image from which aliasing components in the horizontal direction and the vertical direction of an input image, that is, a B image, are removed and which has an enhanced resolution based on the resolution-enhancement principle described hereinabove, it is necessary for the filter of the separation section 262 in the image processing apparatus of FIG. 39 to have a characteristic same as or similar to that of a cascade connection filter wherein the filter of the expansion section 261 and the horizontal multi-tap APF 71 and vertical multi-tap APF 72 shown in FIGS. 13A to 13G which are filters of the positioning section 24 are connected in cascade connection.

Further, since the horizontal multi-tap APF 71 and the vertical multi-tap APF 72 of the positioning section 24 shown in FIGS. 13A to 13G are formed from a multi-tap APF which passes all of frequency components included in the expanded image as described hereinabove, it is after all necessary for the filter of the separation section 262 to have a characteristic same as or similar to that of the filter of the expansion section 261.

On the other hand, it can be considered that pixels of the expanded image of the B image produced by filtering by a two-dimensional filter having filter coefficients of $\{\{¼, ¼, 0\}, \{¼, ¼, 0\}, \{0, 0, 0\}\}$ and carrying out nearest neighbor interpolation in the expansion section 261 are positioned at positions displaced by a one-half pixel distance in both of the horizontal direction and the vertical direction from the pixel at the center among the pixels of the original B image as shown in FIG. 40E.

The nearest neighbor interpolation for producing the expanded image of FIG. 40E can be carried out by filtering in the horizontal direction and filtering in the vertical direction, for example, by a filter having filter coefficients of $\{½, ½\}$.

In particular, if the expansion section 261 produces the expanded image shown in FIG. 40E wherein pixels exist at positions displaced, from a pixel of the original B image, by a one-half pixel distance in both of the horizontal direction and the vertical direction, then the filter of the expansion section 261 is composed of a set of a horizontal LPF having filter coefficients of $\{½, ½\}$ and a vertical LPF having filter coefficients of $\{½, ½\}$.

If an image is filtered by a two-tap filter having filer coefficients of $\{½, ½\}$, then the positions of the pixels of an image obtained as a result of the filtering are displaced by a one-half pixel distance from the positions of the pixels of the original image after the filtering.

Accordingly, if a set of a horizontal LPF having filter coefficients of $\{½, ½\}$ and a vertical LPF having filter coefficients of $\{½, ½\}$ same as the filter of the expansion section 261 is adopted as the filter of the separation section 262, then the positions of the pixels of an image, that is, low frequency components of an output image, obtained by filtering an output image by means of the filter of the separation section 262 are displaced by a one-half pixel distance in both of the horizontal direction and the vertical direction. Therefore, upon mixture-addition, it is necessary to carry out positioning again.

Therefore, in the image processing apparatus of FIG. 39, for the filter of the separation section 262, not a filter having filter coefficients of $\{½, ½\}$ but another filter which has a filter characteristic similar to that of the filter and maintains the positions of the pixels of an image obtained by filtering as they are in the image before the filtering so as not to be displaced.

Here, the filter which has a filter characteristic similar to that of a filter having filter coefficients of $\{½, ½\}$ and do not displace the positions of the pixels may be, for example, a five-tap filter having filter coefficients of $\{-2/128, 23/128, 86/128, 23/128, -2/128\}$.

In the image processing apparatus of FIG. 39, a set of a horizontal LPF and a vertical LPF having filter coefficients of $\{-2/128, 23/128, 86/128, 23/128, -2/128\}$ is adopted as the filter of the separation section 262. Consequently, an output image from which aliasing components in the horizontal direction and the vertical direction of a B image are removed and whose resolution is enhanced based on the resolution enhancement principle described hereinabove is produced.

In other words, also by the image processing apparatus of FIG. 39, flexible resolution enhancement of a B image can be achieved similarly as by the image processing apparatus of FIG. 9.

It is to be noted that, while, in the image processing apparatus of FIG. 39, the expansion section 261 produces an expanded image by nearest neighbor interpolation, the production of an expanded image may be carried out by different interpolation than the nearest neighbor interpolation such as, for example, linear interpolation similarly as in the case of FIG. 9.

FIG. 41 shows an example of a configuration of the expansion section 261 shown in FIG. 39.

Referring to FIG. 41, the expansion section 261 includes interpolation sections 271 and 272 and a two-dimensional LPF 273.

To the interpolation section 271, a B image composed only of pixels of the B component from within the input image stored in the storage section 21 is supplied. The interpolation section 271 carries out zero-value interpolation of inserting one zero-value point between each adjacent pixels in the horizontal direction of the B image from the storage section 21 and supplies an image obtained by the zero-value interpolation to the interpolation section 272.

The interpolation section 272 carries out zero-value interpolation of inserting one zero-value point between each adjacent pixels in the vertical direction of the image from the interpolation section 271 and supplies an image obtained by the zero-value interpolation and having pixel numbers increased to twice that of the B image in the horizontal direction and the vertical direction to the two-dimensional LPF 273.

The two-dimensional LPF 273 is, for example, a filter having filter coefficients of $\{\{1/4, 1/4, 0\}, \{1/4, 1/4, 0\}, \{0, 0, 0\}\}$ described hereinabove, and filters the zero-value interpolation image from the interpolation section 272 in the horizontal direction and the vertical direction and supplies an expanded image obtained by the filtering to the positioning section 24 shown in FIG. 39.

Now, another example of the configuration of the expansion section 261 shown in FIG. 39 is described with reference to FIGS. 42A and 42B.

Figures 42A, 42B:
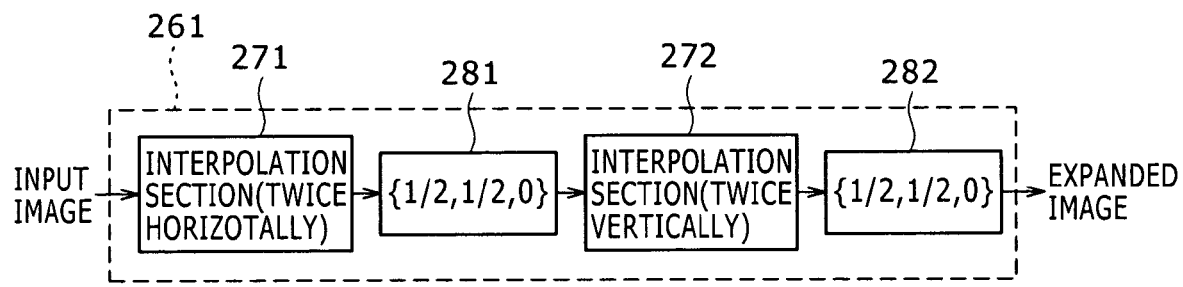
FIGS. 42A and 42B are diagrammatic views showing another example of a configuration of the expansion section shown in FIG. 39.

FIG. 42A shows another example of the configuration of the expansion section 261 shown in FIG. 39.

In particular, the expansion section 261 of FIG. 42A is common to that of FIG. 41 in that is includes interpolation sections 271 and 272.

However, the expansion section 261 of FIG. 42A is different from that of FIG. 41 in that it does not include the two-dimensional LPF 273 but includes a horizontal LPF 281 and a vertical LPF 282 instead.

Referring to FIG. 42A, a zero-value interpolation image produced by the interpolation section 271 by carrying out zero-value interpolation of inserting one zero-value point between each adjacent pixels in the horizontal direction of the B image is supplied to the horizontal LPF 281.

The horizontal LPF 281 is, for example, a filter having filter coefficients of $\{1/2, 1/2, 0\}$, and filters the zero-value interpolation image from the interpolation section 271 in the horizontal direction and supplies an image obtained by the filtering to the interpolation section 272.

The interpolation section 272 carries out zero-value interpolation of inserting one zero-value point between each adjacent pixels in the vertical direction of the image from the horizontal LPF 281 and supplies a zero-value interpolation image obtained by the zero-value interpolation to the vertical LPF 282.

The vertical LPF 282 is, for example, a filter having filter coefficients of $\{1/2, 1/2, 0\}$, and filters the zero-value interpolation image from the interpolation section 272 in the vertical direction and supplies an expanded image obtained by the filtering to the positioning section 24 shown in FIG. 39.

FIG. 42B illustrates filter coefficients of a two-dimensional filter which carries out filtering in the horizontal direction and filtering in the vertical direction by the LPF having filter coefficients of $\{1/2, 1/2, 0\}$ at the same time.

The filter coefficients of the two-dimensional filter which carries out filtering in the horizontal direction and filtering in the vertical direction by the LPF having filter coefficients of $\{1/2, 1/2, 0\}$ at the same time are $\{\{1/4, 1/4, 0\}, \{1/4, 1/4, 0\}, \{0, 0, 0\}\}$. Accordingly, filtering similar to that by the two-dimensional LPF 273 shown in FIG. 41 is carried out by filtering in the horizontal direction by the horizontal LPF 281 and filtering in the vertical direction by the vertical LPF 282.

In particular, the two-dimensional LPF 273 which is a filter of the expansion section 261 shown in FIG. 41 and the combination of the horizontal LPF 281 and the vertical LPF 282 which are filters of the expansion section 261 shown in FIG. 42A are same as each other.

Now, a process of the separation section 262 shown in FIG. 39 is described with reference to FIGS. 43A and 43B.

Figure 43A:
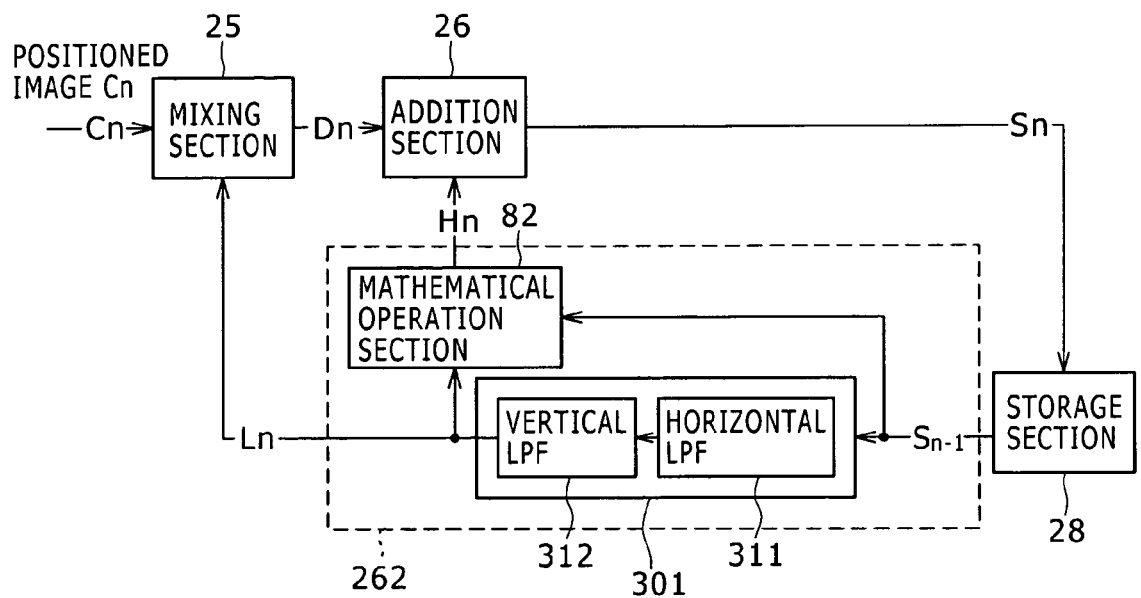
FIGS. 43A and 43B are diagrammatic views illustrating a process of a separation section shown in FIG. 39.

FIG. 43A shows an example of a configuration of the separation section 262 shown in FIG. 39.

Referring to FIG. 43A, the separation section 262 shown is common to the separation section 27 shown in FIGS. 14A to 14C in that it includes a mathematical operation section 82 but is different from the separation section 27 shown in FIGS. 14A to 14C in that it includes a LPF section 301 in place of the vertical LPF 81.

In order to produce an output image from which aliasing components of an input image are removed and which has an enhanced resolution based on the resolution-enhancement principle described hereinabove, it is necessary for the LPF section 301 which is a filter of the separation section 262, to have a characteristic same as or similar to that of a cascade connection filter wherein the two-dimensional LPF 213 shown in FIG. 41 which is a filter of the expansion section 261 and the horizontal multi-tap APF 71 and vertical multi-tap APF 72 shown in FIGS. 13A to 13G which are filters of the positioning section 24 are connected in cascade connection.

Here, since the horizontal multi-tap APF 71 and the vertical multi-tap APF 72 of the positioning section 24 shown in FIGS. 13A to 13G are formed from a multi-tap APF which passes all of frequency components included in the expanded image as described hereinabove, a filter having a filter characteristic same as or similar to that of the filter of the expansion section 261 may after all be used for the LPF section 301 of the separation section 262.

However, if it is taken into consideration that the expansion section 261 produces an expanded image shown in FIG. 40E wherein pixels exist at positions displaced, from a pixel of the original B image, by a one-half pixel distance in both of the horizontal direction and the vertical direction, then the filter of the expansion section 261 is formed from a set of a horizontal LPF having filter coefficients of $\{1/2, 1/2\}$ and a vertical LPF having filter coefficients of $\{1/2, 1/2\}$ as described hereinabove with reference to FIGS. 40A to 40E.

Where a filter which has a filter characteristic same as that of the set of a horizontal LPF having filter coefficients of {½, ½} and a vertical LPF having filter coefficients of {½, ½} and is a filter of the expansion section 261 is adopted as the LPF section 301 which is a filter of the separation section 262, the pixels of an image obtained as a result of filtering by the LPF section 301 are displaced by a one-half pixel distance from the positions of the pixels of the original image before the filtering as described hereinabove with reference to FIGS. 40A to 40E.

In this instance, it is necessary to carry out positioning of cancelling the positional displacement of the pixels of an image obtained as a result of the filtering by the LPF section 301.

Therefore, in FIG. 43A, a filter which has a filter characteristic same as that of the set of a horizontal LPF having filter coefficients of {½, ½} and a vertical LPF having filter coefficients of {½, ½} and is a filter of the expansion section 261 and besides maintains the positions of the pixels obtained as a result of the filtering as they are from those of the images of the filtering without displacing them is adopted as the LPF section 301 which is a filter of the separation section 262.

In particular, the LPF section 301 includes a horizontal LPF 311 and a vertical LPF 312.

The horizontal LPF 311 is a five-tap filter which has a filter characteristic similar to that of a filter having filter coefficients of {½, ½}, and does not displace the positions of pixels and has filter coefficients of, for example, {$-2/128$, $23/128$, $86/128$, $23/128$, $-2/128$}. The horizontal LPF 311 filters an output image Sn−1 supplied from the storage section 28 in the horizontal direction and supplies an image obtained as a result of the filtering to the vertical LPF 312.

The vertical LPF 312 is a five-tap filter having filter coefficients of {$-2/128$, $23/128$, $86/128$, $23/128$, $-2/128$} similarly to the horizontal LPF 311, and filters the image from the horizontal LPF 311 in the vertical direction and supplies low frequency components Ln of the output image Sn−1 obtained as a result of the filtering to the mathematical operation section 82 and the mixing section 25.

Figure 43B:
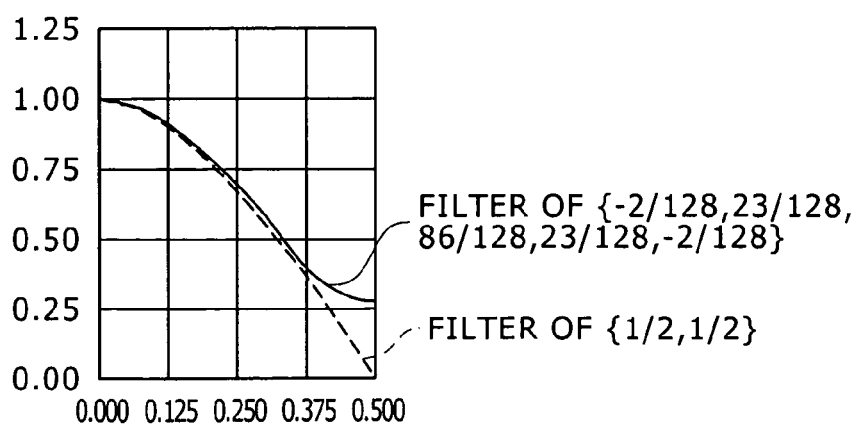

FIG. 43B illustrates a filter characteristic of a filter adopted as the horizontal LPF 311 and the vertical LPF 312 and having filter coefficients of {$-2/128$, $23/128$, $86/128$, $23/128$, $-2/128$}.

FIG. 43B further illustrates a filter characteristic of another filter having filter coefficients of {½, ½}.

Although a filter having filter coefficients of {$-2/128$, $23/128$, $86/128$, $23/128$, $-2/128$} and another filter having filter coefficients of {½, ½} are somewhat different in a characteristic in a high frequency region, they are substantially same in characteristics in a low frequency region and an intermediate frequency region and therefore are similar to each other as a whole.

It is to be noted that, while the LPF section 301 shown in FIG. 43A is composed of the horizontal LPF 311 and the vertical LPF 312 each formed from a five-tap filter having filter coefficients of {$-2/128$, $23/128$, $86/128$, $23/128$, $-2/128$}, the LPF section 301 may otherwise be formed from a two-dimensional LPF which carries out filtering in the horizontal direction by the horizontal LPF 311 and filtering in the vertical direction by the vertical LPF 312 at the same time.

However, where the LPF section 301 is formed from a two-dimensional LPF which carries out filtering same as that by the set of the horizontal LPF 311 and the vertical LPF 312, the two-dimensional filter LPF is a 25-tap filter. Accordingly, where the LPF section 301 is formed from a two-dimensional LPF, the mathematical operation amount regarding the filtering increases in comparison with an alternative case wherein the LPF section 301 is formed from the horizontal LPF 311 and the vertical LPF 312.

Now, the process carried out for a B image by the image processing apparatus of FIG. 39 is described further with reference to FIGS. 44A to 44H.

It is to be noted that, while FIGS. 44A to 44H illustrate frequency characteristics in the horizontal direction of images and filters, also frequency characteristics in the vertical direction are similar to the frequency characteristics in the horizontal direction.

FIG. 44A illustrates a frequency characteristic of a B image composed only of pixels of the B component from within an input image.

The B image includes signal components and aliasing components in a mixed manner at frequencies lower than the Nyquist frequency fs/2.

FIG. 44B illustrates a frequency characteristic of a zero-value interpolation image obtained by carrying out zero-value interpolation for the B image of FIG. 44A by means of the expansion section 261 shown in FIG. 39.

Although signal components within the high frequency region from fs/2 to fs are restored by zero-value interpolation, also aliasing components within the high frequency region from fs/2 to fs are generated.

FIG. 44C illustrates a filter characteristic of the two-dimensional LPF 273 shown in FIG. 41 which is a filter of the expansion section 261, and FIG. 44D illustrates a frequency characteristic of an expanded image obtained by the expansion section 261.

The zero-value interpolation image of FIG. 44B is filtered by the two-dimensional LPF 273 having the filter characteristic of FIG. 44C to form an expanded image having the frequency characteristic illustrated in FIG. 44D wherein frequency components within the high frequency region from fs/2 to fs including signal components and aliasing components are attenuated.

FIG. 44E illustrates a filter characteristic of the horizontal multi-tap APF 71 shown in FIGS. 13A to 13G which is a filter of the positioning section 24 shown in FIG. 39, and FIG. 44F illustrates a frequency characteristic of a positioned image obtained by the positioning section 24.

As described hereinabove with reference to FIGS. 13A to 13G, the horizontal multi-tap APF 71 of the positioning section 24 has a frequency characteristic which is as flat as possible such that all of frequency components in the horizontal direction included in an expanded image are passed as much as possible.

Accordingly, a positioned image obtained by filtering by the horizontal multi-tap APF 71 as positioning of the expanded image of FIG. 44D by the positioning section 24 ideally has a frequency characteristic same as that of the expanded image of FIG. 44D.

FIG. 44G illustrates a filter characteristic of the horizontal LPF 311 shown in FIGS. 43A to 43B which is a filter of the separation section 262 shown in FIG. 39.

The filter characteristic of the horizontal LPF 311 is similar to the filter characteristic of the expansion section 261 of FIG. 44C indicated by a broke line in FIG. 44G.

FIG. 44H illustrates a frequency characteristic of an output image obtained by the addition section 26 shown in FIG. 39.

The mixing section 25 and the addition section 26 shown in FIG. 39 repetitively carry out mixture-addition for the B image to produce an output image wherein signal components of the B image within the high frequency region from fs/2 to fs are restored and aliasing components are removed from within the high frequency region.

Now, a process which the image processing apparatus of FIG. 9 carries out for a G image obtained from an image of the Bayer array is described.

Figure 45A:
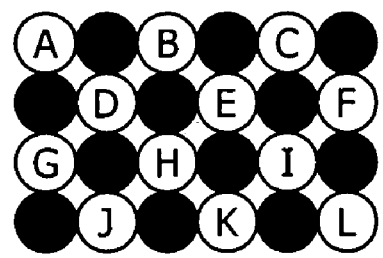
FIGS. 45A to 45C are diagrammatic views illustrating a process executed for a G image carried out by the image processing apparatus of FIG. 39.

FIG. 45A illustrates arrangement of pixels of the G component from within the image of the Bayer array shown in FIG. 40A.

The pixels of the G component are disposed on every other line extending in an oblique direction in the image of the Bayer array, and a G image composed of such pixels of the G component includes many strong aliasing components in the horizontal direction and the vertical direction.

It is to be noted that, in FIG. 45A, a blank round mark represents a pixel of the G component and a solid round mark represents a pixel of a different color component.

If the G image is rotated by 45 degrees leftwardly or rightwardly, then it can be regarded that the pixels of the G components are juxtaposed in a gridlike fashion.

The distance between pixels, which are adjacent each other in the horizontal direction, of the G image which is in a state rotated by 45 degrees, and the distance between pixels which are adjacent in the vertical direction, correspond to the sampling frequency fs of the G image in the horizontal direction and the vertical direction.

The expansion section 261 shown in FIG. 39 carries out zero-value interpolation of inserting a zero-value point to the positions of the pixels other than the pixels of the G component shown in FIG. 45A, that is, to the positions of the pixels of the B component and the pixels of the R component to produce a zero-value interpolation image having a number of pixels equal to twice the number of pixels of the G image.

It is to be noted that the expansion section 261 adjusts the original pixel values so that the average value of the pixel value may not vary after the zero-value interpolation. In particular, the expansion section 261 increases the original pixel value of the pixels of the G image from among the pixels of the zero-value interpolation image to twice.

The zero-value interpolation image of the G image obtained by the expansion section 261 has a number of pixels equal to twice that of the G image as described hereinabove and has a size, that is, a pixel number, equal to that of the original image of the Bayer array. Thus, the sampling frequency of the zero-value interpolation image of the G image is $\sqrt{2}fs$ which is $\sqrt{2}$ times the original sampling frequency fs of the G image in both of the horizontal direction and the vertical direction.

Figure 45B:
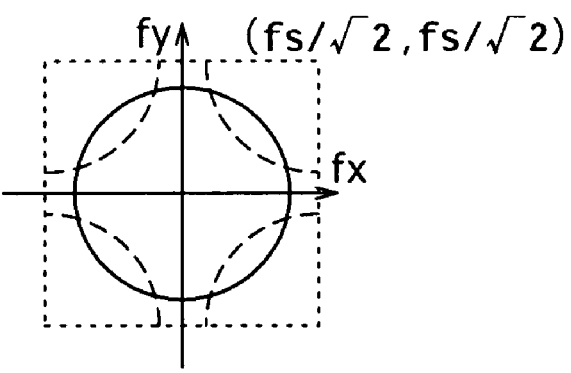

FIG. 45B illustrates a frequency characteristic of a zero-value interpolation image of the G image.

Referring to FIG. 45B, the axis of abscissa indicates the frequency in the horizontal direction, that is, the horizontal frequency, and the axis of ordinate indicates the frequency in the vertical direction, that is, the vertical frequency.

Further, in FIG. 45B, a solid line curve indicates signal components and a broken line curve indicates aliasing components.

Although, in the zero-value interpolation image, high frequency components of signal components of the G image are restored, also aliasing components are generated, and the signal components and the aliasing components exist in a mixed manner.

Thereafter, the expansion section 261 filters the zero-value interpolation image using a two-dimensional filter having filter coefficients $\{\{1/4, 1/4, 0\}, \{1/4, 1/4, 0\}, \{0, 0, 0\}\}$ same as that used, for example, where the B image is produced to produce an expanded image of the G image.

According to the filtering of the zero-value interpolation image of the G image by the two-dimensional filter having filter coefficients $\{\{1/4, 1/4, 0\}, \{1/4, 1/4, 0\}, \{0, 0, 0\}\}$, a pixel value is linearly interpolated at a position to which a zero-value point is inserted and which is indicated by a solid round mark in FIG. 45A, that is, at the position of each pixel of the B component and each pixel of the R component. In other words, a pixel value is linearly interposed to a position displaced by a one-half pixel distance in the horizontal direction or the vertical direction of the original G image, that is, to a position displaced by one half the distance between pixels adjacent in the horizontal or vertical direction.

Figure 45C:
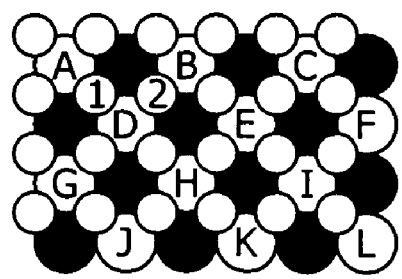

Accordingly, it can be considered that the pixels of the expanded image of the G image are positioned at the positions between pixels adjacent in an oblique direction of the original G image, that is, at the positions displaced by a one-half pixel distance in both of the horizontal direction and the vertical direction of the pixels of the G image as indicated by small blank round marks in FIG. 45C. In this instance, the positions described coincide with the positions of the pixels of the expanded image of the B image and the R image.

Here, in FIG. 45C, the pixels A, B, C, D, E, F, G, H, I, J, K and L are pixels of the original G image. Further, in FIG. 45C, the pixel value of the pixel #1 of the expanded image between the pixel A and the pixel D which is positioned adjacent the pixel A in an obliquely rightwardly downward direction is an average value of the pixel values of the pixels A and D, that is, (A+D)/2. Further, for example, the pixel value of the pixel #2 of the expanded image between the pixel B and the pixel D which is positioned adjacent the pixel B in an obliquely leftwardly downward direction is an average value of the pixel values of the pixels B and D, that is, (B+D)/2. Also the other pixels of the expanded image have similar pixel values.

In the image processing apparatus of FIG. 39, when the G image is processed, a two-dimensional filter having filter coefficients of $\{\{1/4, 1/4, 0\}, \{1/4, 1/4, 0\}, \{0, 0, 0\}\}$ which is same as that used when the B image and the R image are processed can be used as the filter of the expansion section 261, that is, as the two-dimensional LPF 273 shown in FIG. 41. Therefore, a filter having filter coefficients of $\{-2/128, 23/128, 86/128, 23/128, -2/128\}$ which is same as that used when the B image is processed can be used also as the filter of the separation section 262, that is, as the horizontal LPF 311 and the vertical LPF 312 shown in FIG. 43.

Then, in the image processing apparatus of FIG. 39, an output image from which aliasing components in the horizontal direction and the vertical direction of the G image and whose resolution is enhanced is produced based on the resolution enhancement principle described hereinabove.

In particular, also with the image processing apparatus of FIG. 39, flexible resolution enhancement of the G image can be achieved similarly with the image processing apparatus of FIG. 9.

It is to be noted that, in the image processing apparatus of FIG. 39, by collecting R components, G components and B components as pixel values of pixels at the same positions of an output image of the R component, an output image of the G component and an output image of the B component obtained by processing of a R image, a G image and a B image of an image of the Bayer array, a color image having the three color components of R, G and B as pixel values can be produced and outputted.

In other words, the image processing apparatus of FIG. 39 can carry out a mosaic process.

As described above, with the image processing apparatus of FIG. 39, flexible resolution enhancement in regard to an input image of the Bayer array can be achieved similarly as in the case of the image processing apparatus of FIG. 9.

It is to be noted that the process for an image of the Bayer array can be carried out also by the image processing apparatus of, for example, FIGS. 29, 32 and 33 by adopting a two-dimensional filter as in the case of the image processing apparatus of FIG. 39.

The image processing apparatus of FIG. 39 can be applied, for example, to a digital camera of the single plate type which can pick up a still picture and a dynamic picture of high picture quality.

As described above, since processing based on the resolution enhancement principle described above is carried out in the image processing apparatus, that is, since a new output image is produced by expanding an input image by interpolation in which peripheral pixel values are used, carrying out positioning between an expanded image obtained by the expansion of the input image and an output image obtained in the immediately preceding operation cycle, separating the output image obtained in the immediately preceding operation cycle into low frequency components and high frequency components and carrying out mixture-addition of mixing the low frequency components into the expanded image and adding the high frequency components to the image obtained by the mixture, flexible resolution enhancement of an image can be achieved.

In particular, the signal components in the high frequency region may not be restored only if the expanded image produced by nearest neighbor interpolation or linear interpolation is weighted added.

In contrast, with the image processing apparatus which carries out processing based on the resolution enhancement principle, since the low frequency components are mixed or weighted added and then the high frequency components are added, an output image of a high resolution can be produced based on the resolution enhancement principle.

For example, where a plurality of input images are involved, as the number of input images increases, an output image of a high resolution wherein aliasing components are reduced by an increasing amount and high frequency components higher than the Nyquist frequency are restored can be obtained. In particular, where the number of input image is small, an output image of somewhat high picture quality can be produced, but where a sufficient number of input images are available, an output image of a high resolution wherein aliasing components are reduced sufficiently and high frequency components higher than the Nyquist frequency are restored sufficiently can be produced.

Further, even in a case wherein only one input image is available, since an expanded image is produced by interpolation which uses peripheral pixels of the input image, as the picture quality of an output image to be provided to the user, picture quality sufficient for actual use of the output image, that is, picture quality of an image obtained by linear interpolation or the like, is assured.

It is to be noted that, in the existing resolution enhancement technique, in a case wherein only one input image is available, an image which includes dark stripe patterns as described hereinabove with reference to FIGS. 6A to 7D is provided to the user.

Meanwhile, also where a plurality of input images are available, if the input images are such specific images that they are images of a plurality of consecutive fields of interlaced images and an image of each field is displaced in the vertical direction by an odd number of lines from an image of the immediately preceding field, the point of an image pickup object sampled by a pixel which composes the image is same among the individual fields. In this instance, although a plurality of input images are used, since the information amount is equal to that of a single input image, with the existing resolution enhancement technique, an image which includes dark stripe patterns is provided to the user similarly as in the case wherein only one input image is available.

In contrast, with the image processing apparatus which carries out processing based on the resolution enhancement principle, even if a plurality of input images are such specific images as described above, as the picture quality of an output image to be provided to the user, picture quality of an image obtained by linear interpolation or the like is assured.

Although the case wherein a plurality of input images are such specific images as described above appears very rarely, nevertheless if the number of input images is such a small number as two, three or the like, the plural input images may be such specific images as described above with comparatively high possibility.

Further, with the image processing apparatus based on the resolution enhancement principle, resolution enhancement of an image can be achieved not only with regard to an input image which includes aliasing components in one direction but also with regard to an input image which includes aliasing components in two directions.

Further, with the image processing apparatus based on the resolution enhancement principle, resolution enhancement, for example, of an image of the Bayer array can be carried out, and whichever one of a still picture and a dynamic picture the input image is, resolution enhancement of the input image can be achieved.

In particular, for example, digital cameras are classified into a digital camera of the three-plate type which includes image pickup devices for R, G and B which are three primary colors and a digital camera of the single plate type wherein different pixels for receiving light of R, G and B are provided on one image pickup device. In the digital camera of the single plate type, the Bayer array is used widely as an array of pixels of the image pickup device. An image of the Bayer array is an array wherein one pixel has a pixel value only for one of the three color components of R, G and B, and for such an image as just described, it is necessary to carry out a mosaic process of converting the image into an image wherein the pixel value of each pixel has three color components of R, G and B. The image processing apparatus based on the resolution enhancement principle can carry out a mosaic process of such an image of the Bayer array as just described.

Further, in recent years, a product which can pick up both of a still picture and a dynamic picture is available among digital cameras. Where the input image is a still picture, the image processing apparatus based on the resolution enhancement principle can carry out resolution enhancement of the still picture by carrying out positioning of moving an output image. Further, in the image processing apparatus based on the resolution enhancement principle, the functioning blocks such as the expansion section 23 are used commonly as described hereinabove, for example, with reference to FIG. 33 to change over or select the resolution enhancement between a still picture and a dynamic picture to be carried out.

Where the input image is a dynamic image, the image processing apparatus based on the resolution enhancement principle carries out positioning of moving an output image as described hereinabove. Further, the image processing apparatus based on the resolution enhancement principle carries out mixture-addition of an output image after the positioning and an expanded image obtained by expanding the input image, that is, carries out dynamic picture mixture-addition. Then, the image processing apparatus outputs a new output image obtained by the mixture-addition as an output image corresponding to the input image. Accordingly, outputting of an output image corresponding to an input image is carried out every time mixture-addition is carried out once.

On the other hand, where the input image is a still picture, the image processing apparatus based on the resolution-enhancement principle carries out positioning of moving the input image, that is, an expanded image of the input image as described hereinabove. Further, the image processing apparatus based on the resolution enhancement principle carries out mixture-addition of the enhanced image after the positioning and an output image, that is, carries out still picture mixture-addition, to obtain a new output image. Then, the image processing apparatus based on the resolution-enhancement principle carries out the still picture mixture-addition repetitively for all of a plurality of input images stored in the storage section 21 and outputs a new output image obtained finally as an output image corresponding to the plural input images stored in the storage section 21. Accordingly, outputting of an output image corresponding to an input image is carried out after the mixture-addition carried out by a plural number of times for the plural input images stored in the storage section 21.

From the foregoing, where the input image is a dynamic picture, the amount of mathematical operation carried out by the image processing apparatus based on the resolution-enhancement principle to output one output image is smaller than that where the input image is a still picture.

It is to be noted that, where the input image is a dynamic picture and where the input image is a still picture which includes an image of a moving body, the image processing apparatus based on the resolution enhancement principle carries out, for a portion which involves some movement, mixture-addition of a comparatively small number of input images or expanded images, but carries out, for a portion which does not involve any movement, mixture addition of a comparatively large number of input images. Accordingly, with regard to the portion which involves movement, an image of picture quality higher than the picture quality of an image which is obtained by linear interpolation or the like is obtained. Meanwhile, with regard to the portion which involves no movement, an image of a high resolution wherein aliasing components are reduced and high frequency components are restored is obtained.

Meanwhile, in the resolution enhancement technique of the past which involves a motion detection process, a wideband interpolation process and a weighted addition process, since the number of frames for which mixture, that is, weighted addition, is to be carried out by the weighted addition process is determined in advance, that is, has to be determined in advance, the number of frames for which mixture is to be carried out in the weighted addition process may not be made different between a portion which involves movement and another portion which involves no movement.

Such an image processing apparatus based on the resolution-enhancement principle as described above can be applied, for example, to a television set, a digital video camera and a digital still camera.

Incidentally, while the series of processes described above can be executed by hardware, it may otherwise be executed by software. Where the series of processes is executed by software, a program which constructs the software is installed into a computer for universal use or the like.

FIG. 46 shows an example of a configuration of a form of a computer into which a program for executing the series of processes described above is to be installed.

The program may be recorded in advance on a hard disk 405 or in a ROM 403 as a recording medium built in the computer.

Or, the program may be temporarily or permanently stored or recorded on a removable recording medium 411 such as a flexible disc, a CD-ROM (Compact Disc Read Only Memory), an MO (Magneto Optical) disc, a DVD (Digital Versatile Disc)), a magnetic disc or a semiconductor memory. Such a removable recording medium 411 as just described can be provided as package software.

It is to be noted that the program may be installed from such a removable recording medium 411 as described above into the computer or may be transferred from a download site to the computer by wireless communication through an artificial satellite for digital satellite broadcasting or else may be transferred to the computer by wired communication through a network such as a LAN (Local Area Network) or the Internet. Thus, the computer can receive the program transferred in this manner by means of a communication section 408 and install the program into the hard disk 405 built therein.

The computer has a CPU (Central Processing Unit) 402 built therein. An input/output interface 410 is connected to the CPU 402 through a bus 401. If an inputting section 407 including a keyboard, a mouse, a microphone and so forth is operated by a user to input an instruction to the CPU 402 through the input/output interface 410, then the CPU 402 executes a program stored in the ROM (Read Only Memory) 403. Or, the CPU 402 loads a program stored on the hard disk 405, a program transferred from a satellite or the network, received by the communication section 408 and installed in the hard disk 405 or a program read out from the removable recording medium 411 loaded in a drive 409 and installed in the hard disk 405 into a RAM (Random Access Memory) 404 and executes the program. Consequently, the CPU 402 carries out a process in accordance with the flow chart described hereinabove or a process to be carried out by any of the configurations of the block diagrams described hereinabove. Then, the CPU 402 outputs a result of the process, for example, from an outputting section 406 formed from an LCD (Liquid Crystal Display) unit, a speaker and so forth through the input/output interface 410, or transmits the result of the process from the communication section 408 or else causes the result of the process to be recorded on the hard disk 405 as occasion demands.

It is to be noted that, in the present specification, the processing steps which describe the program for causing a computer to carry out various processes need not necessarily be processed in a time series in accordance with the order described as the flow chart but may include processes which are executed in parallel or individually such as, for example, parallel processes or processes depending upon objects.

The program may be processed by a single computer or may be processed discretely by a plurality of computers. Further, the program may be transferred to and executed by a computer at a remote place.

While preferred embodiments of the present invention have been described using specific terms, such description is for illustrative purpose only, and it is to be understood that changes and variations may be made without departing from the spirit or scope of the following claims.

What is claimed is:
1. An image processing apparatus, comprising:
expansion means for expanding an input image by interpolation using peripheral pixel values;
positioning means for carrying out positioning of an expanded image obtained by expansion of the input image and an output image obtained in an immediately preceding operation cycle;
separation means for separating the output image into low frequency components and high frequency components; and
mixture-addition means for mixing the low frequency components with the expanded image and adding the high frequency components to the image obtained by the mixture to produce a new output image.

2. The image processing apparatus according to claim 1, wherein said expansion means is formed using a filter, said positioning means is formed using a filter and said separation means is formed using a filter, and said filter of said separation means has a characteristic same as or similar to that of a filter formed from a cascade connection of said filter of said expansion means and said filter of said positioning means.

3. The image processing apparatus according to claim 2, wherein said positioning means carries out positioning of adjusting the position of the expanded image to the position of the output image, and
said mixture-addition means mixes the low frequency components with the expanded image after the positioning and adds the high frequency components to the image obtained by the mixture to produce the new output image.

4. The image processing apparatus according to claim 3, further comprising
movement decision means for deciding a degree of movement of each of the pixels of the expanded image after the positioning, wherein
said mixture-addition means further carries out moving body mixture of mixing the output image obtained in the immediately preceding operation cycle and the new output image with a weight which varies such that, for a pixel which exhibits a movement, the weight applied to the output image obtained in the immediately preceding operation cycle is higher, but for a pixel which exhibits no movement, the weight applied to the new output image is higher.

5. The image processing apparatus according to claim 2, wherein said positioning means carries out positioning of adjusting the position of the output image to the position of the expanded image, and
said separation means separates the output image after the positioning into the low frequency components and the high frequency components.

6. The image processing apparatus according to claim 5, further comprising
movement decision means for deciding a degree of movement of each pixel of the expanded image,
said mixture-addition means further carrying out moving body mixture of mixing the expanded image and the new output image with a weight which varies such that, for a pixel which exhibits a movement, the weight applied to the expanded image is higher, but for a pixel which exhibits no movement, the weight applied to the new output image is higher.

7. The image processing apparatus according to claim 2, further comprising:
first selection means for selecting the expanded image or the output image obtained in the immediately preceding operation cycle and supplying the selected image as an object of the positioning to said positioning means;
second selection means for selecting the image after the positioning by said positioning means or the expanded image and supplying the selected image to said mixture-addition means; and
third selection means for selecting the image after the positioning by said positioning means or the output image obtained in the immediately preceding operation cycle and supplying the selected image to said separation means;
said image processing apparatus executing a first process such that
said first selection means selects and supplies the expanded image to said positioning means,
said positioning means carries out positioning of adjusting the position of the expanded image supplied from said first selection means to the position of the output image and supplies the expanded image after the positioning to said second selection means,
said second selection means selects the expanded image after the positioning supplied from said positioning means and supplies the expanded image after the positioning to said mixture-addition means,
said third selection means selects and supplies the output image obtained in the immediately preceding operation cycle to said separation means,
said separation means separates the output image obtained in the immediately preceding operation cycle and supplied from said third selection means into the low frequency components and the high frequency components, and
said mixture-addition means mixes the low frequency components to the expanded image after the positioning supplied from said second selection means and adds the high frequency components to the image obtained by the mixture to produce the new output image, or a second process such that
said first selection means selects and supplies the output image obtained in the immediately preceding operation cycle to said positioning means,
said positioning means carries out positioning of adjusting the position of the output image obtained in the immediately preceding operation cycle and supplied from said first selection means to the position of the expanded image and supplies the output image after the positioning to said third selection means,
said second selection means selects and supplies the expanded image to said mixture-addition means,
said third selection means selects and supplies the output image after the positioning by said positioning means to said separation means,
said separation means separates the output image after the positioning supplied from said third selection means into the low frequency components and the high frequency components, and
said mixture-addition means mixes the low frequency components with the expanded image supplied from said second selection means and adds the high frequency components to the image obtained by the mixture to produce the new output image.

8. The image processing apparatus according to claim 7, further comprising:
movement decision means for deciding a degree of movement of each pixel of the expanded image; and
fourth selection means for selecting the expanded image or the output image obtained in the immediately preceding operation cycle; wherein
the first process is executed further such that
said fourth selection means selects the output image obtained in the immediate preceding operation cycle, and
said mixture-addition means further carries out moving body mixture of mixing the output image obtained in the immediately preceding operation cycle selected by said fourth selection means and the new output image with a weight which varies such that, for a pixel which exhibits a movement, the weight applied to the output image is higher, but for a pixel which exhibits no movement, the weight applied to the new output image is higher, and the second process is executed further such that said fourth selection means selects the expanded image, and said mixture-addition means further carrying out moving body mixture of mixing the expanded image selected by said fourth selection means and the new output image with a weight which varies such that, for a pixel which exhibits a movement, the weight applied to the expanded image is higher, but for a pixel which exhibits no movement, the weight applied to the new output image is higher.

9. The image processing apparatus according to claim 2, wherein, where a plurality of input images are inputted:

said expansion means expands the input images;

said positioning means carries out positioning of the expanded images and the output image;

said separation means separates the output image into the low frequency components and the high frequency components; and said mixture-addition means mixes the low frequency components with the expanded images and adds the high frequency components to the images obtained by the mixture to produce the new output image.

10. The image processing apparatus according to claim 2, wherein the input image is an image of the interlaced type.

11. The image processing apparatus according to claim 2, wherein the input image is an image of the Bayer array.

12. An image processing method, comprising the steps of:

expanding an input image by interpolation using peripheral pixel values;

carrying out positioning of an expanded image obtained by expansion of the input image and an output image obtained in an immediately preceding operation cycle;

separating the output image into low frequency components and high frequency components; and mixing the low frequency components with the expanded image and adding the high frequency components to the image obtained by the mixture so that a new output image is produced.

13. A non-transitory computer program stored on a computer readable medium for causing a computer to execute an image processing method, the image processing method comprising the steps of:

expanding an input image by interpolation using peripheral pixel values;

carrying out positioning of an expanded image obtained by expansion of the input image and an output image obtained in an immediately preceding operation cycle;

separating the output image into low frequency components and high frequency components; and mixing the low frequency components with the expanded image and adding the high frequency components to the image obtained by the mixture so that a new output image is produced.

14. An image processing apparatus, comprising:

an expansion section configured to expand an input image by interpolation using peripheral pixel values;

a positioning section configured to carry out positioning of an expanded image obtained by expansion of the input image and an output image obtained in an immediately preceding operation cycle;

a separation section configured to separate the output image into low frequency components and high frequency components; and a mixture-addition section configured to mix the low frequency components with the expanded image and add the high frequency components to the image obtained by the mixture to produce a new output image.

\* \* \* \* \*